United States Patent [19]

Akasaka et al.

[11] Patent Number: 5,576,965
[45] Date of Patent: Nov. 19, 1996

[54] METHOD AND APPARATUS FOR AIDING OF DESIGNING PROCESS

[75] Inventors: Shingo Akasaka, Zushi; Yoshinao Arai, Yokohama; Atsuhiro Ishida, Fujisawa; Noriyuki Haga, Yokohama; Katsuyoshi Katsuta, Katsuta; Shoji Arino, Hitachiota; Yoko Tonosaki, Yokohama; Tomoko Ogawa, Kodaira, all of Japan

[73] Assignee: Hitachi, Ltd., Tokyo, Japan

[21] Appl. No.: 45,129

[22] Filed: Apr. 12, 1993

[30] Foreign Application Priority Data

Apr. 16, 1992 [JP] Japan .................................. 4-096271
Jul. 20, 1992 [JP] Japan .................................. 4-191880
Mar. 4, 1993 [JP] Japan .................................. 5-043527

[51] Int. Cl.$^6$ .................................................. G06F 19/00
[52] U.S. Cl. ...................... 364/468.03; 364/191; 395/201
[58] Field of Search ................................ 364/468, 578, 364/191, 478, 401; 395/919, 925

[56] References Cited

U.S. PATENT DOCUMENTS

| | | | |
|---|---|---|---|
| 4,628,435 | 12/1986 | Tashiro et al. | 364/130 |
| 4,887,218 | 12/1989 | Natarejan | 364/468 |
| 4,896,269 | 1/1990 | Tong | 364/468 |
| 4,922,440 | 5/1990 | Kawamura et al. | 364/192 |
| 5,130,932 | 7/1992 | Kaihara et al. | 364/468 |
| 5,136,497 | 8/1992 | Coe et al. | 364/578 |
| 5,148,370 | 9/1992 | Litt et al. | 364/468 |
| 5,257,363 | 10/1993 | Shapiro et al. | 364/191 |
| 5,287,284 | 2/1994 | Sugino et al. | 364/491 |

Primary Examiner—Roy N. Envall, Jr.
Assistant Examiner—Brian C. Oakes
Attorney, Agent, or Firm—Antonelli, Terry, Stout & Kraus

[57] ABSTRACT

In a design aiding method, a design aiding apparatus having the method, or a design aiding system possessing a plurality of such design aiding apparatuses for use in a field of computer software to facilitate a design process, there is determined, for a product having many variations of attributes and values thereof, an appropriate design procedure according to a state of design in a process of determining the attribute values of the product satisfying a request of a client. At occurrence of, for example, conflict during the design, the design procedure is guided for the user to obtain a design plan conforming to the request.

22 Claims, 66 Drawing Sheets

FIG.6

| ATTRIBUTE CODE | ATTRIBUTE NAME | VALUE RANGE | VALUE | LOCK/UNLOCK SPECIFICATION | SETTING STATE |
|---|---|---|---|---|---|
| ... | ... | ... | | | |
| P2 | LOAD | {700, 800, 850, 950, ...} | 850 | UNLOCK | ALREADY SET |
| P3 | SPEED | 160 OR LESS | 150 | UNLOCK | ALREADY SET |
| ... | ... | ... | | | |
| P5 | ELEVATOR SHAFT FRONTGATE DIMENSION | | 3010 | UNLOCK | ALREADY SET |
| P6 | INSIDE DIMENSION OF CAGE W | {1550, 1650, 1750, ...} | | UNLOCK | TO BE SET |
| P7 | INSIDE DIMENSION OF CAGE D | {1100, 1150, 1200, ...} | | UNLOCK | TO BE SET |
| P8 | OUTSIDE DIMENSION OF CAGE W | | | UNLOCK | TO BE SET |
| P9 | OUTSIDE DIMENSION OF CAGE D | | | UNLOCK | TO BE SET |
| P10 | EMERGENCY STOP | {PRESENT, ABSENT} | PRESENT | UNLOCK | ALREADY SET |
| ... | ... | ... | | | |
| P16 | DOORWAY WIDTH OP | | 850 | LOCK | ALREADY SET |
| ... | ... | ... | | | |
| P19 | DOORWAY CORE | | 2300 | UNLOCK | ALREADY SET |
| ... | ... | ... | | | |
| P21 | CAGE CORE FRONTGATE DIMENSION | | | UNLOCK | TO BE SET |
| ... | ... | ... | | | |
| P24 | DISTANCE BETWEEN CAGE AND RIGHT WALL | | | UNLOCK | |
| ... | ... | ... | | | |
| P27 | MINIMUM DISTANCE BETWEEN CAGE AND RIGHT WALL | | | UNLOCK | TO BE SET |
| ... | ... | ... | | | |
| P34 | WEIGHT LAYOUT TYPE | {REAR DROP, RIGHT DROP, LEFT DROP} | REAR DROP | UNLOCK | ALREADY SET |
| P35 | CORE SHIFT L | | | UNLOCK | TO BE SET |
| ... | ... | ... | | | |

FIG.7

CONSTRAINTS

DECISION OF CAGE SIZE

C1:

| P2 LOAD | P6 INSIDE DIMENSION OF CAGE W | P7 INSIDE DIMENSION OF CAGE D |
| --- | --- | --- |
| 700 | 1550 | 1100 |
| 800 | 1650 | 1150 |
| 850 | 1550 | 1300 |
| 850 | 1750 | 1200 |
| 950 | 1650 | 1350 |
| 950 | 1850 | 1250 |
| 1000 | 1750 | 1400 |
| 1050 | 1950 | 1300 |
| 1100 | 1850 | 1450 |

DECISION OF MINIMUM DIMENSION

C4:

| P10 EMERGENCY STOP | P3 SPEED | --- | P27 MINIMUM DISTANCE BETWEEN CAGE AND RIGHT WALL | --- |
| --- | --- | --- | --- | --- |
| PRESENT | 110 OR LESS | --- | 210 | --- |
| | 110 OR MORE 160 OR LESS | --- | 220 | --- |
| ABSENT | 110 OR LESS | --- | 230 | --- |
| | 110 OR MORE 160 OR LESS | --- | 240 | --- |

C5: [P8 OUTSIDE DIMENSION OF CAGE W] = [P6 INSIDE DIMENSION OF CAGE W] + 50   CALCULATION OF OUTSIDE DIMENSION OF CAGE W

C6: [P9 OUTSIDE DIMENSION OF CAGE D] = [P7 INSIDE DIMENSION OF CAGE D] + 200   CALCULATION OF OUTSIDE DIMENSION OF CAGE D

C12: [P21 CAGE CORE FRONTGATE DIMENSION] = [P19 DOORWAY CORE] − [P35 CORE SHIFT L]   POSITIONAL RELATIONSHIP BETWEEN DOORWAY CORE AND CAGE CORE

CALCULATION OF DISTANCE BETWEEN CAGE AND RIGHT WALL

C13: [P27 DISTANCE BETWEEN CAGE AND RIGHT WALL] = [P5 ELEVATOR SHAFT FRONT GATE DIMENSION] − [P21 CAGE CORE FRONTGATE DIMENSION] − $\frac{1}{2}$ [P8 OUTSIDE DIMENSION OF CAGE W]

C17: [P36 CORE SHIFT L] = $\frac{1}{2}$ ( [P8 OUTSIDE DIMENSION OF CAGE W] − [P16 DOORWAY WIDTH OP] ) − 50   CALCULATION OF CORE SHIFT CC1: [P24 DISTANCE BETWEEN CAGE AND RIGHT WALL] ≧ [P27 MINIMUM DIMENSION OF DISTANCE BETWEEN CAGE AND RIGHT WALL]   CHECK OF MINIMUM DIMENSION OF DISTANCE BETWEEN CAGE AND RIGHT WALL

FIG.8

CONSTRAINT ACTIVATION CONDITION CONTROL TABLE

| CODE | RELATED ATTRIBUTES | | | | FORM |
|---|---|---|---|---|---|
| C1 | P2 | P6 | P7 | | TABLE |
| ⋮ | | | | | |
| C4 | P3 | P10 | P27 | | TABLE |
| C5 | P7 | P9 | | | EQUALITY |
| C6 | P6 | P8 | | | EQUALITY |
| ⋮ | | | | | |
| C12 | P19 | P21 | P35 | | EQUALITY |
| ⋮ | | | | | |
| C13 | P5 | P8 | P21 | P24 | EQUALITY |
| ⋮ | | | | | |
| C17 | P8 | P16 | P35 | | EQUALITY |
| ⋮ | | | | | |
| CC1 | P24 | P27 | | | INEQUALITY |
| ⋮ | | | | | |

FIG.13
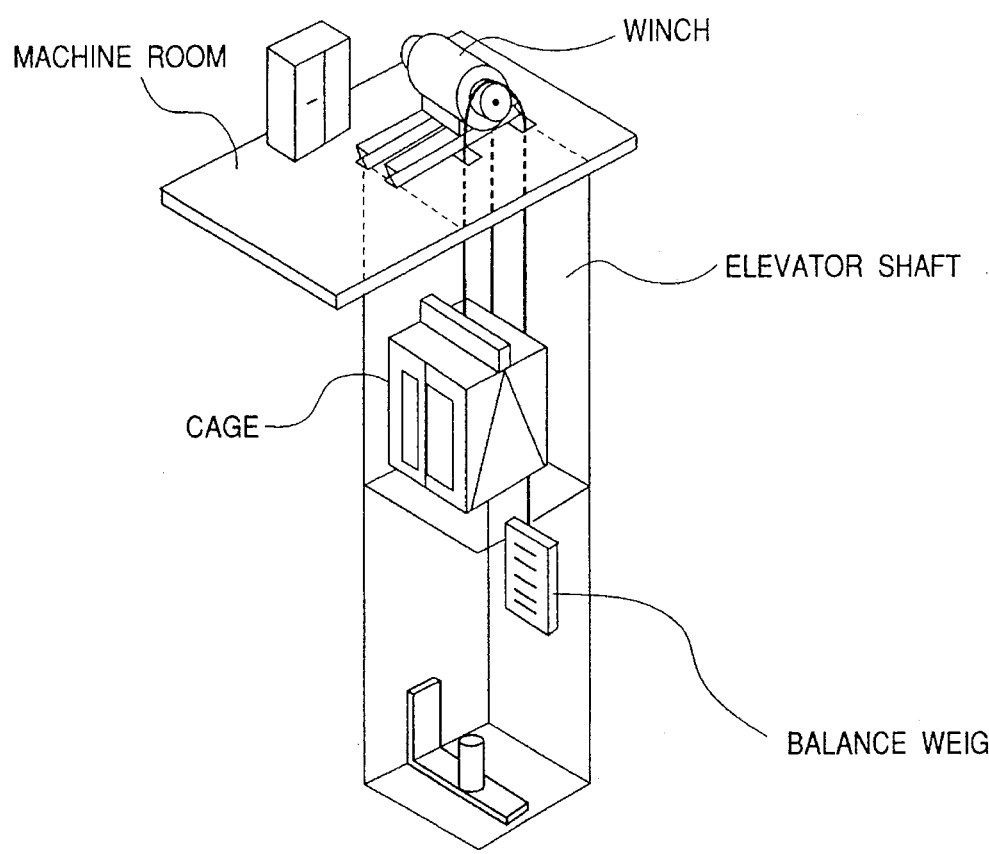
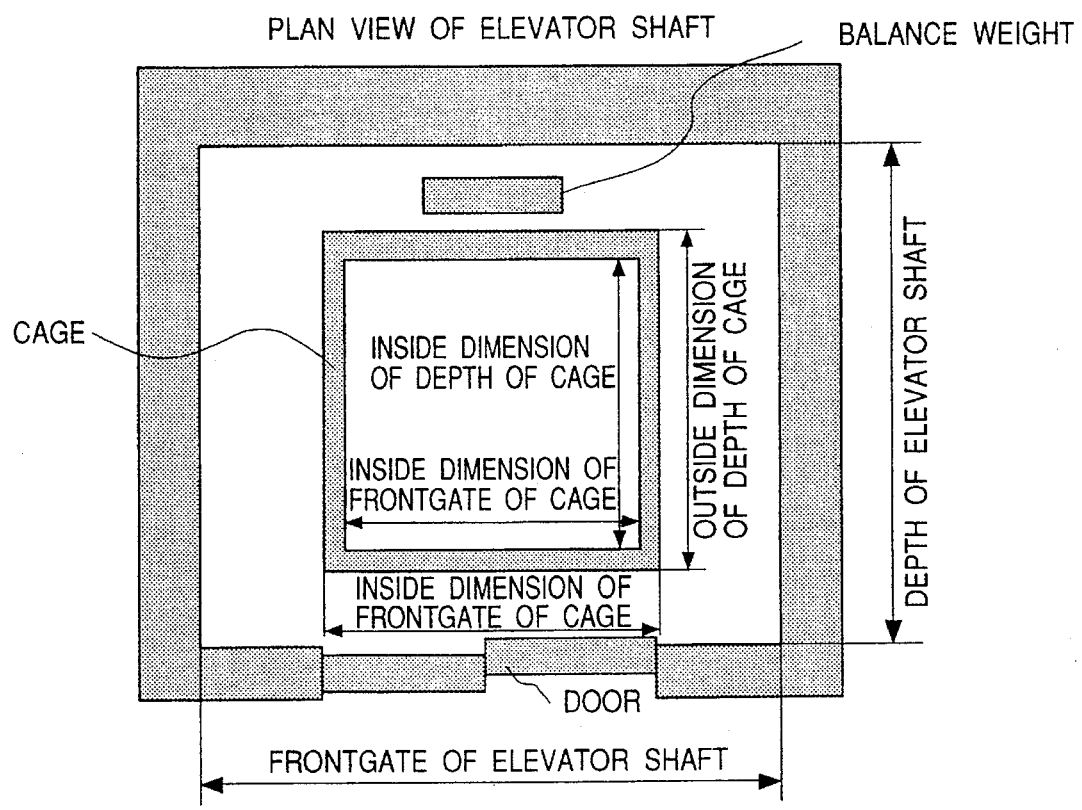

FIG.15
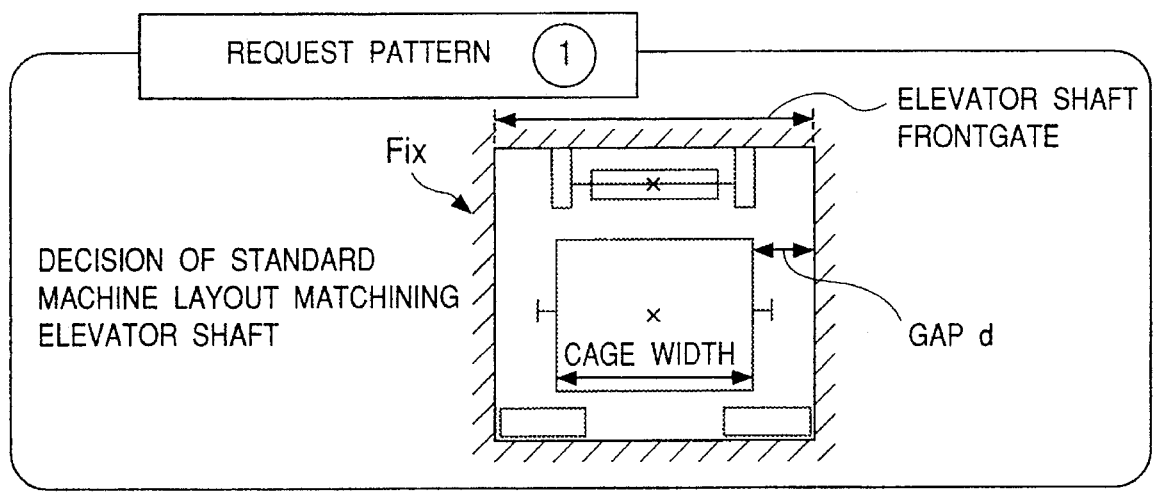
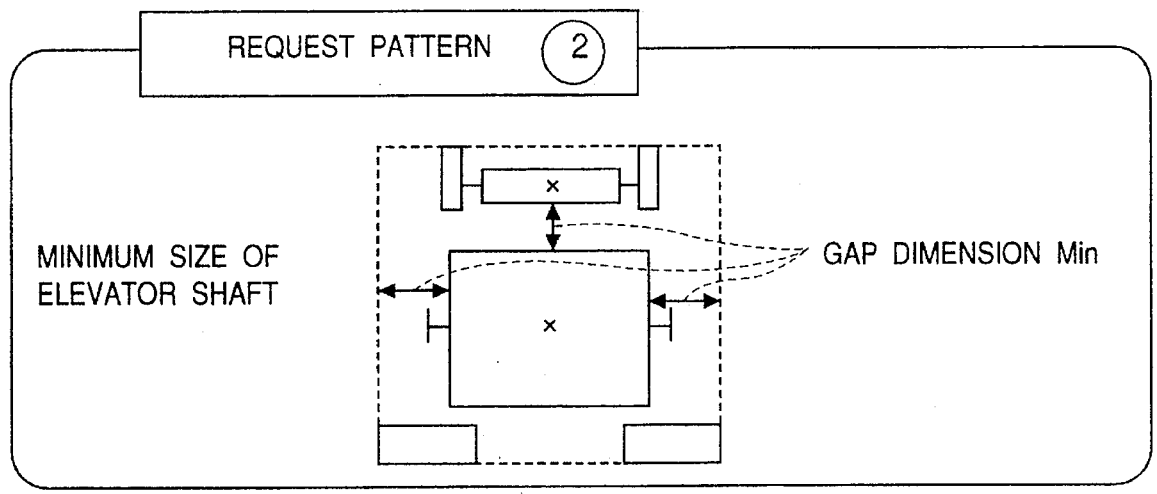

FIG.16

| ATTRIBUTE CODE | ATTRIBUTE NAME | RANGE OF VALUE | VALUE | LOCK/UNLOCK | SETTING STATE | WEIGHT |
|---|---|---|---|---|---|---|
| P1 | LOAD | {700, 800, 850, 950, ...} | | UNLOCK | TO BE SET | |
| P2 | SPEED | 160 OR LESS | | UNLOCK | TO BE SET | |
| P3 | CAGE WIDTH | {1550, 1650, 1750, ...} | | UNLOCK | TO BE SET | |
| P4 | CAGE DEPTH | {1100, 1150, 1200, ...} | | UNLOCK | TO BE SET | |
| P5 | ELEVATOR SHAFT FRONTGATE | | | UNLOCK | TO BE SET | |
| P6 | GAP d | | | UNLOCK | TO BE SET | |
| P7 | MINIMUM DIMENSION OF GAP d | | | UNLOCK | | |

| P1 LOAD | P1 CAGE WIDTH | P1 CAGE DEPTH |
|---|---|---|
| 700 | 1550 | 1100 |
| 800 | 1650 | 1150 |
| 850 | 1550 | 1300 |
| 850 | 1750 | 1200 |
| 950 | 1650 | 1350 |
| 950 | 1850 | 1250 |
| 1000 | 1750 | 1400 |
| 1050 | 1950 | 1300 |
| 1100 | 1850 | 1450 |

C2: $\boxed{\text{P6 GAP d}} = \frac{1}{2}\left(\boxed{\text{P5 ELEVATOR SHAFT FRONTGATE}} - \boxed{\text{P3 CAGE WIDTH}}\right)$ C3: $\boxed{\text{P6 GAP d}} = \boxed{\text{P7 MINIMUM DIMENSION OF GAP d}}$ C4: $\boxed{\text{P6 GAP d}} \geqq \boxed{\text{P7 MINIMUM DIMENSION OF GAP d}}$

C5

| P2 SPEED | ... | P2 MINIMUM DIMENSION OF GAP d | ... |
|---|---|---|---|
| 110 OR LESS | ... | 210 | ... |
| 110 TO 160 | ... | 220 | ... |
| 110 OR LESS | ... | 230 | |
| 110 TO 160 | ... | 240 | |

FIG. 18

CONSTRAINT ACTIVATION CONDITION CONTROL TABLE

| CONSTRAINT CODE | RELATED ATTRIBUTE NAME | FORM | IMPORTANCE |
|---|---|---|---|
| C1 | P1  P3  P4 | TABLE | |
| C2 | P6  P5  P3 | EQUATION | |
| C3 | P6  P7 | EQUATION | |
| C4 | P6  P7 | INEQUALITY | |
| C5 | P2  P7 | TABLE | |

FIG. 19

CONSTRAINTS

| CONSTRAINT CODE | CONSTRAINTS | | |
|---|---|---|---|
| C1 | P1 LOAD | P1 CAGE WIDTH | P1 CAGE DEPTH |
| | 700 | 1550 | 1100 |
| | 800 | 1650 | 1150 |
| | 850 | 1550 | 1300 |
| | 850 | 1750 | 1200 |
| | 950 | 1650 | 1350 |
| | 950 | 1850 | 1250 |
| | 1000 | 1750 | 1400 |
| | 1050 | 1950 | 1300 |
| | 1100 | 1850 | 1450 |

| C2 | $\text{P6 GAP d} = \frac{1}{2} (\text{P5 ELEVATOR SHAFT FRONTGATE DIMENSION} - \text{P3 CAGE WIDTH})$ |
|---|---|
| C3 | $\text{P6 GAP d} = \text{P7 MINIMUM DIMENSION OF GAP d}$ |
| C4 | $\text{P6 GAP d} \geqq \text{P7 MINIMUM DIMENSION OF GAP d}$ |

| C5 | P2 SPEED | ... | P7 MINIMUM DIMENSION OF GAP d | ... |
|---|---|---|---|---|
| | 110 OR LESS | ... | 210 | ... |
| | 110 TO 160 | ... | 220 | ... |
| | 110 OR LESS | ... | 230 | ... |
| | 110 TO 160 | ... | 240 | ... |

| REQUEST PATTERN CODE | IMPORTANCE OF CONSTRAINT | | | | | IMPORTANCE OF ATTRIBUTE | | | | | | |
|---|---|---|---|---|---|---|---|---|---|---|---|---|
| | C1 | C2 | C3 | C4 | C5 | P1 | P2 | P3 | P4 | P5 | P6 | P7 |
| 1 | 0.8 | 0.6 | 0.3 | 0.4 | 0.6 | 0.9 | 0.9 | 0.8 | 0.8 | 0.9 | 0.3 | 0.4 |
| 2 | 0.8 | 0.6 | 0.9 | 0.3 | 0.9 | 0.9 | 0.9 | 0.8 | 0.8 | 0.3 | 0.9 | 0.9 |

FIG. 26

| A |
|---|
| B |

FIG. 26-A

[EXECUTE INFERENCE] [INFERENCE MODE] [DISPLAY DIAGRAM TO BE CHECKED] [COUNTER-MEASURE PLAN] [MITIGATE CONSTRAINT]

ATTRIBUTE VALUE INPUT AREA

| CWT LAYOUT TYPE | REAR DROP |
|---|---|
| | |

[CONFIRM]

BASIC SPECIFICATION — BASIC STRUCTURE
SPECIFICATION OF BUILDING — CAGE POSITION
SPECIFICATION OF CAGE — CWT POSITION
CWT SPECIFICATION — DOORWAY POSITION
DOORWAY SPECIFICATION

[END]

| ATTRIBUTE VALUE INPUT AREA | | | 27-1 |
|---|---|---|---|
| INSIDE DIMENSION OF CAGE W | | mm | |
| INSIDE DIMENSION OF CAGE D | | mm | |
| OUTSIDE DIMENSION OF CAGE W | | mm | |
| OUTSIDE DIMENSION OF CAGE D | | mm | |
| EMERGENCY STOP | PRESENT | | |
| DOOR TYPE | | 2P-CO / 2P-CO / 2S-2P | 27-3 |
| DOOR M/C TYPE | | | |
| CAGE CORE DEPTH DIMENSION | | mm | |
| CAGE CORE FRONTGATE DIMENSION | | | |

END

CONFIRM

| BASIC SPECIFICATION | BASIC STRUCTURE | CAGE POSITION |
|---|---|---|
| SPECIFICATION OF BUILDING | | CWT POSITION |
| SPECIFICATION OF CAGE | | DOORWAY POSITION |
| CWT SPECIFICATION | | |
| DOORWAY SPECIFICATION | | |

27-4

27-5

EXECUTE INFERENCE | INFERENCE MODE | DISPLAY DIAGRAM TO BE CHECKED | COUNTER-MEASURE PLAN | MITIGATE CONSTRAINT 27-2

PLAN VIEW OF MACHINE ROOM

PLAN VIEW OF ELEVATOR SHAFT

CROSS-SECTIONAL DIAGRAM OF ELEVATOR SHAFT

| A |
|---|
| B |

FIG. 30-B
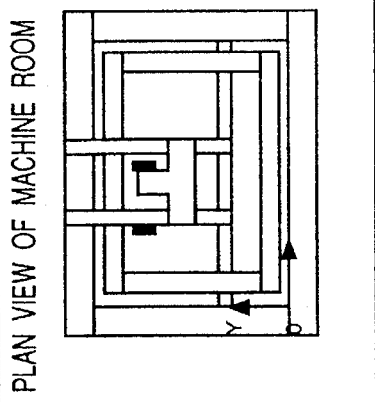

FIG. 32

| EXECUTE INFERENCE | INFERENCE MODE | DISPLAY DIAGRAM TO BE CHECKED | COUNTER-MEASURE PLAN | MITIGATE CONSTRAINT | | END |
|---|---|---|---|---|---|---|

CROSS-SECTIONAL DIAGRAM OF ELEVATOR SHAFT

PLAN VIEW OF MACHINE ROOM

ATTRIBUTE VALUE INPUT AREA

| | INSIDE DIMENSION OF CAGE W | 1800 mm |
| | INSIDE DIMENSION OF CAGE D | 1500 mm |
| | OUTSIDE DIMENSION OF CAGE W | 1870 mm |
| ◁ | D | 1690 mm | ▷ |
| | | PRESENT |
| | | 2P-CO |
| | | SM-SC |
| | N | 845 mm |
| ◁ | N | 935 mm | ▷ |

32-1

1. CHANGE CWT LAYOUT FROM REAR DROP TO LEFT DROP.
2. REDUCE INSIDE DIMENSION OF DEPTH OF CAGE

CONFIRM

BASIC SPECIFICATION | BASIC STRUCTURE
SPECIFICATION OF BUILDING | CAGE POSITION
SPECIFICATION OF CAGE | CWT POSITION
CWT SPECIFICATION | DOORWAY POSITION
DOORWAY SPECIFICATION

CONFIRM

ATTRIBUTE VALUE INPUT AREA

| | |
|---|---|
| INSIDE DIMENSION OF CAGE W | 1800 mm |
| INSIDE DIMENSION OF CAGE D | 1500 mm |
| OUTSIDE DIMENSION OF CAGE W | 1870 mm |
| OUTSIDE DIMENSION OF CAGE D | 1690 mm |
| EMERGENCY STOP | PRESENT |
| DOOR TYPE | 2P-CO |
| DOOR M/C TYPE | SM-SC |
| CAGE CORE DEPTH DIMENSION | 845 mm |
| CAGE CORE FRONTGATE DIMENSION | 935 mm |

34-1

| BASIC SPECIFICATION | BASIC STRUCTURE |
| SPECIFICATION OF BUILDING | CAGE POSITION |
| SPECIFICATION OF CAGE | CWT POSITION |
| CWT SPECIFICATION | DOORWAY POSITION |
| DOORWAY SPECIFICATION | |

[EXECUTE]  [END]

[EXECUTE INFERENCE] [INFERENCE MODE] [DISPLAY DIAGRAM TO BE CHECKED] [COUNTER-MEASURE PLAN] [MITIGATE CONSTRAINT]

PLAN VIEW OF MACHINE ROOM

PLAN VIEW OF ELEVATOR SHAFT

CROSS-SECTIONAL DIAGRAM OF ELEVATOR SHAFT

FIG.39
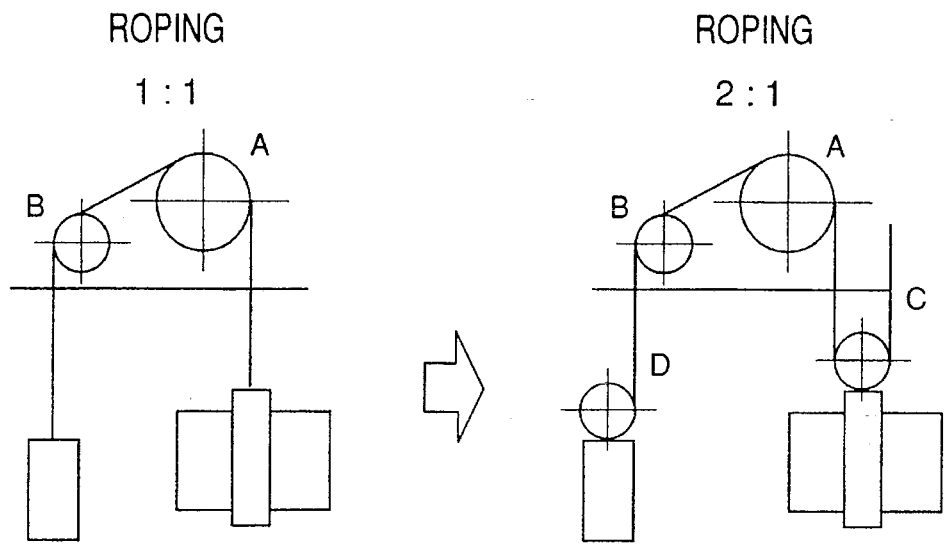
CHANGE OF SET OF ATTRIBUTES
FIG.40
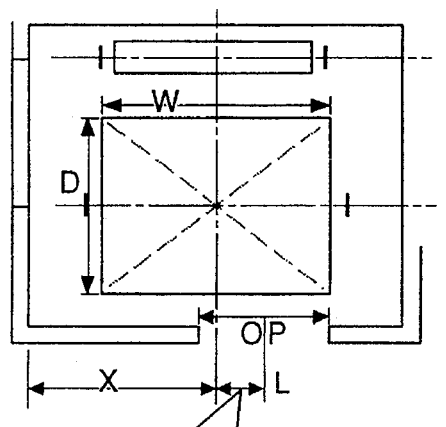
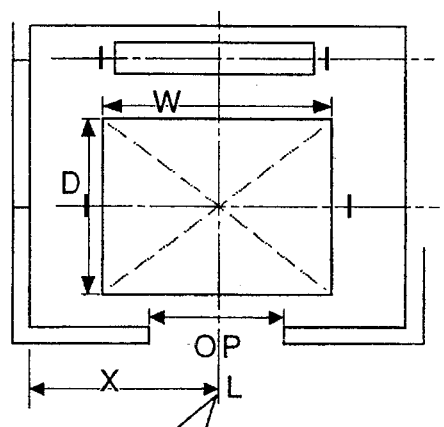
CHANGE OF SET OF CONSTRAINTS

FIG. 43

CLASSIFICATION:

1) BASIC SPECIFICATION : OUTLINE OF FUNCTIONAL REQUEST FROM CLIENT.
2) BASIC STRUCTURE : OUTLINE OF STRUCTURAL REQUEST FROM CLIENT. ACCORDING TO VALUES OF ATTRIBUTES, DATA LAYOUT OF PRODUCT MODEL VARIES CONSIDERABLY
3) BUILDING SPECIFICATION : BUILDING CONTOURS OF ELEVATOR SHAFT, MACHINE ROOM, PIT, etc
4) MACHINE SPECIFICATION : ATTRIBUTES DEFINING SPECIFICATIONS SUCH AS DIMENSION AND TYPES OF MACHINES CONSTITUTING ELEVATOR
5) LAYOUT SPECIFICATION : ATTRIBUTES DEFINING LAYOUT COORDINATES, ORIENTATION, etc, OF MACHINES
6) GAP SPECIFICATION : DISTANCE (GAP) BETWEEN MACHINES. INTERNAL ATTRIBUTES TO JUDGE ACCEPTANCE OR REJECTION OF LAYOUT

GUIDELINE OF WEIGHT SETTING(EXAMPLE):

BASIC SPECIFICATION : 0.9      BUILDING SPECIFICATION : 0.9
BASIC STRUCTURE : 0.8          LAYOUT SPECIFICATION : 0.6
MACHINE SPECIFICATION : 0.7    GAP SPECIFICATION : 0.5

NAME [CAGE WIDTH]

UNIT [mm]

TYPE [INTEGER, REAL NUMBER, LETTER]

VALUE RANGE [1050, 1100, 1200, 1300, ----]

DEFAULT [1100]

CLASSIFICATION
[BASIC SPECIFICATION, BASIC STRUCTURE, MACHINE SPECIFICATION]
[BUILDING SPECIFICATION, LAYOUT SPECIFICATION, GAP SPECIFICATION]

ACTIVATING CONDITION
ATTRIBUTE NAME   VALUE
[          ]    [    ]
[          ]    [    ]
[          ]    [    ]

WEIGHT [0.7]        $0.0 < \text{WEIGHT} \leq 1.00$
(FOR EACH REQUEST PATTERN)

| CONSTRAINT NAME | VARIABLES NECESSARY TO DETERMINE VALUE | VARIABLE OF WHICH VALUE IS DETERMINED |
|---|---|---|
| 307 | A, B | C |

| VARIABLE AS CONDITION FOR CONSTRAINT CHANGE | CONSTRAINT OF WHICH CONTENTS ARE CHANGED |
|---|---|
| X | 307 |

| CONSTRAINT NAME | VARIABLES NECESSARY TO DETERMINE VALUE | VARIABLE OF WHICH VALUE IS DETERMINED |
|---|---|---|
| C1 | P1 | P4, P5 |
| C2 | P2, P3 | P6 |
| C3 | P5 | P8 |
| C4 | P5, P7 | P9 |
| C5 | P9 | P10 |

| VARIABLE NECESSARY TO CHANGE CONSTRAINT | CONSTRAINT OF WHICH CONTENTS ARE CHANGED |
|---|---|
| P6 | C4 |

FIG.58

| RETRIEVAL KEY ⎨ LAYOUT PATTERN NO. | 1 | 2 | 3 | ⋮ |
|---|---|---|---|---|
| NOT-SCALE DRAWING DATA | ASSOCIATED DIMENSION ⟷ ATTRIBUTE NAME: GAP A, GAP B ----- | ASSOCIATED DIMENSION ⟷ ATTRIBUTE NAME: GAP A, GAP B ----- | ASSOCIATED DIMENSION ⟷ ATTRIBUTE NAME: GAP A, GAP B ----- | ⋮ |

FIG.63
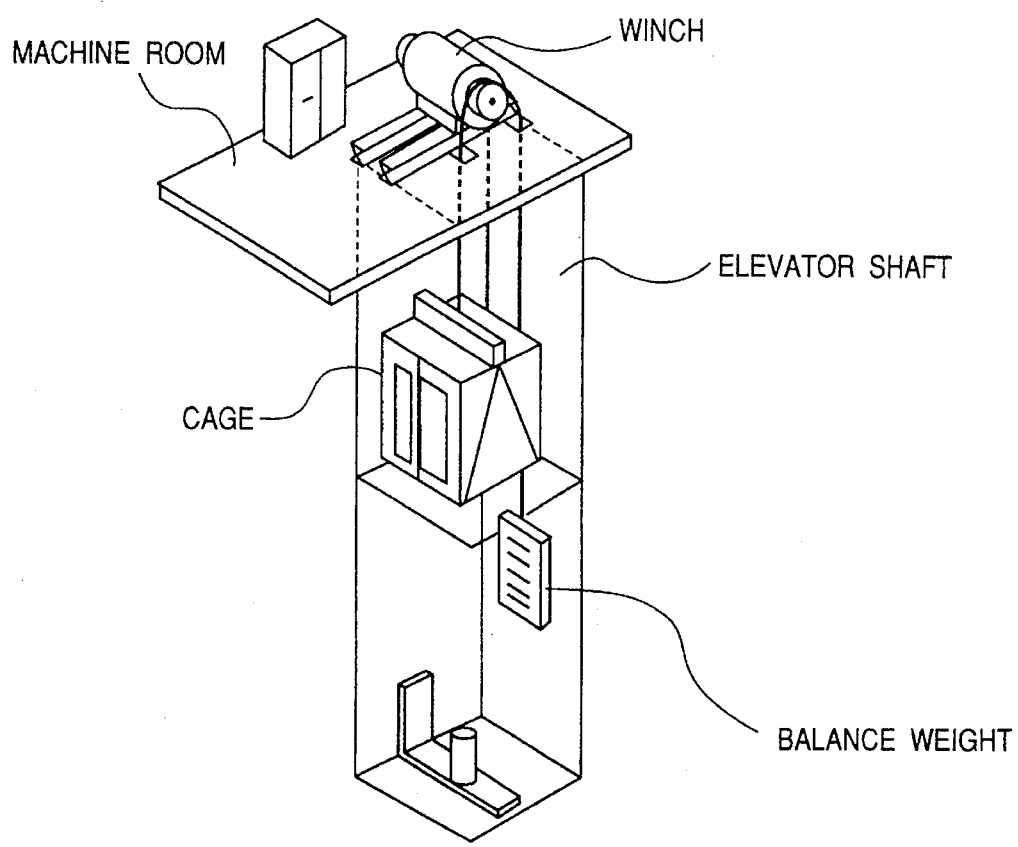
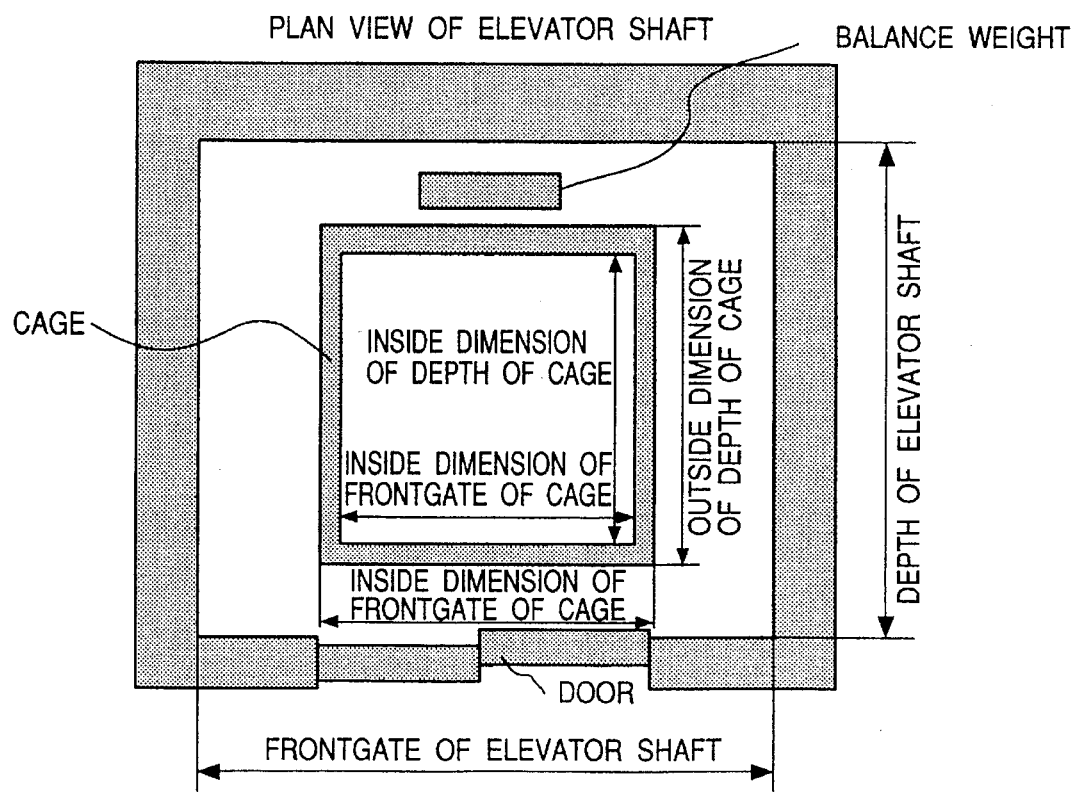

FIG.65

| CONSTRAINT 1: | LOAD (kg) | INSIDE DIMENSION OF FRONTGATE OF CAGE (mm) | INSIDE DIMENSION OF DEPTH OF CAGE (mm) |
|---|---|---|---|
| | 700 | 1550 | 1100 |
| | 800 | 1650 | 1150 |
| | 850 | 1550 | 1300 |
| | 850 | 1750 | 1200 |
| | 950 | 1650 | 1350 |
| | 950 | 1850 | 1250 |
| | 1000 | 1750 | 1400 |
| | 1050 | 1950 | 1300 |
| | 1100 | 1850 | 1450 |

CONSTRAINT 2: (OUTSIDE DIMENSION OF FRONTGATE OF CAGE) = (INSIDE DIMENSION OF FRONTGATE OF CAGE) + 50

CONSTRAINT 3: (OUTSIDE DIMENSION OF DEPTH OF CAGE) = (INSIDE DIMENSION OF DEPTH OF CAGE) + 200

CONSTRAINT 4: (ELEVATOR SHAFT FRONTGATE) ≧ (OUTSIDE DIMENSION OF FRONTGATE OF CAGE) + 350

CONSTRAINT 5: (ELEVATOR SHAFT DEPTH) ≧ (OUTSIDE DIMENSION OF DEPTH OF CAGE) + 450

FIG.67

| CONSTRAINT NO. | MITIGATION LEVEL |
|---|---|
| 1 | NON-STANDARD 2 |
| 2 | REMOVAL |
| 3 | STANDARD |
| 4 | STANDARD |
| 5 | NON-STANDARD 1 |
| 6 | STANDARD |

FIG.68

| CONSTRAINT NO. | MITIGATION LEVEL | DESIGN PURPOSE |
|---|---|---|
| 1 | STANDARD | |
| 2 | NON-STANDARD 2 | INSUFFICIENT STRENGTH |
| 3 | STANDARD | |
| 4 | NON-STANDARD 1 | SPECIFICATION OF CLIENT |
| 5 | REMOVAL | SPECIAL OBJECT CONTOUR |
| 6 | STANDARD | |

FIG.70

| EXECUTE INFERENCE | DISPLAY DIAGRAM FOR DISCUSSION | COUNTER-MEASURE PLAN | MITIGATE CONSTRAINT | | SELECTION LIST |
|---|---|---|---|---|---|

ATTRIBUTE VALUE INPUT AREA

| | VALUE |
|---|---|
| ...DIMENSION | 950 |
| | 150 |
| | 2500 |
| | |
| | |
| | |
| E DIMENSION OF... | 1100 |
| ...DISTANCE... | 1670 |
| M DIMENSION OF... | |
| AYOUT TYPE | |

| SELECT | NO. [ ] | | |
|---|---|---|---|
| NO. | 1 | 2 | |
| INSIDE DIMENSION OF CAGE W | 1650 | 1850 | |
| INSIDE DIMENSION OF CAGE D | 1350 | 1250 | |
| OUTSIDE DIMENSION OF CAGE W | 1700 | 1900 | |
| OUTSIDE DIMENSION OF CAGE D | 1550 | 1450 | |
| CORE SHIFT L | 250 | 350 | |
| CAGE CORE FRONTGATE DIMENSION | 1420 | 1320 | |
| DISTANCE BETWEEN CAGE AND RIGHT WALL | 230 | 230 | |
| EMERGENCY STOP | PRESENT | PRESENT | |
| MINIMUM DIMENSION OF DISTANCE BETWEEN CAGE AND RIGHT WALL | 220 | 220 | |

METHOD AND APPARATUS FOR AIDING OF DESIGNING PROCESS

BACKGROUND OF THE INVENTION

Recently, there has been developed a design aiding system in which technologies of knowledge engineering are applied to a design problem. In this system, for an object of design (product), a model is configured according to attributes stipulating an object of design (product) and constraints existing between the attributes. When a designer supplies the system with values of attributes conforming to specifications of the product, necessary constraints are activated to sequentially determine values of attributes not decided, thereby developing a design plan. For example, as described in the JP-A-2-126370, there are hierarchically arranged frames defining attributes required for a designing job and information items of attributes necessary to attain the values thereof, for example frames defining performance evaluation items such as a specific fuel consumption and a radius of rotation and a gear ratio necessary to obtain these items. Moreover, there are memorized a designing order related to the respective attributes, namely, a design procedure as well as calculation formulae for computing output attributes from input attributes. When a value of an attribute defined in a lowest hierarchic layer is inputted or altered, attributes in higher hierarchic layers related thereto are checked through the hierarchic structure so as to extract the attributes, thereby sequentially setting values thereto. Accordingly, even for an input and/or an alteration of some values of attributes in which all necessary input attribute items are not included, there is efficiently generated a design procedure, namely, a design procedure and/or a modification procedure of attributes to obtain a solution for design.

Moreover, there has been described in the JP-A-3-92972 a method of determining values of attributes of a plurality of apparatuses constituting an object of design and values of attributes of a layout of arranging the apparatuses by use of knowledge processing. In this method, using knowledge of constraints related to a contour and an arrangement of the design object, knowledge associated with an order of arranging the respective apparatuses, and knowledge of evaluation after arrangement, there is conducted a search for each of the apparatuses in an ascending order of arrangement for candidate positions satisfying constraints. After one of the plural candidate positions is selected, the selected candidate position is set as a constraint such that a search is made for the next apparatus in the arrangement order for candidate positions so as to select one of the candidate positions. If any candidate position is not found for the apparatus at an intermediate point, a backtracking operation is achieved to change the candidate position of the apparatus previously arranged and then a search is made with respect to the varied position for candidate positions of the subsequent apparatus. This flow is repeatedly accomplished, namely, a search is made for all solutions of the candidates of values of attributes to decide the positions of all apparatuses without any conflict, thereby attaining a design plan conforming to the specifications of requirements.

According to the prior art described in the JP-A-2-126370, in a stage where the design ordering operation related to the respective attributes is arranged in a hierarchic structure, attributes which can be inputted are required to be beforehand defined in the lowest layer of the hierarchic structure; furthermore, the constraints as the relational rules between the attributes are represented in a procedural manner in the form of, for example, calculation formulae to computer output attributes from input attributes, and the technology cannot be applied to design in which input attributes cannot be beforehand assumed. For example, in a case where a relationship (constraint) of $A=B+\alpha$ exists between an attribute A and an attribute B, for a plurality of requests such as "the attribute A is known in a certain case, and it is desired to attain the attribute B from the value thereof; and the attribute B is known in another case, and it is desired to attain the attribute A from the value thereof", it is impossible to simultaneously express relational rules $B=A-\alpha$ and $A=B+\alpha$. Consequently, there cannot be generated a design procedure. That is, in this conventional technology, the relationships between the input attributes and the output attributes are fixed, and the technology is applicable only to a small-sized problem in which a design procedure is definitely defined. This leads to a problem that the technology cannot cope with a design job having various request patterns of which input attributes and output attributes cannot be assumed in advance.

Furthermore, in the conventional technology described in the JP-A-3-92972, after there are decided all values of attributes of a plurality of apparatuses configuring the design object, an attempt is made for each apparatus in the ascending order of arrangement to search for candidate positions for other apparatuses so as to decide values of attributes of the layout. In other words, since the selection of apparatuses and the problem of layout are separated from each other, even in a case where the layout cannot be determined because of values of attributes of apparatuses, the processing to obtain all solutions of the layout of candidate positions are entirely attempted such that only when the design plan cannot be finally obtained, the processing is returned for the first time to the selection of values of attributes of apparatuses. This causes a problem that a long period of time is required from when the backtracking of design is occurred to when a design plan satisfying the required specifications is attained.

In addition, when the structure or the like of the building in which apparatuses are installed is altered in a process of design operation, a change occurs in the data structure as a set of attributes and a set of constraints of the apparatuses and layout. The prior art however is attended with a problem that the method cannot cope with the occurrence of such a change in the data structure of the design object in the search process.

Moreover, for the contents of knowledge along the design procedure in the conventional method, since the layout order of the respective apparatuses is a fixed flow, only values of attributes can be decided according to the order, which leads to a problem that it is impossible to create a design procedure in which the order of arranging apparatus is determined according to the state of design.

Furthermore, since heuristic knowledge such as a method of solving a case of occurrence of conflict between values of attributes cannot be easily incorporated in the system, there arises a problem that when such a conflict occurs in a process of design operation, the user conducts again an input operation to repeatedly accomplish trial and error.

In addition, there exists a problem that in a case of absence of a design plan satisfying all constraints, there cannot be attained a substitutional design plan which possibly satisfies the required specifications.

Moreover, as for the layout, there is employed a method of searching for all solutions in which either one of candidate positions of each apparatus is selected to determine candidate positions of the subsequent apparatus depending on the selected candidate position. This consequently leads to a problem that an optimal design plan cannot be efficiently attained.

Furthermore, since the value of candidate of each attribute is selected in a value-by-value manner to determine a value of another attribute depending thereon, it is impossible to create at a time a plurality of candidate design plans of layout, and hence there exists a problem that the user cannot recognize the type of a design plan to be obtained as a candidate from the inputted values of attributes.

In addition, in a case where the values of all attributes are not determined even after the possible design operations are completely executed according to values of attributes first inputted as the required specifications, if values of some attributes are not additionally inputted, the processing is stopped and hence there cannot be attained a design plan. However, there is missing a method of indicating the user, to proceed the design, the values of attributes to be inputted, which leads to a problem that a trial-and-error operation is required.

It is therefore an object of the present invention of this application, which has been devised to remove the problems above, to provide a design aiding method in which a design procedure is automatically generated in association with various patterns required and which can guide the design procedure in a situation where judgement of the user is necessitated, for example, at an occurrence of a plurality of candidates of values of attributes and at an occurrence of conflicts between the values of attributes appearing in a process of design operation, thereby appropriately generating a design plan at a high speed.

SCREEN AND OPERATION

Moreover, another object of the present invention is to provide a design aiding method in which there are displayed guidance screens when the user inputs required specifications; furthermore, after a design procedure is automatically generated in association with various patterns of inputted specifications of requirements, in a situation where judgement of the user is necessitated, for example, at an occurrence of a plurality of candidates of values of attributes and at an occurrence of conflicts between the values of attributes appearing in a process of design operation, there are presented necessary instruction messages in the form of interactive screens so as to guide the design procedure, thereby correctly interactively generating a design plan at a high speed.

CONFIGURATION DIAGRAM FROM ANOTHER POINT OF VIEW

In addition, there has conventionally been a method (G. L. Steel Jr.: The Definition and Implementation of a Computer Programming Language Based on Constraints, AI-TR-595, MIT(1978)) in which there is employed a constraint propagation such that constrains are activated according to an input value of attribute to decide values of other attributes satisfying the constraints. However, in a case where this method is adopted to decide specifications of a product having constraints and attributes of practical sizes, there arise the following problems.

1) For an input value of attribute requested from the user, there usually exist a plurality of constraints which can be activated and hence there occurs a conflict to decide which one of the constraints should be executed. In a case of such a conflict, however, judgement has not been conducted to determine the constraint to be executed. Namely, considerations have not been given to the design procedure. Consequently, for example, when the constraints are executed in an order of description thereof, an unimportant constraint may be first activated and hence a conflict possibly occurs in an important constraint later. In such a case, it is required to change the request from the user to achieve the design again, which increases the repetitions of the trial and error by the user.

2) Even in a case where the constraint propagation is executed in consideration of the design procedure related to Article 1), for several patterns, completely different relationships exist between values of attributes required by the user and those to be outputted as results of inference for the requested values. Consequently, the design procedure is completely reversed depending on patterns in some cases. In consequence, the order of execution of conflicting constraints which can be activated varies between the patterns requested by the user. To decide an appropriate design procedure, there is required a mechanism to change the execution order according to the requested pattern.

3) For an object of design, there ordinarily exist several kinds of varieties with respect to the structure and hence a set of attributes and a set of constraints representing an objective product may vary according to the pattern. The conventional method of constraint propagation, however, does not cope with a case where a constraint and/or an attribute are/is changed at an intermediate point.

4) In a case of occurrence of a conflict during the constraint propagation, it is impossible to guide a method of effectively solving the conflict. Experienced engineers have knowledge of, through experiences in the past, qualitative interactions between attributes, a constraint network representing correspondence relationships between the attributes, and the respective attributes and hence possess know-how of countermeasure, namely, which one of the attributes is to be altered or which one of the constraints is to be mitigated. In this situation, there is necessitated a mechanism to utilize the know-how at an occurrence of a conflict in the constraint propagation.

Moreover, there has been developed a language such as "constraint logic programming" in which constraints are expressed in the form of first-order predicate calculus and in which a program is executed on a system of Prolog language. However, the following items are to be considered.

5) Constraints are inputted by a designer of the object of design. Although having knowledge of the design object, the designer is not, in many cases, fully versed in knowledge of language description. Consequently, to possibly avoid instructions requesting the engineer to write constraints in the form of language, it is necessary that constrains can be described in representations such as lists, equalities, and inequalities employed by the designer.

6) In the language processing system, an all-solution search is conducted basically according to a depth-first manner to detect solutions. Consequently, when a conflict occurs during the search, a backtracking operation is accomplished to repeatedly carry out the search until a matching state or integrity is developed, which hence requires a long period of time from when the processing is commenced to when an answer is returned from the system. In a case of a design aiding system of an interactive type, there can be considered a situation where a request is desired to be changed at a point of occurrence of a conflict; however, according to the present processing method, such a change is impossible until the all-solution search is finished.

7) In a case where a set of attributes and/or a set of constraints expressing the object of design are/is altered as described in Article 3), only the number of variations of alteration is increased in association with the size of the search tree in this processing system, which causes a combinational explosion and hence quite a long period of time is consumed for the search. Consequently, when the user desires to attain a satisfactory solution in an interactive manner, this processing system is not suitable.

Another object of the present invention is to provide a design aiding method which can cope with the problems above and can generate a design plan at a high speed.

INPUT NOT-SCALE DRAWING

According to a method for the user to input values requested from a client for specifications and arrangements of apparatuses constituting an object of design, the user extracts requested positions and values of dimensions from drawings on the client side, examines names of attributes corresponding thereto, detects the names on the screen to input values of attributes, and then inputs the values. Moreover, when a design plan cannot be finally obtained, a backtracking of design occurs and hence it is necessary to input again values of attributes to change the specifications of requirements. This increases the number of operations in which the user reads dimensions from the drawings and then inputs the values of the attributes, which leads to a problem that a long period of time is required to input data.

Another object of the present invention is to solve the problem above and to provide a design aiding method having a function in which when there are inputted values of attributes related to a basic structure expressing a contour pattern of a model of design object, a not-scale drawing or diagram is displayed in association with the pattern. When the user clicks an attribute name field of means for inputting requested values of attributes, a check is made to decide correspondence between the respective attributes in the model of design object and the dimensions of the contour of the model so as to present in the not-scale diagram the dimension lines in discriminated shapes and colors. This facilitates the user to confirm the contents of attributes to be inputted and hence can guide the design procedure, which enables the user to input the design data at a high speed.

CONSTRAINT MANAGEMENT OR CONTROL METHOD

The designer considers design in the following order. In an ordinary case of designing a product, it is first considered to adopt, to a possible extent, standard parts, standard manufacturing methods, and the like. However, when the required specifications are severe and hence a solution for design cannot be attained by use of the standard parts, standard manufacturing methods, and the like, the designer then checks uses of particular parts and particular production methods even if the cost and the period of time are increased. Consequently, in a case where there is considered a system which achieves aiding the design according to such constraints, it is necessary to employ the following method. The constraints are described as standard constraints on assumption of the standard parts, the standard fabrication methods, and the like; moreover, non-standard constraints are separately described in consideration of the particular parts, the particular fabrication methods, and the like. First, the design is proceeded by regarding only the standard constraints as effective such that when a conflict occurs, the constraints are sequentially mitigated to the non-standard constraints. In this regard, magnitude of mitigation up to a certain constraint is represented by a constraint mitigation level.

However, since considerations have not been given to a case where a solution for design in the past is utilized or where a design is resumed after the design is temporarily interrupted to conduct another design or after the system is stopped and to a case where a design at an intermediate point is transferred to a design of another department, if the design is resumed in such a case, the contents of decision and judgement conducted in the design operations leading to the design solution or the intermediate results of design are lost. That is, this leads to a problem that information of mitigation of constraints to associated mitigation levels is cleared and the mitigated constraints become to be again effective and hence there is detected a conflict that constraints are not satisfied between the attributes in the solution of design or in the intermediate results thereof, which necessitates the contents of the conflict to be examined again.

Another object of the present invention is to remove the problem above and to provide a design aiding method wherein when a solution of design or an intermediate result of design is adopted to modify a solution of design or to continue a design job, the solution of design can be modified or the design job can be continued according to the mitigated constraints which lead to acquisition of the solution of design or the intermediate result thereof.

GENERATION OF CANDIDATE SOLUTION

In the inference or reasoning methods described above, according to the input values of attributes, constraints which can be activated are sequentially executed to determine values of attributes undecided, namely, there is efficiently obtained a solution of design satisfying requirements. However, depending on requirements of the client, it may be desired to obtain all solutions of design satisfying the requirements.

According to the present invention, there is provided a design aiding system including candidate generating means for attaining, in accordance with constraints and attributes, all solutions of design satisfying the inputted values of attributes.

SUMMARY OF THE INVENTION

In order to achieve the objects above, the design aiding system according to the present invention is configured to include a design data management or control section, a design operation executing section, and a design procedure guiding section. That is, there are disposed a design data control section constituted of design objective model store means for storing therein an attribute model containing therein attributes and attribute values of an object of design and constraint knowledge containing therein constrains between the attributes, input guide means for guiding selection of values in an input operation of required specifications and setting the input values to the attribute model, and design plan display means for outputting a design plan according to values of attributes set to the attribute model as a result of the input or the inference/computation; a design operation executing section formed of local constraint propagation means for conducting, according to values set to attributes in the design object model, an inference/computation for attributes of which values are not determined, candidate solution generating means for conducting, when a plurality of candidate values exist for the respective attribute values or the value has a range, an inference/computation to obtain a combination of attribute values satisfying constraints at the same time or a range of value, and conflict detecting means for checking integrity between the attribute values; and a design procedure guiding section constituted of constraint propagation execution order determining means for generating a network associated with respective attributes and constraints according to the design object model and deciding the execution order of constraint propagation when a request is inputted through the constraint network or when an attribute value beforehand set is changed, and procedure guide means for generating, at an occurrence of a conflict during a design, a method of altering attribute values to solve the conflict or a method of mitigating constraints to mitigate the constraints so as to generate a substitutional design plan.

Moreover, according to the design aiding system in accordance with the present invention, data related to specifications of the apparatuses and the layout are represented as attributes, the relationships of cause and effect between the attributes are expressed by equalities and inequalities between the attributes, and decision procedures of constrains and specifications represented by tables are expressed as decision orders of attribute values through constraint propagation in the constraint network in a unified manner. In addition, since the values of attributes can be determined by propagating constraints through the constraint network in a bi-directional manner, it is not necessarily required to decide the layout after all apparatuses are determined, thereby developing a much more reversible design. Furthermore, only when the user adds attributes and constraints, the constraint network establishing correspondence between the attributes thereafter is created by the design aiding apparatus. Since relationships between a plurality of planes are also included in the constraint network, it is possible to produce a design plan in consideration thereof.

Moreover, in the design aiding system according to the present invention, according to a design object model change function in which a design object model to be used for generation of a design plan is automatically generated in association with inputted specifications of requirements or a change at an intermediate point of design, there is automatically selected an appropriate design object model in relation to a dynamic change in the structure of product, thereby continuing the design.

In addition, in the design aiding system according to the present invention, there is not accomplished the all-solution search in accordance with the description order of knowledge like the unification of the respective attribute values of apparatuses. Namely, there is used the constraint propagation executing order decision means such that according to inputted values of attributes, control flags for lock/unlock specifications of attribute values, and data of design state representing information of setting of new values to attributes and/or modified setting thereof and occurrence of conflicts between attribute values, constraints which can be activated on the constraint network are sequentially detected. When there exist a plurality of constraints which can be activated, an execution order thereof is determined. Alternatively, in a case where an attribute value beforehand set undergoes a change during a design operation, to prevent a conflict between related constraints, other associated attribute values are sequentially modified to determine the execution order of propagation of modification. Thanks to the means, there can be automatically created a design procedure to efficiently determine values of attributes according to the specifications of various requirements.

Moreover, in the design aiding system according to the present invention, in a case where there exist a plurality of constraints to be activated in the operation to determine the execution order of constraint propagation, weight data representing importance beforehand assigned to each attribute and constraint is referenced to achieve a weight comparison between conflicting constraints so as to preferentially execute a constraint having a higher importance. Furthermore, in a case where the conflicting constraints have an identical weight, a weight comparison is achieved between attributes related to the respective constraints to preferentially executes a constraint to which an attribute having a higher importance can be set, thereby controlling the constraint execution order and direction. Consequently, there can be produced an appropriate design procedure matching the requested pattern.

In addition, in the design aiding system according to the present invention, there are used design strategy control means in which a plurality of weight data items representing importance of the respective attributes and constraints are registered such that weight data is read according to a request pattern to assign the data to attributes and constraints and means for the user to select a request pattern, thereby enabling an automatic generation of design procedures associated with various request patterns.

In addition, in accordance with the design aiding system according to the present invention, there are provided procedure guiding means constituted of a conflict removing function in which when there is missing, at an occurrence of a conflict in a process of a design operation, a design plan satisfying all constraints, there is presented a specification change method according to heuristic knowledge accumulated through experiences in relation to the conflict removing method, a constraint mitigating function which mitigates constraints used in the generation of a design plan and which obtains a substitutional design plan possibly satisfying the requested specifications, and a question generating function which computes, when all attribute values are not determined after a portion in which the design operation is possible is executed with the attribute values inputted as the requested specifications, additional input attribute values which enable the largest number of undetermined attribute values to be decided through the constraint propagation so as to instruct the use to input the attribute values. This resultantly reduces the number of trial-and-error operations to be conducted by the user, thereby enabling an efficient design.

Moreover, in the design aiding system according to the present invention, there is used candidate solution generating means in which when there occurs candidate values or a range of value for an attribute of an apparatus or a layout due to constraints, there is created, in consideration of a plurality of constraints on the constraint network, a candidate design plan as a combination of attribute values or a range of values simultaneously satisfying the constraints according to the inter-relationships therebetween. Alternatively, each time a candidate value occurs for an attribute during constraint propagation, a candidate value is sequentially displayed for the user to select a value such that other attribute values are determined in relation to the value through the constraint propagation, thereby enabling the user to visually judge a plurality of design plans possible for the specifications requested.

In addition, there is provided a design aiding apparatus which includes a design aiding method according to the present invention so as to obtain a design solution, thereby outputting and delivering drawings.

Moreover, there is provided a design aiding apparatus which includes a plurality of design aiding apparatuses each having the design aiding method according to the present invention and a file server for storing therein shared data such that intermediate results of design are stored in the file server so as to be referenced from the respective design aiding apparatuses, thereby conducting a cooperative processing.

Furthermore, there is provided a design aiding system configured with a plurality of design aiding apparatuses which are installed in the sales department and which each have a design aiding method according to the present invention, a design aiding apparatus arranged in a firm, and a network establishing connections therebetween. When specifications of particular requirements are presented from a user in the design job, enquiry is issued from the sales department to the designer in the firm to immediately obtain an answer therefrom, thereby generating a design plan.

Furthermore, there is provided a design aiding system configured with a plurality of design aiding apparatuses which are installed in the sales department and which each have a design aiding method according to the present invention, a design aiding apparatus arranged in a firm, and a network establishing connections therebetween. It is possible for the design aiding apparatus on the side of the firm to register and to change knowledge of the model of design object in the design aiding apparatuses on the side of the sales department.

Moreover, a design aiding system according to the present invention includes, to conduct processing to be executed by the design data control section, the design operation executing section, and the design procedure guiding section through an interactive operation with the user, an attribute value input and display screen, an execution command menu display screen, and a design plan display screen. The attribute value input and display screen is used when the user inputs specifications of requirements, namely, there is displayed a list of attribute name fields and attribute value fields. When one of the attribute value fields is selected by the user, the values which can be selected as the attribute value are presented in a menu with characters or graphic images, thereby guiding the input of attribute values. In the execution command menu display screen, there is displayed a command menu to initiate execution of inference. In design plan display screen, there is produced contour data of the model of design object to display a design plan. This helps the user easily input specifications of requirements and facilitates the confirmation of the design specifications of a product decided according to the inference.

Furthermore, in a design aiding system according to the present invention, a function in which the execution state of constraint propagation is traced to display an inference execution trace screen presenting the state in a decision order of attribute values is disposed in the local constraint propagation executing means of the design operation executing section, thereby enabling the user to confirm the execution state of constraint propagation.

In addition, in a design aiding system according to the present invention, the design operation executing section includes a function in which by use of values set to attributes of the model of design object, data of the design state, and constraint knowledge. There is conducted an inference/ computation of values for attributes of which the values are not determined. When there resultantly exist a plurality of combinations of attribute values, there is displayed a screen presenting combinations of attribute values which can be selected. Thanks to this function, the system interactively instructs the user to select one of the combinations, thereby choosing candidates for the processing.

Moreover, according to the interactive design aiding system in accordance with the present invention, there is disposed in the conflict detecting means of the design operation executing section a function in which after the values of attributes are decided through an execution of constraint propagation, all constraints in the form of inequality representing the design standards are checked so as to display a design plan evaluation result screen presenting the results of the check. Consequently, the user can confirm whether or not the design plan satisfies the design standards.

In addition, according to the interactive design aiding system of the present invention, the local constraint propagation executing means of the design operation executing section includes a function in which at an occurrence of a conflict during an execution of constraint propagation, the execution is interrupted to display a conflict occurrence message presenting a message of the contents of the conflicting constraint. Resultantly, unnecessary constraint propagation is not continued after the occurrence of conflict and the user can confirm a position of the problem in the design.

Furthermore, in the interactive design aiding system of the present invention, the procedure guiding means of the design procedure guiding section includes a function in which when a conflict occurs while constraint propagation is being executed, there is displayed a countermeasure plan screen instructing a method of changing values of attributes to solve the conflict, thereby guiding the design procedure.

Furthermore, according to the design aiding system of the present invention, the procedure guiding means of the design procedure guiding section includes a function in which when there is not attained a solution of design satisfying the constraints, the system displays the contents of constraint mitigation to mitigate the constraints so as to create a substitutional design plan, thereby developing a design plan almost satisfying the requirements of the user.

In addition, in the design aiding system according to the present invention, the procedure guiding means of the design procedure guiding section includes a function in which when there is missing a constraint which can be subjected to execution of propagation, in order to continue constraint propagation, the system determines, among the values of attributes not determined, attributes to which values are to be inputted so as to display an enquiry generation screen sending enquiry to the user, thereby achieving a design free from any missing item.

Moreover, according to the design aiding system of the present invention, there is disposed a control panel screen displaying an inference mode selection menu to select an inference mode (sequential selection) or an inference mode (candidate retaining operation). In the former mode, at an occurrence of a plurality of combinations of attribute values which can be selected during an inference, a sequential attribute value selection combination screen is displayed to conduct processing in which the system instructs the user to select appropriate values. In the latter mode of the same situation, without displaying the screen, the inference is continued while retaining the values as candidate values in the value ranges of the respective attributes of the attribute model so as to achieve processing. In this operation, after the inference is finished, the candidate values of attribute values are displayed in the different colors in the menu of the attribute value input and display screen. This resultantly enables the user to select an inference execution processing pattern.

In addition, in the design aiding system according to the present invention, there is included in the control panel screen a request pattern number selection menu capable of selecting various design requests from the user. Consequently, the design strategy control means of the design data control section reads, from data of importance registered for the respective attributes and constraints for each request pattern, importance items respectively of attributes and constraints corresponding to the request pattern number to set the importance items thereto. Based on the importance items, the execution order of constraint propagation is determined to generate an appropriate design procedure suitable for the various requests from the user.

Moreover, according to the design aiding system of the present invention, in the control panel screen, there is disposed a selection menu for storage/non-storage of design history information and for display/non-display of the inference execution trace screen, which enables the user to select a case where the inference execution state is desired to be confirmed or a case where the state is not required to be confirmed.

Furthermore, according to the design aiding system of the present invention, in the control panel screen, there is disposed a selection menu to select display/non-display of a graphic menu in an operation to input values of attributes, which enables a selection to be conducted between a case where the user is a beginner and necessitates an input guidance of attribute values and a case where the user is an expert and does not require the input guidance.

In addition, in the design aiding system according to the present invention, there is disposed an attribute value color display function which judges, in the attribute value input and display screen, to decide that each of the values set to attributes of the attribute model is a value inputted by the user, a default value, or a value set through an inference, thereby displaying the values in the different colors. This resultantly enables the user to easily confirm the reason why the attribute values are determined.

Moreover, according to the design aiding system of the present invention, in the attribute value input and display screen, there is disposed a header item list menu having a function in which attributes are classified for each constituent apparatus of the model of design object so as to display the results of classification as header items in a list and a function in which when a header item is selected by the user, only the attribute name and value fields in the range of the selected header item are displayed in a list on the attribute value input and display screen. Consequently, even when the number of attributes is increased, the user can easily detect attributes to be inputted.

Furthermore, according to the design aiding system of the present invention, in the header list menu, there is disposed a function in which header items are displayed in the different colors between a case where the attribute values in the range of the respective header item are completely determined and a case where at least one of the attribute values is not determined. As a result, the user can easily judge to determine whether or not all attribute values are completely decided.

Moreover, according to the design aiding system of the present invention, in the attribute value input and display screen, when the value of attribute is represented by a numeric value, the system displays an inequality as a range of value in a menu to indicates the input value range to the user.

In addition, in the design aiding system according to the present invention, the attribute value input and display screen possesses an attribute lock/unlock setting field to set a lock specification or an unlock specification with respect to the value of each attribute in the attribute model. For an attribute value of requested specifications for which the user requests to refuse change in the value during inference, when the lock/unlock field of the attribute is clicked, the value is locked. As a result, during execution of the design operation, with the locked attribute value kept unchanged, the other attribute values are altered to create a design plan satisfying the requested specifications.

Moreover, according to the design aiding system of the present invention, in the attribute value input and display screen, when an attribute lock/unlock field of a locked attribute value is again clicked, the value is set again to the unlocked state, thereby releasing the lock request in an easy manner.

Furthermore, according to the design aiding system of the present invention, the execution command menu display screen presenting a command menu to initiate execution of inference includes a procedure guide command menu executing a procedure guide function in which when a conflict occurs during a design, there is instructed an attribute value change method or constraints are mitigated to generate a substitutional design plan; a discussion diagram display command menu executing display of a design plan based on attribute values determined after the execution of inference, a control panel command menu calling and displaying a control panel screen in which the inference mode is set, and a system end command menu. This enables the user to easily choose a desired function.

Furthermore, according to the design aiding system of the present invention, the attribute value input and display screen has a function in which when there is inputted an attribute value related to the fundamental structure representing a contour pattern of the model of design object, contour data of a not-scale drawing beforehand registered for each contour pattern is retrieved with the inputted attribute value set as a retrieval key so as to display the data and a function in which when the user clicks an attribute name field in the attribute value input and display screen, judgement is conducted to decide correspondence between each attribute of the attribute model to a dimension of the contour of the model of design object so as to display dimension lines in different contours and colors on the not-scale drawing. Namely, there is disposed a not-scale drawing display function to input attribute values, thereby helping the user to easily confirm the contents of attributes to be inputted.

Moreover, in the design aiding system according to the present invention, there is disposed a function for simultaneously displaying the attribute value inputting and displaying screen, the not-scale drawing screen for inputting attribute values, and/or the design plan display screen together with the inference execution and procedure guide command menu. This enables to compare the contents of the attribute values inputted by the user with the design plan generated according to the input attribute values so as to facilitate the user to evaluate the design plan; moreover, when there exists any problem, the procedure guiding function can be immediately selected to easily conduct operation of counter-measure.

In addition, there is provided a design aiding system including a function in which when an attribute value is altered or a conflict occurs at an intermediate point of generation of a design plan or during a design for input attribute values, in order to arrange a set of attributes and a set of constraints necessary for the structure of product, the design object model change function automatically changes attributes and constraint knowledge of the model of design object to be used for generation of a design plan and then displays a list of attribute name fields and attribute value fields undergone the change. Moreover, when one of the attribute value fields is selected by the user, values which can be selected for the attribute value after the change are displayed in a menu represented with characters or graphic images. Which consequently enables the user, even when the product structure is varied, to input values of attributes while retaining integrity therebetween.

Moreover, a design aiding apparatus according to the present invention includes a function in the input guidance means of the design data control section for displaying a new/old registration data selection screen capable of selecting at an initiation of the design aiding system a case in which the user desires to generate a design plan for a new item or a case in which the user desires to modify a design plan of an item beforehand generated, thereby enabling the user to select either one of the cases according to the purpose of operation.

Furthermore, according to the design aiding system of the present invention, there is further included a design model constructing section constituted of a function to display an attribute model construction and modification screen in which attribute item names and values are registered and/or modified and a function to display a constraint knowledge registration and modification screen in which knowledge of constraints and procedure know-how is registered and/or is modified. This resultantly facilitates the construction of the model of design object.

Moreover, in a design aiding apparatus according to the present invention, there are disposed activation constraint extracting means for extracting, according to weight data representing importance of constraints and attributes and data of directions to which constraints can be propagated, constraints which can be activated for an input attribute value and activation constraint judge means for solving conflicts when there exist a plurality of constraints which can be activated, thereby generating a design plan suitable for a request.

In addition, there is provided a design aiding system having design strategy knowledge for storing therein weight data of the respective constraints and attributes for each of a plurality of request patterns so as to discriminatingly use a design procedure in association with a user's request pattern in which values of attributes requested by the user are completely different from those to be outputted as a result of inference accomplished on the requested attribute values, thereby producing a design procedure suitable for the request.

Furthermore, according to the design aiding system of the present invention, there are included product structure knowledge defining a set of attributes possible for each product structure and model change means for changing, based on a condition to use constraints in the constraint knowledge, the set of constraints and the set of attributes to be used for constraint propagation. This enables the sets of constraints and attributes to be dynamically changed to accomplish an inference.

In addition, a design aiding system according to the present invention includes countermeasure know-how advising means in which at an occurrence of a conflict during an inference, the inference is interrupted at the point to issue a warning message of the state of conflict. When a countermeasure plan is selected by the user, the system advises a conflict solving method based on the countermeasure know-how thereof in relation to a change of the product structure, mitigation of constraints, and alteration of input attribute values. The design aiding system further includes constraint mitigating means to select constraints which are selected for mitigation by the user according to the advice and to alter constraint levels. Resultantly, the system can rapidly cope with a case of an occurrence of a conflict.

Furthermore, according to the design aiding system of the present invention, constraints can be described in the form of a table or list, an equality, and/or an inequality such that the user not having sufficient knowledge to describe such items in a language can register knowledge to the system.

Moreover, in a design aiding system according to the present invention, there are disposed not-scale drawing retrieval means in which when there is inputted an attribute value related to the basic structure representing a contour pattern of the model of design object, not-scale drawing data beforehand registered for each contour pattern is retrieved with the inputted attribute value set as a retrieval key and not-scale drawing display means which displays the retrieved not-scale drawing such that when the user clicks an attribute name field in the attribute value input and display screen, the system judges to determine a correspondence between each attribute of the attribute model to a dimension of the contour of the model of design object so as to display dimension lines in different shapes and colors in the not-scale drawing. This resultantly helps the user easily confirm the contents of attributes to be inputted. Furthermore, there is disposed not-scale drawing data registration means for registering not-scale drawing data, correspondences between graphic data and attribute names, and retrieval conditions of the not-scale drawing, thereby facilitating the construction of the not-scale drawing data.

Furthermore, according to the design aiding system of the present invention, there is disposed a constraint mitigation level storage section for keeping therein constraint conditions mitigated to attain a solution for design or an intermediate result of design and mitigation levels. In addition, there is disposed a design purpose storage section for storing therein purposes for which the constraint conditions are mitigated.

Moreover, according to the design aiding system of the present invention, there is disposed a candidate solution generating means for outputting candidates of all design solutions possible for the request, which enables the user to select one of the candidate solutions as a design solution, the candidate solution being most similar to the desired solution.

FUNCTION

In the design aiding apparatus having the design aiding system above, processing is executed from a workstation or the like. First, a menu to select a design pattern is displayed on the display by the design strategy control means of the design data control section. When a sales engineer as the user selects a design pattern, the design strategy control means assigns weight data of the respective attributes and constraints registered for each design pattern to the attributes and constraints in the design object model store means. Next, a menu related to the respective attribute values of the design object is presented on the display by the attribute input guide means of the design data control section. When the user inputs an attribute value requested by the customer, the inputted attribute value is set to an associated attribute of the attribute model in the design object model store means.

When the input is finished, the design data control section automatically selects, in association with the inputted specifications of requirements, a type of the design object model to be used for generation of a design plan. Subsequently, referring to the setting state of attribute values and the design state such as "new value setting", "value modification", or "occurrence of conflict", the design procedure guiding section determines a procedure to obtain a solution for design. For example, when the design state is "new value setting", the constraint propagation execution order determining means of the design procedure guiding section is activated to reference attribute values already set and presence or absence of the lock or unlock specification for the attribute values so as to extract constraints which can be activated. In a case where a plurality of constraints are extracted, there is determined a constraint for an execution of a new constraint propagation. Furthermore, when the design state is "modification of value", for an attribute of which the value is modified, constraints which can be activated are extracted according to the presence or absence of the lock or unlock specification for the attribute value. In a case where a plurality of constraints are extracted, there is determined a constraint for an execution of a new constraint propagation such that a constraint name and an attribute value related thereto is sent as data of the design procedure to the design operation executing section. In this operation, when there are extracted a plurality of constraints which can be activated, a weight comparison is accomplished between the conflicting constraints to decide as an activation object a constraint having the highest importance value. Furthermore, in a case where there exist a plurality of constraints having the highest importance value, a comparison is conducted between weights of attributes related to the conflicting constraints, thereby deciding as an activation object a constraint to which an attribute having the higher importance value can be set.

When the design state is "occurrence of conflict", the procedure guide means is initiated to create an attribute value change method to remove the conflict. When such a method of solving the conflict is missing, constraints are mitigated through an automatic operation or through an interactive operation by the user, thereby generating a substitutional design plan.

The design operation executing section attains a design solution according to the constraints instructed by the design procedure guiding section and then stores the value in the design data control section. In the design operation executing section, attribute values beforehand set are assigned to the attributes of parameters of the constraints represented in the form of an equality by the local constraint propagation means so as to compute values of attributes not determined, thereby storing the results in the attribute model of the design object model in the design data control section. Alternatively, attributes values beforehand set are assigned to the attributes of parameters of the constraints represented in the form of a table by the candidate generating means so as to retrieve values of attributes not determined, thereby obtaining a combination of attribute values. As a result, when there exist a plurality of combinations, a plurality of constraints are considered on the constraint network so as to reduce, according to inter-relationships therebetween, the number of combinations of candidate attribute values. Alternatively, the combinations of attribute values are sequentially presented on the display for the user to interactively select items so as to minimize the number of the candidates. The selected combinations of attribute values are stored in the attribute model of the design object model in the design data control section. Alternatively, attribute values set in advance are assigned to all attributes of parameters of the constraints represented in the form of an equality, a table, or an equality by the conflict detecting means so as to check to determine whether or not the equality or inequality holds or whether or not an identical combination of attributes exists in the table, thereby storing the results in the attribute model of the design object model in the design data control section. When the conflict check results in O.K., namely, where there does not exist any conflict, the design procedure guiding section executes the constraints for which constraint propagation can be accomplished with the attribute values including the new value set. When the conflict check results in N.G., namely, when there occurs a conflict, a conflict solving operation or a constraint mitigation is executed by the procedure guiding means described above. When the user selects a conflict solving operation or an item of the contents of constraint mitigation, the design operation executing section modifies the attribute values according to the selection and then stores the values in the attribute model. In a case where there still remain undetermined attribute values and there does not occur any conflict, the design processing is interrupted. To overcome this difficulty, the system sends to the user, by the enquiry generating function, an enquiry for an attribute which, if the value thereof is inputted, enables computation of the possibly large number of undetermined attribute values. When the user inputs an answer, a value related thereto is set to the attribute model. The constraint propagation is accordingly executed. In a case where after the processing above is repeatedly executed, all attribute values of the design object model are set and there does not occur any conflict, it is assumed that a design plan has been generated. The design data control section thereby presents the design plan on the display. Moreover, when an attribute value is changed during the design, the design data control section changes the set of attributes and a set of constraints which are design object model to be used for generation of a design plan so as to continue the designing process in association with a dynamic change in the structure of product.

As above, with provision of the design data control section and, the design procedure guiding section, and the design execution operating section, when a request from the client is inputted as a value of attribute or when a value of attribute beforehand set is modified, a design procedure is determined according to constraint knowledge between attributes and possibility or non-possibility of change of each attribute, thereby interactively obtaining a design plan satisfying the request. In addition, the order and direction of execution of constraints are controlled according to importance of constraints and importance of attributes. Consequently, using importance data of the attributes and constraints registered for each request pattern, there can be automatically created design procedures associated with various request patterns. Furthermore, when a conflict occurs at an intermediate point of a design, a substitutional design plan is produced according to a conflict solving method and constraint mitigation so as to guide a design procedure for the user, thereby correctly accomplishing the design in a short period of time. Furthermore, drawings can be outputted and/or delivered according to the results.

SCREEN AND OPERATION

Moreover, in the design aiding apparatus of an interactive type having the design aiding system, the processing is carried out from a workstation or the like. When the interactive design aiding system is initiated, the attribute value input guiding means of the design data control section presents a new/registered item data selection screen on the display. When "New" is selected by a sales engineer as the user, the guiding means displays a control panel screen on the display to present therein an inference model selection menu, a storage/non-storage selection menu for inference execution trace information, a display/non-display menu for the inference execution trace screen, and a display/non-display menu for a graphic menu. In addition, the design strategy means of the design data control section displays a selection menu for a request pattern number on the control panel screen. When the sales engineer as the user chooses a design pattern, the design strategy control means assigns weight data of the respective attributes and constraints registered for each design pattern to attributes and constraints in the design object model storage means. Moreover, when the user next selects an inference mode, design history information, an inference execution trace screen, and a graphic menu, there are set data items thereof in the control section. When the setting is completed, the attribute value input guiding means of the design data control section presents the attribute value input and display screen for a design object on the display.

Alternatively, in the new/registered item data selection screen, when the sales engineer as the user selects a registered item, the attribute value input guiding means of the design data control section reads data of the registered item from a history data base to present the obtained value in the attribute value input and display screen for a design object on the display.

Subsequently, in a case where the user inputs a value of attribute requested by the client, when the user clicks an attribute value field corresponding to the request in the attribute value input and display screen, a list of values which can be selected for the attribute value is displayed with characters, as a range of values, or in a graphic menu. When a value is selected therefrom, the selected attribute value is set to the associated attribute of the attribute model in the design object model storage means. In addition, for any one of the input attribute values for which the user has inhibited the change of the value thereof in an inference, when the lock/unlock setting field of the attribute is clicked, the attribute value is set to the locked state. In this case, as a method of inputting attribute values, there may be displayed a list of header items of attributes such that when the user chooses one of the header items, an attribute of the header item is displayed in the attribute value input and display screen. Furthermore, there may also be conducted the following operation in a case where values of attributes relate to contour of a design object. When a contour pattern of a design object is inputted, a not-scale drawing beforehand registered to the system is presented to indicate, by use of a dimension line, correspondence between the attribute associated with the request of the client to a dimension of the contour, thereby achieving a guide for design.

When the request input is finished by repeatedly conducting the operation, the user clicks the inference execution command menu. The design data control section then automatically selects, according to the inputted specifications of requirements, a type of the design object model to be used for creation of a design plan. Next, referring to the setting state of attribute values and the design state such as "setting of a new value", "modification of a value", or "occurrence of conflict", the design procedure guiding section decides a procedure to attain a solution for design. For example, when the design state is "setting of new value", the constraint propagation executing order decision means is activated in the design procedure guiding section to access constraint knowledge stored in the design object model storage means in the design data control section so as to extract therefrom, by referencing attribute values beforehand established and presence or absence of lock/unlock specification for each attribute value, constraints which can be activated. When a plurality of constraints are extracted, there is decided a constraint for execution of the new constraint propagation. Moreover, when the design state is "modification of a value", for the attribute of which the value is modified, there are selected, according to presence or absence of lock/unlock specification for the attribute value, constraints which can be activated. When a plurality of constraints are extracted, there is decided a constraint for execution of the modification propagation and then a name of the constraint and attribute values related thereto are transmitted as data of the design procedure to the design operation executing section. In this situation, when a plurality of constraints which can be activated are extracted, a weight comparison is accomplished between the conflicting constraints to determine a constraint having the highest importance level. In addition, when there exist a plurality of constraints having the highest importance level, a weight comparison is carried out between the attributes associated with the conflicting constraints to determine as an activation object an attribute to which an attribute having a higher importance can be set.

The design operation executing section obtains a solution for design according to the constraint indicated by the design procedure guiding section and then stores the value thereof in the design data control section. In the design operation executing section, attribute values beforehand set are assigned by the local constraint propagation means to the attributes of parameters of constraints represented by an equality so as to calculate values of undetermined attributes, thereby storing the results of calculation in the attribute model of the design object model in the design data control section. In the control panel screen, when the inference execution trace screen is set as "display", the inference execution trace screen is displayed to sequentially present attribute values set through the inference or computation.

Alternatively, attribute values beforehand set are assigned by the candidate solution generating means to the attributes of parameters of the constraint represented in a table so as to retrieve values of undetermined attributes, thereby obtaining combinations of attributes. As a result, when there exist a plurality of such combinations, in consideration of a plurality of constraints on the constraint network, the number of combinations of candidate attribute values is reduced according to inter-relationships therebetween.

In a case where there arise in an inference a plurality of combinations of attribute values, if "sequential selection" has been set in the inference mode, an attribute value selecting combination screen is sequentially presented on the display to instruct the user to interactively select an item, thereby determining attribute values from the candidate combinations. The selected combination of attribute values is stored in the attribute model of the setting object model in the design data control section. Or, if "retaining of candidate" has been selected in the inference mode, the values are kept retained as candidate values in the range of values of the respective attributes of the attribute model so as to continue the inference. After the inference is finished, the candidate values are displayed in the different colors in the menu of attribute values on the attribute value input and display screen.

Alternatively, attribute values beforehand set are assigned to all of the attributes of parameters of the constraint represented by an equality, a table, or an inequality to check to determine, by the conflict detecting means, whether or not the equality or the inequality holds or whether or not the table contains identical combinations of attribute values, thereby storing the results in the attribute model of the design object model in the design data control section. In a case where the conflict check results in O.K., namely, when there is obtained a result of "absence of conflict", if there exists a constraint for which the constraint propagation can be executed with the attribute value thus set as a new value, the design procedure guiding section executes the constraint propagation. When the conflict check results in N.G., namely, when the design state indicates "occurrence of conflict", the execution of constraint propagation is interrupted to display a conflict occurrence message screen presenting a message of the constraint for which the conflict occurs. Or, at the final step of the execution of constraint propagation, a check is made for a constraint in the form of an inequality representing a design standard such as "whether or not the attribute value is greater than the minimum allowable value", thereby displaying the results of the check in the design plan evaluation result screen.

At this point, when the user clicks the procedure guide command menu to attain a method of solving the conflict, the procedure guiding means is initiated to generate a method of changing attribute values to solve the conflict so as to display the countermeasure plan screen such that the user selects items of the contents of conflict solving operation. If such a method of solving the conflict is missing, when a constraint mitigation is to be carried out in an automatic fashion or by the user through an interactive operation, there is displayed a constraint mitigation contents display screen for selection of constraint mitigation to a level associated therewith. Thereafter, when the inference execution command menu is again clicked, the design operation executing section modifies the attribute values and then stores the values to the attribute model. By repetitiously conducting the operation, there is produced a substitutional design plan.

When there still remain attribute values to be determined and there dose not exist any conflict, the design processing is interrupted. To overcome this difficulty, by the enquiry generating function, there is created an attribute which enables the possibly largest number of undetermined attribute values to be calculated when a value is inputted to the attribute so as to display the inquiry generation screen to request the user to input the attribute value. In response to an answer from the user, the value is set to the attribute model such that the constraint propagation is accomplished according thereto. Through repeatedly conducting the processing above, in a case where all attribute values of the design object model are set and there dose not occur any conflict, when the user clicks the check or discussion diagram display command menu, the design plan display data generating means of the design data control section presents a design plan display screen on the display. Moreover, in the attribute value input and display screen, the respective attribute values are displayed in the different colors according to a condition, namely, each thereof is a value inputted by the user, a default value, or a value established through an inference.

In addition, when an attribute value related to the structure pattern of the product is altered during the design, the design data control section changes a set of attributes and a set of constraints as the design object model to be used for creation of a design plan and then displays the attribute value input and display screen undergone the change, which enables the user to input and to display the attribute values with integrity. Resultantly, it is possible to continue the design in association with a dynamic change in the structure of product.

As above, there are disposed display screens to achieve processing of the design data control section, the design procedure guiding section, and the design execution operating section through an interactive operation with the user. Consequently, when a request from the client is inputted as variables of attributes or when values of attributes beforehand established are modified, a design procedure is decided according to constraint knowledge between the attributes and possibility or impossibility of change of each attribute value, thereby interactively obtaining a design plan satisfying the request.

CONSTRUCTION FROM DIFFERENT POINT OF VIEW

The design aiding system operates as follows. First, the input guiding means displays the attribute input screen and a menu of request patterns having the contents to be examined. When the user selects request attribute values and a request pattern, attribute values related to classification of the structure of product are selected from the requested attribute values such that the model change means decides according thereto a set of attributes to be used for an inference by use of a product structure knowledge and then extracts attribute data of the attribute set from an attribute model knowledge base, thereby developing the data on the attribute model. Moreover, the model change means extracts from the constraint knowledge base constraints related to the developed attributes and any constraints which become to be available according to the inputted attribute values so as to develop the constraints on the constraints knowledge. Next, the design strategy control means reads from the design strategy knowledge importance of the constraints and attributes associated with the value of requested pattern to set the importance to the attributes and constraints on the attribute model and the constraint knowledge on which the attributes and constraints to be used for an inference are developed. Subsequently, the input guiding means sets the inputted attribute values to the developed attributes.

Next, when the inference is started in response to a selection by the user, the activation possible constraint extracting means extracts constraints which can be activated for the inputted attribute values. In the extraction, the form (table, equality, inequality) of each constraint and the direction of activation thereof are judged. In a case where there exist a plurality of constraints which can be activated and there occurs a conflict, the activation constraint judge means judges to determine, according to importance of the conflicting constraints and attributes, a constraint having a higher importance and being related to highly important attributes for which the values are determined, thereby notifying the constraint to the local constraint propagation means. In this means, the contents of the constraint indicated by the activation constraint judge means is read so as to compute, according to the activation form, the undetermined attribute values and modified attribute values. Moreover, the conflict detecting means detects a constraint for which a conflict occurs during an execution of the local constraint propagation. When the means detects a conflict, the inference is interrupted and the occurrence of conflict is reported to the user. In this situation, when the user selects a countermeasure plan, the countermeasure know-how advice means advises a method of changing the product structure to remove the conflict, a method of mitigating the conflicts, and a method of altering the attribute values inputted as a request.

In a case where the user selects a change in the product structure and the attribute values of the product structure are accordingly changed, the model change means operates with the changed values to set, based on utilization conditions in the product structure knowledge and the constraint knowledge base, constraints which become not to be used due to the changed values and constraints related thereto to the inactive state and to set constraints conforming to the utilization conditions to the active state. A set of attributes and a set of constraints changed as a result of the operation above are developed on the attribute model and the constraint knowledge which are adopted for the inference. Thereafter, the execution of constraint propagation is again initiated.

Alternatively, when the user selects mitigation of constraints, the constraint mitigation means changes the mitigation level of a constraint selected by the user so as to thereafter execute again the constraint propagation.

Alternatively, when the user selects modification of attribute values, the constraint propagation history retaining means extracts input attributes related to the constraint for which the conflict occurs, and then reverse propagation means calculates values for modification of the input attribute values. The user selects the modification values to start again the constraint propagation.

The processing above is repeatedly accomplished to determine without conflict all attribute values to be used in the inference. When the attribute values are obtained in the state free from conflict, the design solution display means displays the attribute values and a design object contour associated therewith. When the inference is terminated with undetermined attribute values, the enquiry generating means creates an enquiry to request the user to input the undetermined attribute values.

As above, the design aiding system according to the present invention is capable of producing design procedures associated with various requests so as to continue the inference even in a case associated with a structure change. Moreover, since the know-how can be acquired, a design solution can be obtained by rapidly solving conflicts in an interactive manner.

NOT-SCALE DRAWING FOR INPUT

In the design aiding apparatus developing a not-scale drawing display, the processing is executed from a workstation or the like. When the apparatus is initiated, a request from the user is inputted. In the input operation, when an attribute value of a basic structure representing a contour pattern of the design object is inputted, the not-scale drawing retrieval means is activated with the attribute value set as the retrieval key to retrieve a not-scale drawing corresponding to the key. Next, when the drawing is retrieved, not-scale drawing display means displays the drawing. In the drawing, when an attribute field of the request attribute value input means is clicked, dimensions associated with the attribute of the design object are presented with dimension lines in the different colors and shapes. Thanks to the presentation of the not-scale drawing, correspondence between the attribute associated with the request of the client and a dimension of the contour is indicated by a dimension line, thereby correctly achieving an input of design data at a high speed.

CONSTRAINT CONTROL SYSTEM

The design aiding apparatus including the constraint control method is implemented on a design aiding apparatus including a workstation or the like, on a system including a plurality of design aiding apparatuses, or on a design aiding system constituted of a plurality of design aiding apparatuses and a file server.

During a design work conducted by a designer using the design aiding apparatus, intermediate design information in the design, information related to mitigated constraint conditions and constraint mitigation levels, and design purposes causing the mitigation of constraint conditions are stored in the attribute value storage, the constraint mitigation level storage, and the design purpose storage, respectively. At termination or interruption of a design, information items of the attribute value storage, the constraint mitigation level storage, and the design purpose storage are mutually related to each other so as to be stored in the design solution/intermediate design result storage, the constraint mitigation level storage, and the design purpose storage.

In a case where a design solution is modified or a design job is continued according to a design solution or an intermediate design result, data of the design solution or the intermediate design result as well as data of constraint conditions mitigated and mitigation levels used to obtain the design solution or the intermediate design result and design purposes for mitigation of constraint conditions are transferred between the respective design aiding apparatuses. Consequently, without losing the contents of decision making and judgement conducted in the preceding design work, it is possible to modify the design solution or to continue the design job.

GENERATION OF CANDIDATE SOLUTION

Moreover, in the candidate solution generating means, according to candidate values of attribute values occurring in an execution of constraint propagation, there are created combinations of respective candidate values to achieve constraint propagation of the respective combinations such that any combinations for which a conflict occurs at an intermediate point are discarded, thereby displaying as candidate solutions the combinations free from conflict and attribute values determined by the combinations.

BRIEF DESCRIPTION OF THE DRAWINGS

These and other objects and advantages of the present invention will become apparent by reference to the following description and accompanying drawings wherein:

FIG. 6 is a diagram for explaining the contents of the respective attributes of an attribute model;

FIG. 7 is a diagram useful to explain the contents of constraint knowledge;

FIG. 8 is a diagram showing a control table of constraint activation conditions;

FIG. 13 is a diagram for explaining the structure of an elevator;

FIG. 15 is a diagram showing a concrete example of a request pattern;

FIG. 16 is a diagram useful to explain the contents of attributes of an attribute model in the second embodiment;

FIG. 17 is a diagram useful to explain the contents of constraint knowledge in the second embodiment;

FIG. 18 is a diagram showing conditions of constraint activation in the second embodiment;

FIG. 19 is a diagram for explaining a state in which constraints are kept retained in the second embodiment;

Figure 26:
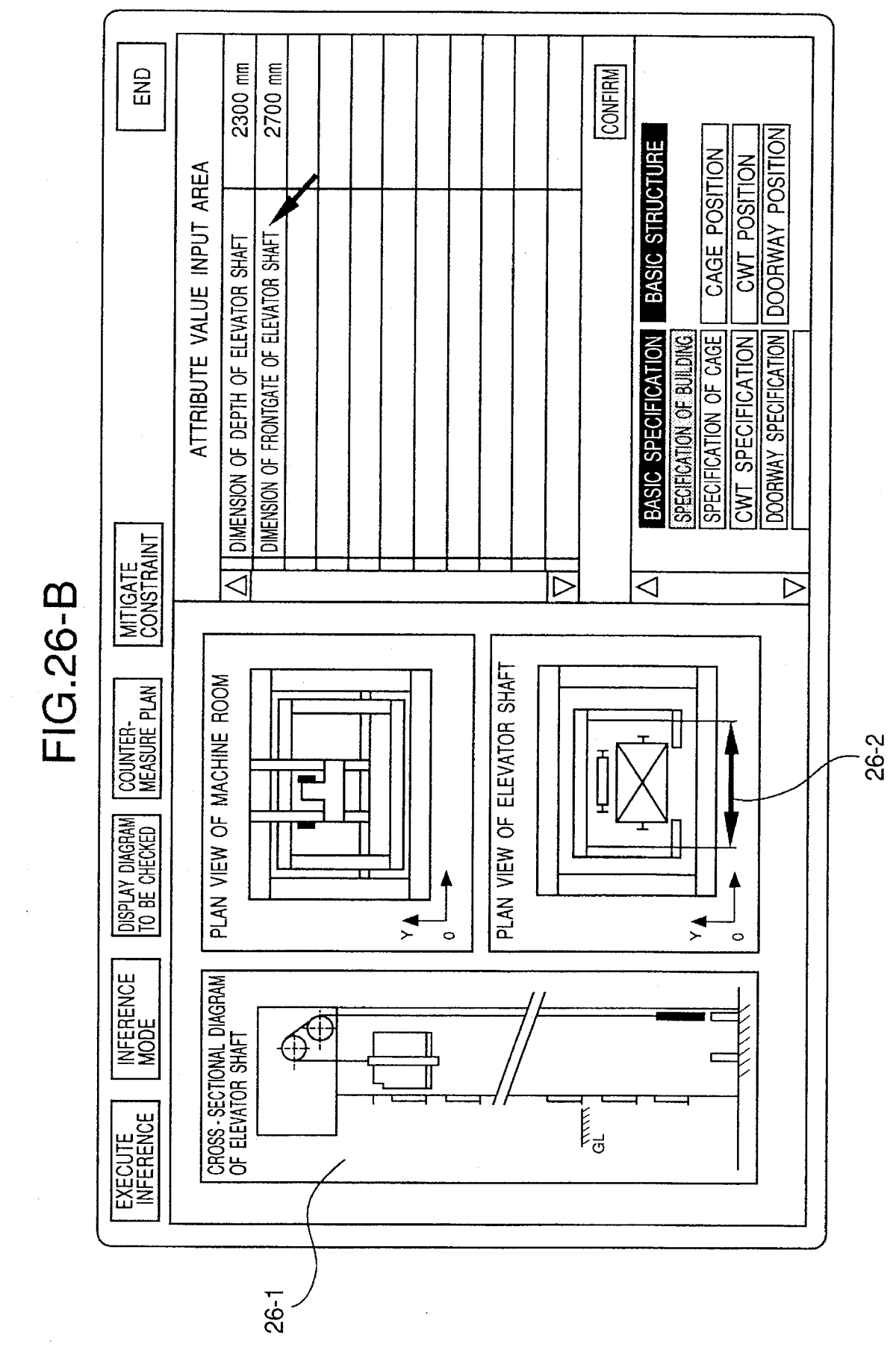

FIGS. 26, 26(A) and 26(B) are diagrams showing a not-scale screen for inputting attribute values;

Figure 27B:
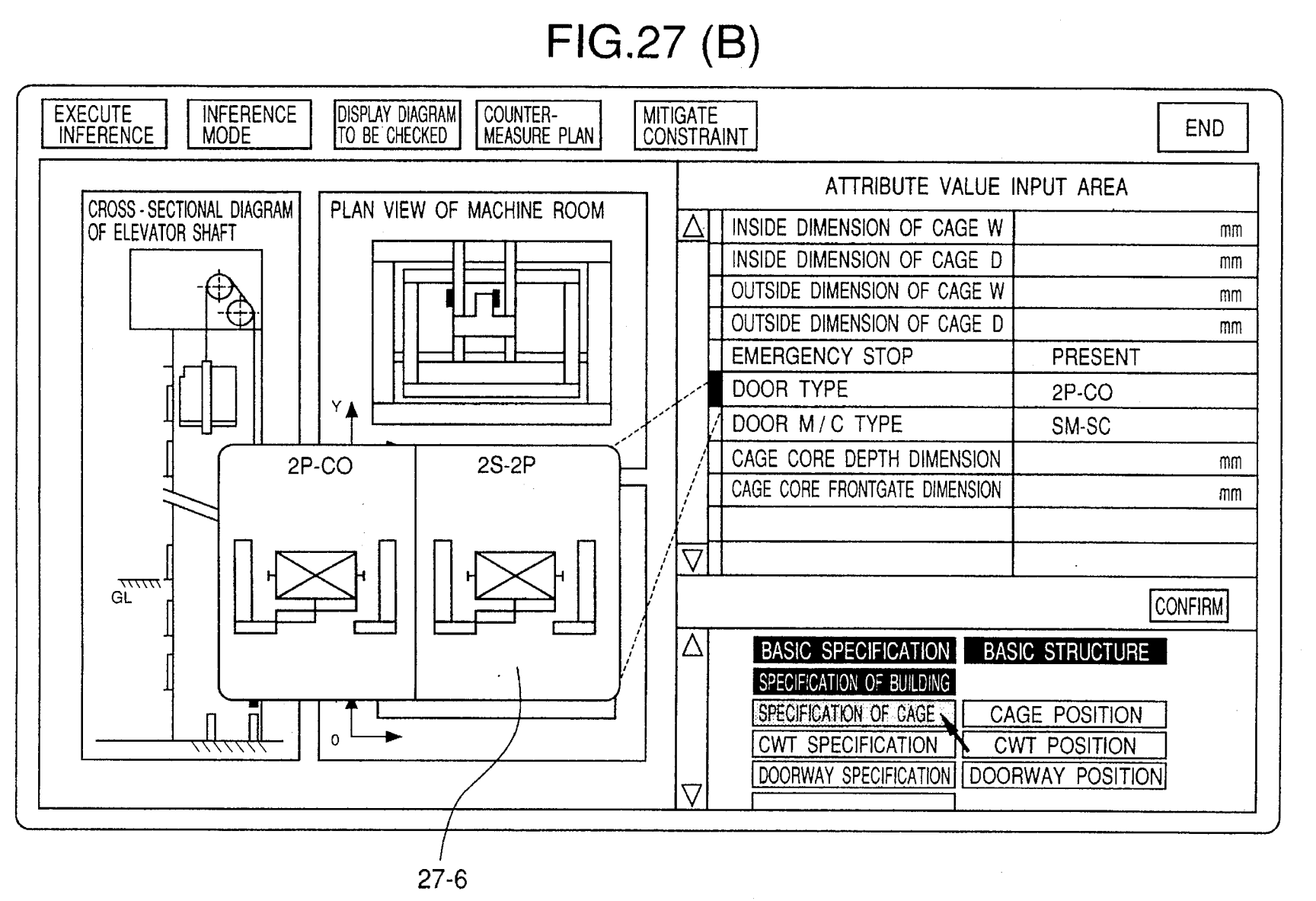

FIGS. 27(A) and 27(B) are diagrams respectively showing an attribute value input and display screen and a screen presenting an attribute value input menu and a command menu for execution of functions;

FIGS. 30, 30(A) and 30(B) are diagrams showing a conflict occurrence message screen;

FIG. 32 is a diagram showing a countermeasure plan screen;

FIGS. 34, 34(A) and 34(B) are diagrams showing an enquiry generation screen;

FIG. 36 is a diagram showing a design plan display screen;

FIG. 39 is a diagram showing an example of a model change for a set of attributes;

FIG. 40 is a diagram showing an example of a model change for a set of constraints;

FIG. 43 is a diagram showing the description format of attribute data;

FIG. 58 is a diagram showing the construction of not-scale drawing data;

FIG. 63 is a diagram for explaining the structure of an elevator;

FIG. 65 is a diagram for explaining the contents of constraints in a constraint knowledge base;

FIG. 67 is a diagram showing the construction of a constraint mitigation level storage;

FIG. 68 is a diagram showing the configuration of a design purpose storage;

FIG. 70 is a diagram showing a selection list produced as a result of candidate solution creation.

DESCRIPTION OF THE PREFERRED EMBODIMENTS

Referring now to FIGS. 1 to 13, description will be given of a design aiding apparatus in a first embodiment according to the present invention.

Figure 1:
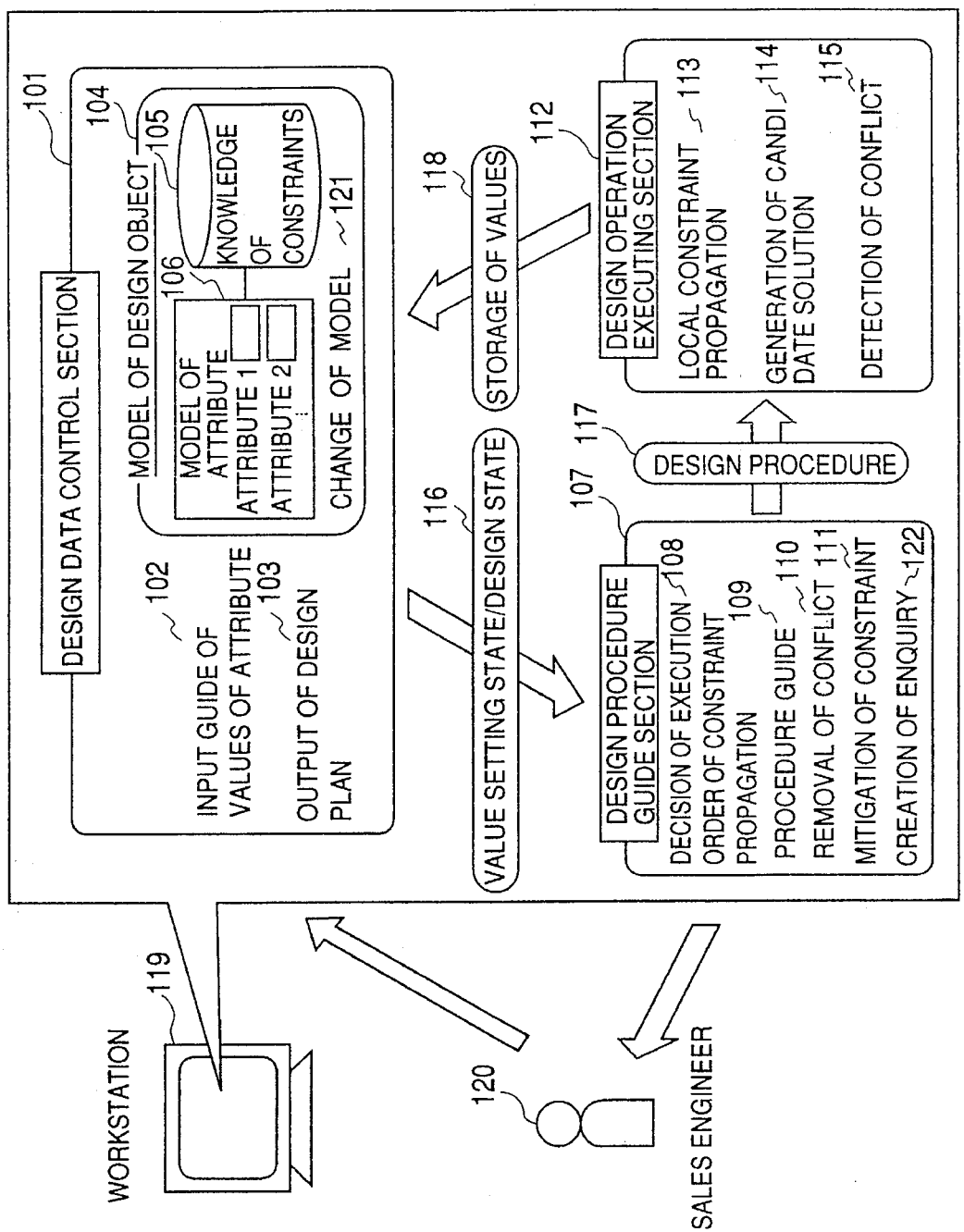
FIG. 1 is a functional configuration diagram showing an embodiment of a design aiding system according to the present invention.

FIG. 1 is a diagram showing an outline of the functional configuration of a design aiding apparatus in a first embodiment including a design aiding system according to the present invention. In FIG. 1, a reference numeral 101 denotes a design data control or management section for storing therein attribute models and constraint knowledge of design object models, inputting therefrom attribute values, and displaying a design plan; a numeral 102 denotes an attribute value input guiding function for generating an input menu to input attributes requested by a client or customer, a numeral 103 designates design plan display means for displaying a design plan satisfying the request, a numeral 104 indicates a design object model including an attribute model and constraint knowledge, a numeral 105 denotes constraint knowledge for storing therein constraints in which relationships between attributes are expressed in equalities, inequalities, and tables, a numeral 106 stands for an attribute model for storing therein specifications of a product described in combinations of attribute names and attribute values, a numeral 121 designates a model change function for changing the design object model in association with a change in the product structure, a numeral 107 denotes a design procedure guiding section for deciding a constraint propagation executing order according to attribute values established and a design state or achieving, at an occurrence of a conflict, a method of solving the conflict and constraint mitigation, and a numeral 108 indicates a constraint propagation order deciding function for extracting, when the design state is "setting of a new value" or "modification of a value", constraints which can be activated and determining a constraint to be executed. A reference numeral 109 stands for a procedure guiding function for guiding, when the design state is "occurrence of conflict", a procedure of the user by solving the conflict or by mitigating the constraint, a numeral 110 indicates a conflict solving function for producing an attribute value change method to solve a conflict, a numeral 111 designates a constraint mitigation function for mitigating constraint knowledge being used for creation of a design plan, and a numeral 122 indicates an enquiry generating function for issuing an enquiry for an attribute among the attributes of which a value is not determined, the attribute causing, when a value is set thereto, the possibly greatest number of other attribute values to be determined. A numeral 112 stands for a design operation executing section for achieving, according to constraints and attributes indicated from the design procedure guiding section, an inference/computation of attribute values not established and setting the values to attribute value slots of an attribute definition knowledge base, a numeral 113 denotes a local constraint propagation function for executing an inference/computation of attribute values, a numeral 114 indicates a candidate solution creating function to minimize candidate values of attributes and a range of value thereof according to inter-relationships between constraints, a numeral 115 stands for a conflict detecting function for determining presence or absence of a conflict between attributes established, a numeral 116 designates a setting state and a design state of attribute values to be referenced by the design procedure guiding section, a numeral 117 designates execution constraints determined by the design procedure guiding section and attributes related thereto, a numeral 118 denotes storage of attribute values attained as a result of an inference/computation achieved by the design operation executing section and values of presence or absence of conflict detected, a numeral 119 indicates a workstation as a design aiding apparatus to possess the design aiding method according to the present invention, and a numeral 120 indicates a sales engineer as the user.

Figure 2:
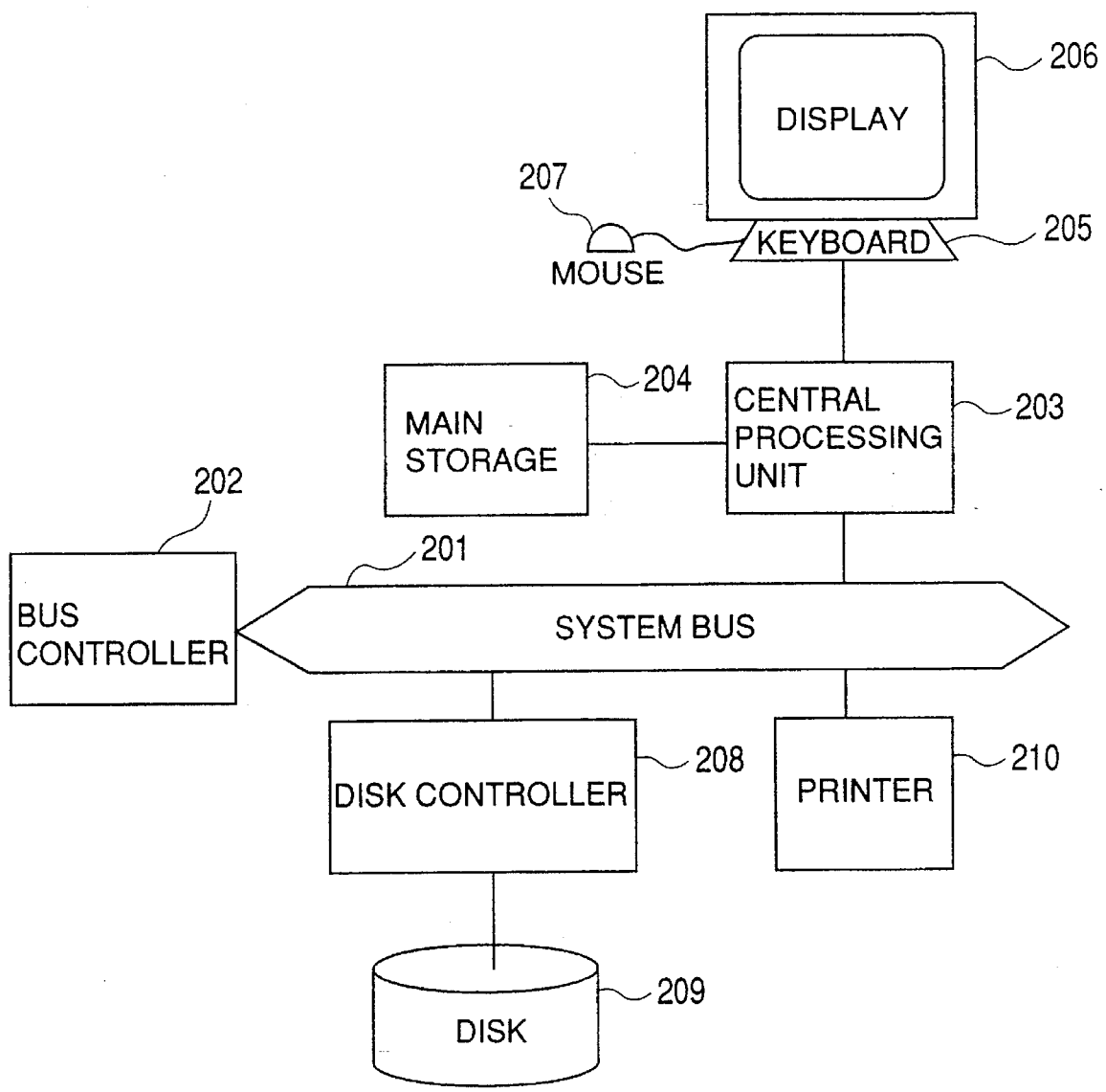
FIG. 2 is a hardware configuration diagram showing a utilization form of the apparatus of FIG. 1.

FIG. 2 shows an example of the hardware configuration to implement the functions of the system of FIG. 1. In FIG. 2, reference numerals 201 to 210 respectively stand for a system bus, a bus controller, a central processing unit, a main storage, a keyboard, a display, a mouse, a disk controller, a disk, and a printer for printing out a design solution on a print form.

Figure 3:
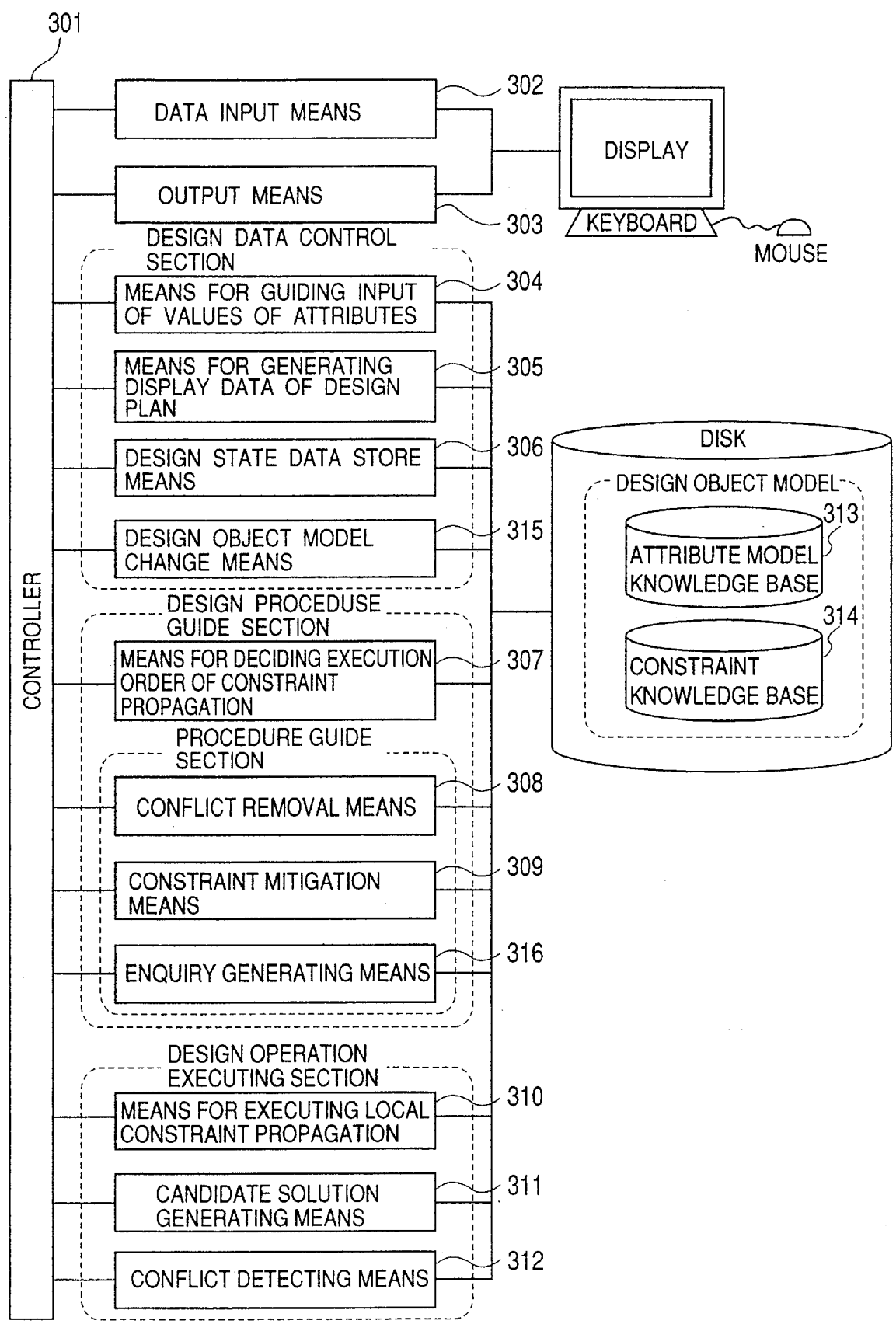
FIG. 3 is a diagram showing the structure of a design aiding apparatus employing the method of FIG. 1.

FIG. 3 shows an example of the software constitution for achieving the function of FIG. 1. In FIG. 3, a reference numeral 301 denotes a control section for activating associated means, a numeral 302 indicates data input means for receiving attributes of a requested specification from a keyboard and/or a mouse to store the received data on a disk and in the main storage, a numeral 303 designates output means for reading a produced result of design plan from the disk or the main storage to present the plan on a display, a numeral 304 stands for attribute value input guiding means for generating, when attribute values are to be inputted, an input menu to present the menu on the display, a numeral 305 indicates design plan display data generating means for creating drawing data to display a design plan, a numeral 306 designates design state data storing means for storing values of design state such as "setting a new value", "change of a value", or "occurrence of conflict" and/or updating the values, and a numeral 315 indicates design object model change means for changing a design object model according to a change in the product structure. A reference numeral 307 stands for constraint propagation executing order decision means for determining a constraint propagation executing sequence according to the determined attribute values and the design state, a numeral 308 indicates conflict solving means for creating, at an occurrence of conflict, a method of changing attribute values to solve the conflict, a numeral 309 designates constraint mitigation means for mitigating constraints to produce a substitutional design plan, a numeral 316 designates enquiry generating means for creating an enquiry or a question to determine an attribute value not established, a numeral 310 stands for local constraint propagation executing means for assigning, for a constraint represented by an equation, the determined attribute values to parameters of the expression so as to compute attribute values not determined, a numeral 311 designates candidate solution creating means for assigning, with respect to a constraint represented by a table, determined attribute values to parameters of the table to retrieve attribute values not determined such that when there exist a plurality of resultant attribute values, the number of combinations of attribute values is reduced according to inter-relationships between constraints or candidate values are sequentially displayed for the user for selection thereof so as to minimize the number of candidates, a numeral 312 denotes conflict detecting means for assigning, for a constraint represented by an equation, an inequality, or a table, determined attribute values to all parameters thereof to determine whether or not the equation or inequality holds or whether or not identical combinations of values exist in the table, a numeral 313 indicates an attribute model knowledge base for registering therein attribute models, and a numeral 314 stands for a constraint knowledge base for registering therein constraints.

The design aiding system according to the present invention is applicable to any product of which specification items and attributes representing the structure and performance thereof can be arranged in a list and the relation of cause and effect between specification items and design standards can be described in the form of expressions and tables in a design manual or the like so as to define constraints. Moreover, the system is suitable for a product of a type in which there exist varieties of request from clients such that important specification items are particularly altered for each request and hence the design procedure is changed, which leads to change in the contents of design manual to be referenced; alternatively, in which there frequently occurs a case during a design job where at occurrence of a conflict of an attribute value which cannot be analyzed by the design manual, the conflict is solved according to the know-how of the designer.

Figure 4:
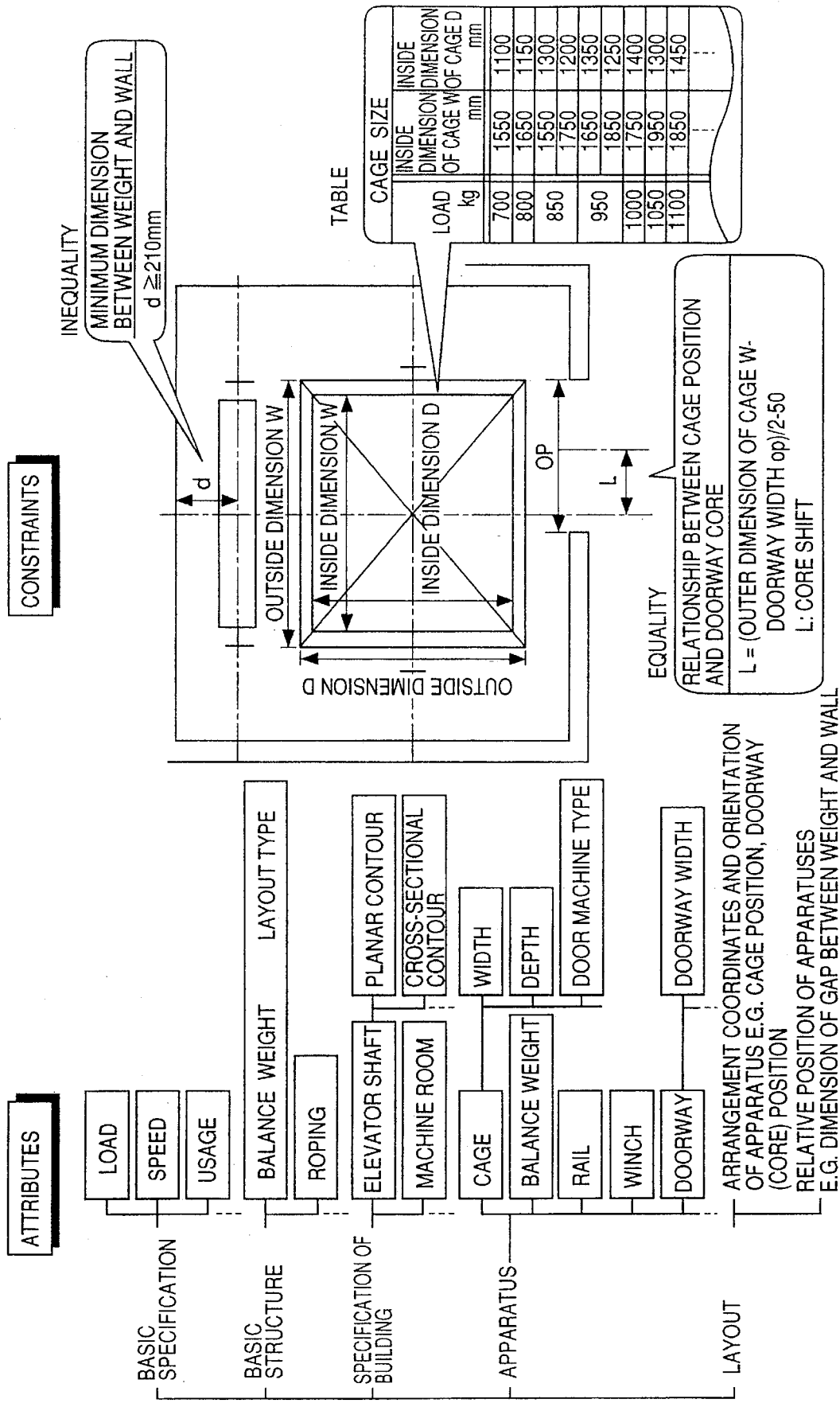
FIG. 4 is a diagram for explaining an attribute model knowledge base and a constraint knowledge base of an elevator.

Next, description will be given of, by way of example, an elevator as the objective product above. An elevator is primarily constituted of machines such as a "cage" for transporting persons and goods, a "balance weight or counterweight" linked with the cage to establish a balanced or equivalent state therewith, and a "winch" or the like to ascend and to descend the cage and the equivalent weight. These apparatuses are arranged in an "elevator shaft", a "machine room", and the like. The structure of elevator is determined by setting attribute values of the respective apparatuses, namely, an "inside dimension of cage W" and an "inside dimension of cage D" as inside dimensions of the frontgate depth of the cage as well as an "outside dimension of cage W" and an "outside dimension of cage D" as outside dimensions of the frontgate and depth of the cage such that these items match such attribute values requested from the client as an "elevator shaft frontgate" and an "elevator shaft depth" as the frontgate dimension and the depth dimension of "elevator shaft" where the respective apparatuses of the elevator are installed in the building as well as a weight "LOAD" applicable to the cage. In this regard, each attribute value is associated with many variations and there exist, between a plurality of values of attributes, constraints expressed by equalities, inequalities, and tables containing combinations of constraints. Consequently, by determining the attribute values to satisfy these constraints, there is obtained a design plan. FIG. 4 shows an example of classification of attribute models and constraint knowledge in a case of an elevator. The attributes are classified according to a basic specification representing main functions of the elevator such as "load" and "speed", a basic configuration representing a pattern of arrangement of apparatus such as "balance weight layout type", a building specification representing a building space of the elevator such as "elevator shaft" and "machine room", a machine specification representing attributes of a model, a width, and a depth of each machine such as a cage or a winch constituting the elevator, and a layout specification representing relative positions between machines such as coordinates of arrangement of each machine, an orientation thereof, and a dimension of gap between the weight and a wall.

Figure 5:
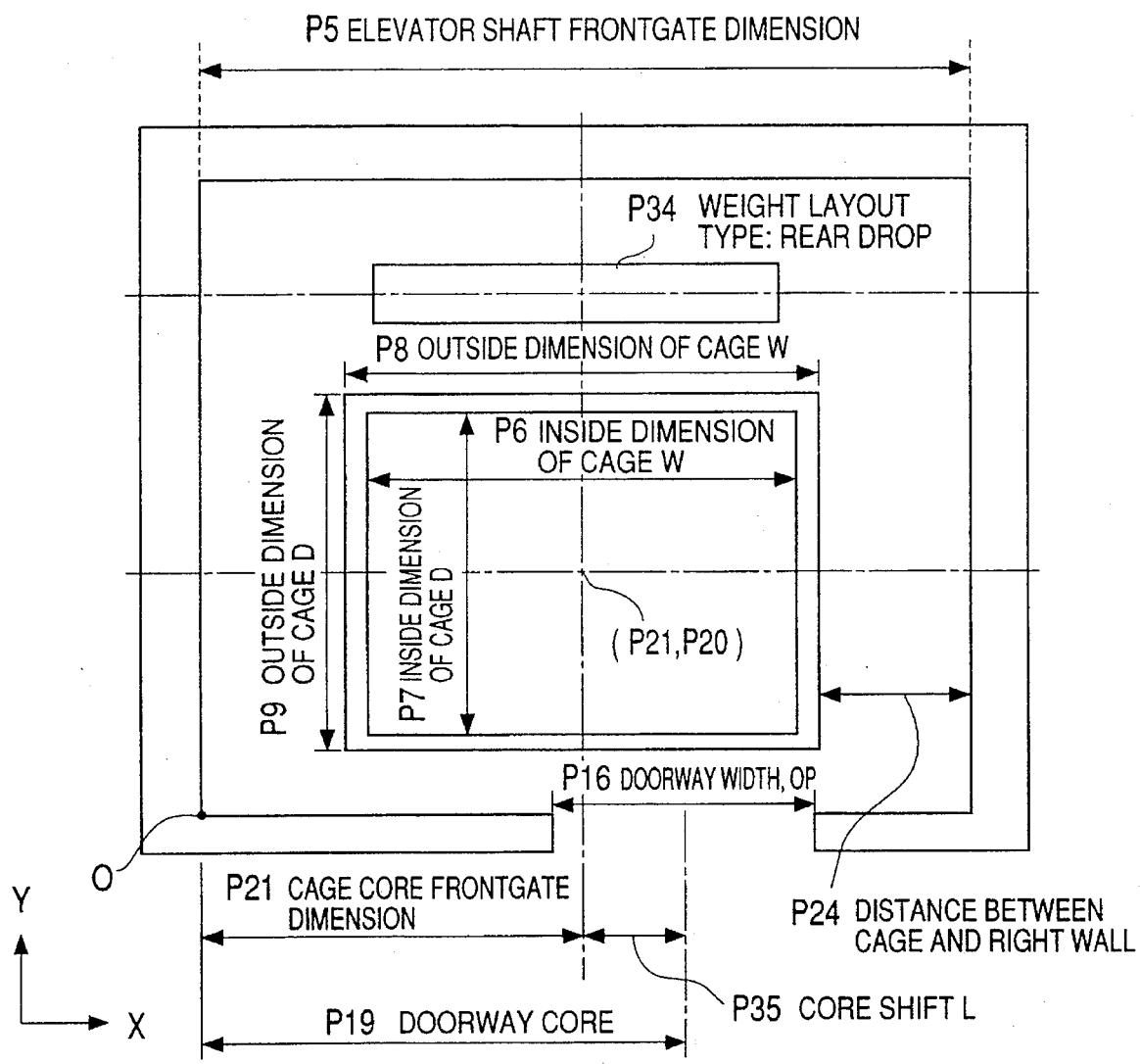
FIG. 5 is a diagram useful to explain correspondence between an attribute model and a contour of an elevator.

In addition, the constraints are expressed by a table representing a combination of values to be satisfied between attributes of "load", "inside dimension of cage W", and "inside dimension of cage W"; an equation representing relationships between a "cage core" as a central position of the cage, a "doorway core" as a central position of the doorway, and a "core shift" as a distance between these two positions; and an inequality representing relationships between "distance between weight and rear wall d" as a gap between the balance weight and the elevator shaft and "minimum dimension between weight and rear wall". FIG. 5 shows correspondences between attributes and dimensions of contour of the elevator used in this embodiment. FIG. 6 shows the contents of data of the attribute model adopted in this embodiment. The contents include a code of attribute, a name of attribute, a range of value, a value of attribute, presence or absence of lock/unlock specification of attribute value, and a setting state of attribute value. FIG. 7 shows the contents of constraint knowledge to be used in the embodiment. For example, a constraint C1 indicates a combination of values with integrity between "load" and sizes of cage, namely, "inside dimension of cage W" and "inside dimension of cage D". A constraint C4 is a constraint in a table for attaining the minimum dimension of the gap distance such as the "minimum dimension of distance between cage and right wall" according to "emergency stop" and "speed". This constraint is to be satisfied for the cage and the weight to ascend and to descend with safety without colliding against the elevator shaft. Constraints C5 and C6 are constraints in the form of equations to be respectively satisfied between the inside dimension of cage W and the outside dimension of cage W and between the inside dimension of cage D and the outside dimension of cage D due to the thickness of side plates of the cage. A constraint C12 represents positional relationships between an x coordinate "cage core frontgate dimension" which is a position of "cage core" where a rope to suspend the cage is attached and a coordinate of the central position of "doorway", namely, "doorway core". A constraint C13 is a constraint in an equation to compute a distance between the cage and the right wall of the elevator shaft. A constraint C17 is a constraint in an equality to calculate "core shift L" from the outside dimension of cage W and the doorway width OP. A constraint CC1 is a constraint in an inequality to decide whether or not the minimum dimension of the distance between cage and right wall is not exceeded. When a value of an attribute requested by the client is inputted, the system searches for any constraints above which can be activated so as to compute attribute values not determined, thereby setting the values to the attributes. According to the new values thus set, the system detects any constraints which can be activated. Repeatedly accomplishing the processing, when all attribute values are determined to satisfy the constraints, it is assumed that there is generated a design plan.

FIG. 8 shows the contents of the constraint activating condition control table to judge constraints which can be activated. The contents include codes of the respective constraints, related attributes which are attributes as parameters in the respective equalities, inequalities, and tables; and forms representing expression forms of constraints such as an equation, an inequality, and a table.

Assume that a requested specification is inputted via the attribute value input guide function 102 of the design data control section 101 to specify 850 (kg) to "load", 150 to "speed", 3010 to "elevator shaft frontgate dimension", 850 to "doorway width", and 2300 to "doorway core". That is, when the controller 301 activates the attribute value input guiding means 304 to display an attribute input menu on the display 206 such that a sales engineer 120 as the user then selects values from the keyboard 205 or the mouse 207, the central processing unit 203 accesses via the disk controller 208 the attribute model knowledge base 313 of the design object model stored on the disk 209 to obtain a set of attributes corresponding to a case of "rear drop" specified as "weight layout type" and then transfers data thereof by the bus controller 202 through the system bus 201 to store the data in the main storage 204. Similarly, the central processing unit 203 accesses via the disk controller 208 the constraint knowledge base 314 of the design object model stored on the disk 209 to obtain a set of constraints corresponding to a case of "rear drop" set as "weight layout type" and then transfers data thereof by the bus controller 202 through the system bus 201 to store the data in the main storage 204. Next, the controller 301 invokes the data input means 32 to set the inputted attribute values to the attribute model 106 in the main storage 204. According to the attribute values thus inputted, values are decided for attributes not determined.

Figure 9:
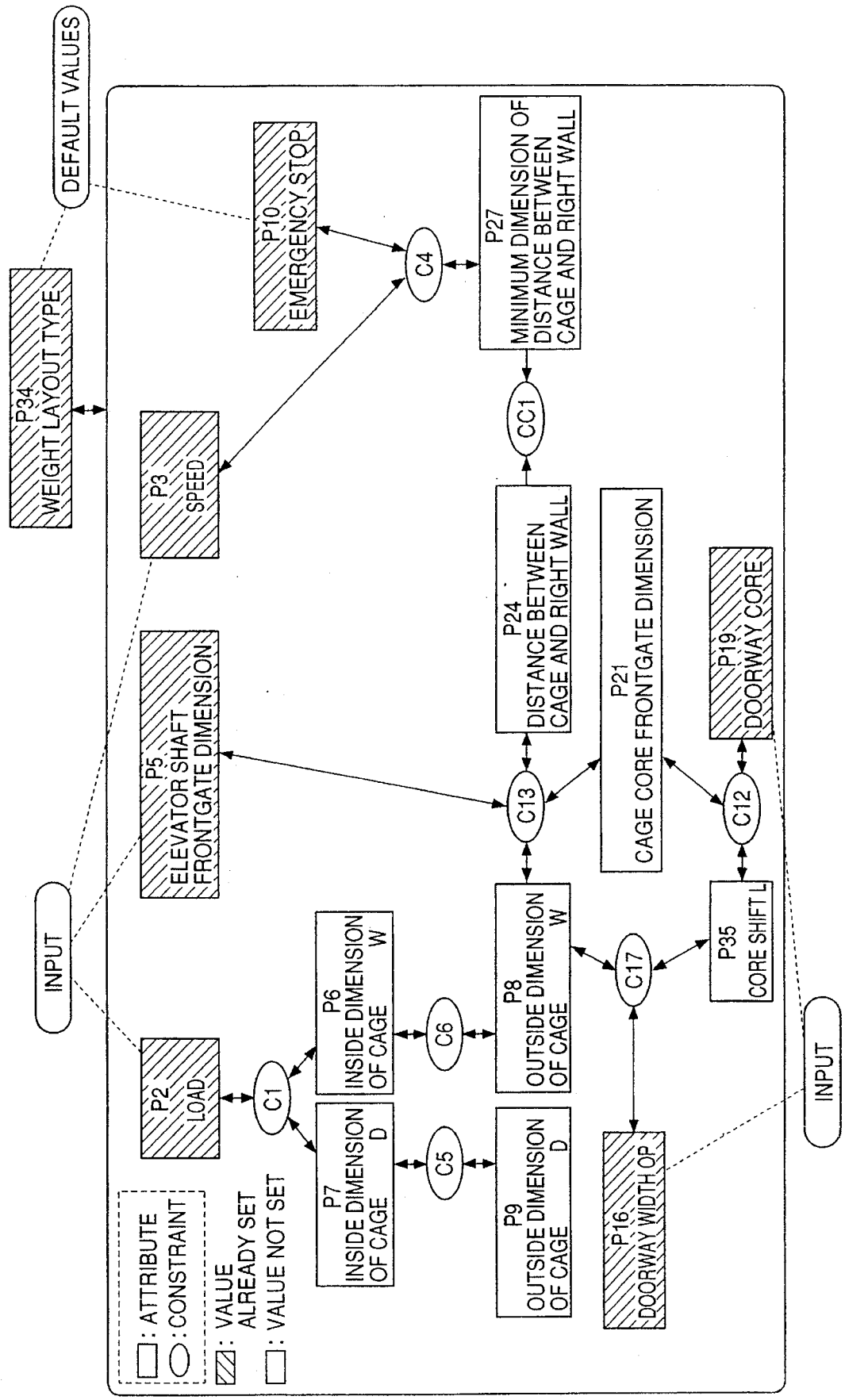
FIG. 9 is a diagram showing a state in which initial values are inputted via a constraint network.
Figure 10:
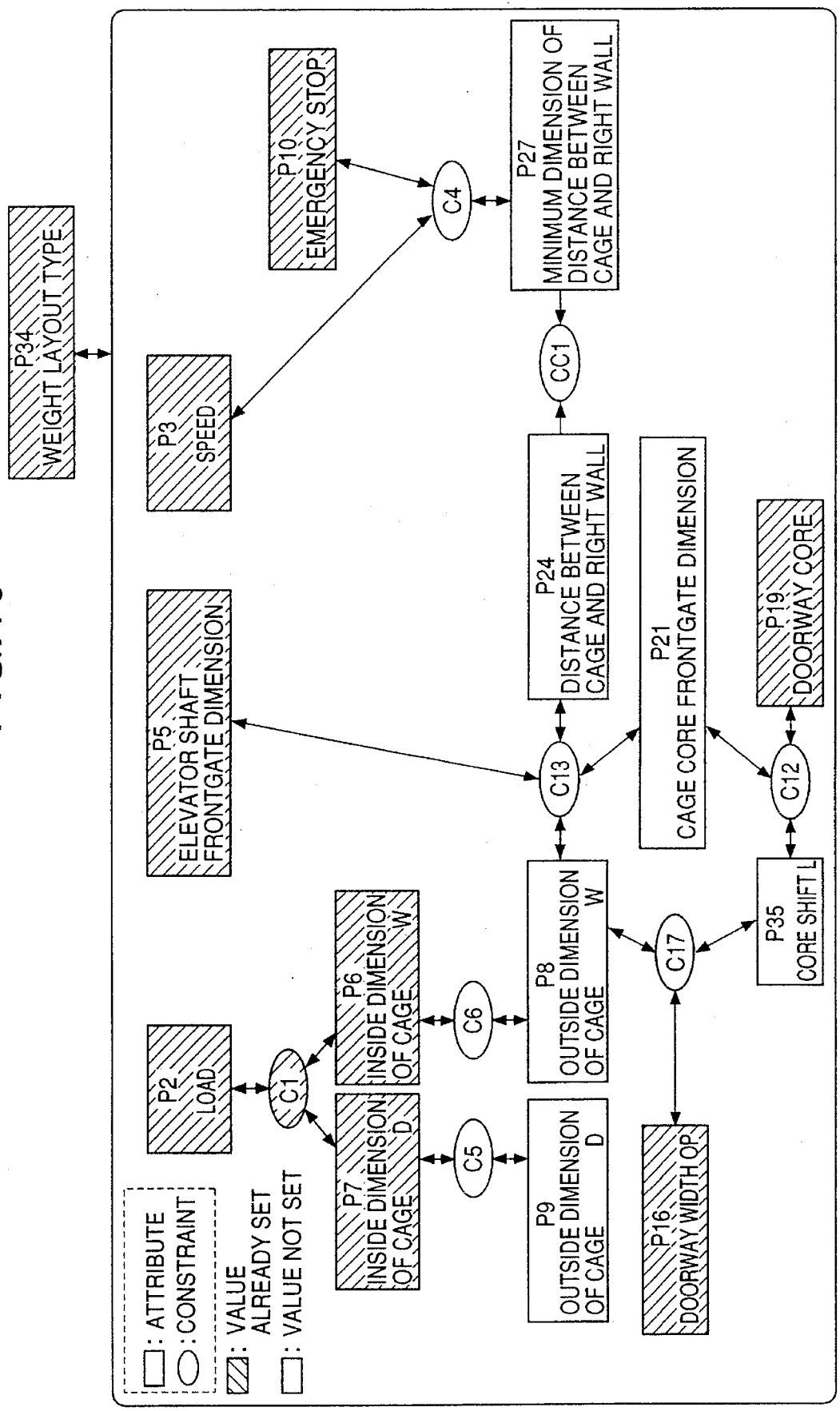
FIG. 10 is a diagram showing a state of a constraint network developed after execution of constraint propagation of a constraint C1.

FIG. 9 shows a constraint network including attributes of FIG. 6 and constraints of FIG. 7 used in this embodiment. For a design of specifications of an elevator, there are additionally required many attributes and constraints; however, for explanation, a partial constraint network is separated for description of operation of the design aiding method according to the present invention. In FIG. 9, according to the design aiding method, there is solved an example on a plane of an elevator shaft, namely, when a basic specification and a building specification are inputted, a machine specification of the elevator is obtained such that the machines are arranged in the elevator shaft to attain a layout specification so as to decide whether or not the gap distance between each machine and a wall is within the minimum dimension. In FIG. 9, there are set, in addition to the inputted attribute values above, the values of "weight layout type" and "emergency stop specification". In this connection, the value of weight layout type is ordinarily examined first for a case of "rear drop" where the weight is disposed on the rear side of the cage viewed from the doorway. Consequently, "rear drop" is set as a default value. Similarly, "present" is set as the value of "emergency stop". For these values, constraint propagation is not proceeded when the number of input attribute values is small, and hence, if not particularly specified, there are set attributes in a portion not so influential upon the client, the attributes being essential in the design of the specification received as a basic structure. Moreover, to call the attribute model above, there is used a default setting value. Next, description will be given of the respective functions of the design aiding system.

When input values are set to attributes of the attribute model 106, the value setting state and design state 116 are referenced by the design procedure guiding section 107 and then a setting sequence of attribute values on the constraint network is set by the constraint propagation executing order decision function 108. Namely, the controller 301 initiates the constraint propagation executing order determining means 307 to extract, according to the attribute values beforehand established, constraints which can be activated so as to select a constraint therefrom. Subsequently, when the execution constraint is passed as a design procedure 117 to the design operation executing section 112, the local constraint propagating function 113, the candidate solution generating function 114, or the conflict check function 115 is initiated according to the form of the constraint to obtain other attribute values according to the constraint. Furthermore, the constraint propagation can be executed in both directions. When the obtained attribute values are stored (storing of values 118) in the attribute model 106, a processing flow is finished.

For example, for the input attribute values above, as constraints which can be activated, there are determined constraints C1 and C4 according to the constraint activating condition control table of FIG. 8 for the following reasons. Since the form of constraints is a table, in a case where the number of related attributes is N, when the number of inputted attribute values ranges from 0 to N, it is possible to retrieve, with the input attribute values set as a retrieval key, another combination of related attribute values from the table. Next, either one of the constraints C1 and C4 is selected. The selection method will be described in conjunction with the second embodiment. It is assumed in this case that the execution is conducted in the ascending order of description in the constraint activating condition control table. In consequence, the constraint C1 is decided as the execution constraint to be sent as the design procedure 117 to the executing section 112. In the section 112, since the constraint C1 is in a table, a retrieval is carried out through the table of C1 with the load "850" set as a retrieval key, thereby obtaining the values of "inside dimension of cage W" and "inside dimension of cage D" as a combination of "1550" and "1300" or a combination of "1750" and "1200". The results are represented as FIG. 11 in the constraint network such that these combinations are subjected to, for example, a selection interactively achieved by the user. For example, when "1550" and "1300" are selected respectively as "inside dimension of cage W" and "inside dimension of cage D", attribute values are determined such that the values are set to the attribute model 106 of the design data control section 101 and "already set" is denoted as the setting state. Alternatively, the candidate solution generating function 114 is operated. Namely, in a case where the candidate values are not selected and are accumulated as internal data and then another constraint is executed to produce candidate values of attribute values, the controller 301 calls the candidate solution creating means 311 to minimize the number of combinations of attributes satisfying these candidate values at the same time. The generated candidate values are subjected to a selection by the user so as to decide many attribute values at a time.

A processing flow is achieved as described above. Through a cooperative action of the design data control section, the design procedure guiding section, and the design operation executing section as above, there are executed constraints which can be activated according to the request specification so as to determine attribute values of the design object.

Figure 11:
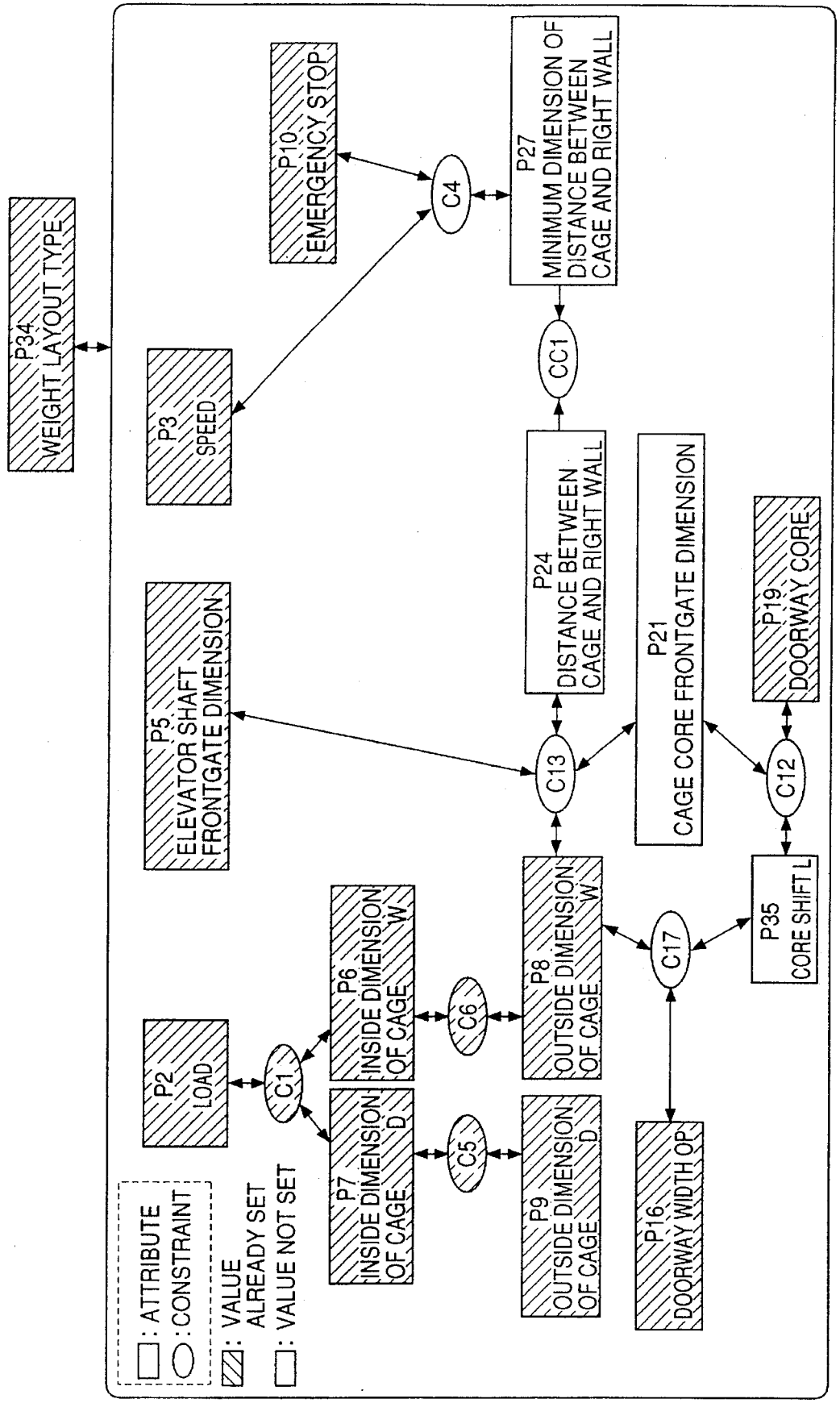
FIG. 11 is a diagram showing a state of a constraint network developed after execution of local constraint propagation of constraints C5 and C6.
Figure 12:
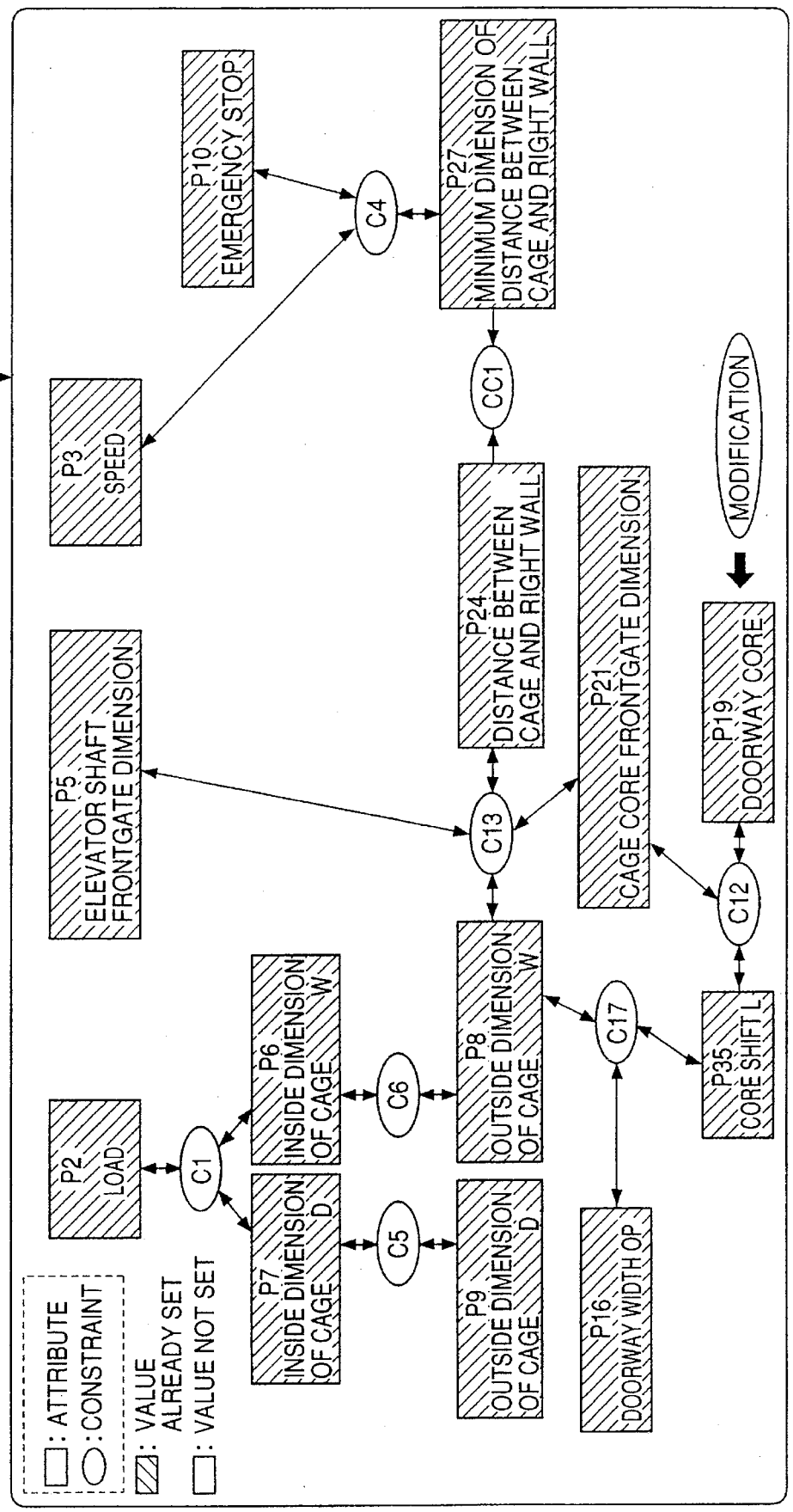
FIG. 12 is a diagram showing an example of propagation of modification.

Next, the guiding section 107 confirms the setting state of the updated attribute values and the state free from conflict and then extracts constraints which can be activated, thereby deciding an execution constraint. As above, the constraint C4 is next activated and the function 114 is operated. In consequence, according to "speed" and "emergency stop", the minimum dimension of distance between the cage and the right wall is attained as "220". Subsequently, the constraint C5 is activated and the function 113 is operated. That is, the controller 301 calls the local constraint propagation executing means 310. This is because the form is an equation and there are set N–1 values for N related attributes. Consequently, according to the inside dimension of cage W, the outside dimension of cage W is attained as "1600". Similarly, the constraint C6 is activated such that the outside dimension of cage D is attained as "1500" from the inside dimension of cage D (FIG. 11). Moreover, the constraint C17 is activated and the function 113 is operated. In consequence, "325" is set to "core shift L". Furthermore, the constraint C12 is activated and the function 113 is operated to set "1975" to "cage core frontgate dimension". In addition, the constraint C13 is activated and the function 113 is operated to set "235" to "distance between cage and right wall". The remaining constraint CC1 is in the form of an inequality and hence a check is made to determine whether or not "distance between cage and right wall" satisfies "minimum dimension of distance between cage and right wall". This is accomplished by the conflict detecting function 115 of the executing section 112, namely, when N related attributes of an inequality or an equation are entirely determined, a check is made to determine whether or not the inequality or the equation is satisfied. In this case, since "distance between cage and right wall" is "235" and "minimum dimension of distance between cage and right wall" is "220", the constraint is satisfied and hence the conflict check results in O.K. Although description has been given of a partial example, it is possible to determine in a similar manner the machine specification such as the size of cage and the layout specification such as the arrangement position of the cage in the elevator shaft to decide whether or not there occurs any conflict in these specifications. As above, the guiding section 107 references the attribute model and constraint knowledge of the control section 101 by use of the executing function 108 to sequentially decide constraint which can be activated such that the constraints are executed by the executing section 112 to determine attribute values, thereby producing a design plan.

According to the method of aiding design of received specifications, in addition to the function in which when attribute values are undetermined as above, the values are determined according to constraint propagation to generate a new design plan, there are developed various functions as follows. First, there exists a case where the client changes an attribute value for a design plan beforehand produced and hence the design plan is desired to be varied according to the change. For example, assume the following request. The "doorway core" is to be modified, namely, the position of the doorway of the elevator is to be moved to the right or left in the building. To cope with the alteration, the function 108 of the guiding section 107 conducts a retrieval for attributes to be changed according to the constraint network. That is, when the user varies an attribute value from the keyboard or the mouse, the controller 301 invokes the data input means 303 to store the changed attribute value in the attribute of the attribute model and then updates the setting state to "changed". Next, the controller 301 calls the deciding means 310 to extract, by reference to the constraint activating condition control table of FIG. 8, constraints related to the modified attribute value. The related attributes of C12 are "P19 Doorway core", "P12 Cage core frontgate dimension", and "P35 Core shift"; consequently, when "P19" is modified, if at least either one of "P21" and "P35" is not modified, the equation is not satisfied and a conflict occurs. As can be seen from the constraint network of FIG. 15, when "P19 Doorway core" is modified according to the constraint C12, at least one of the attribute values of "P35 Core shift L" and "P21 Cage core frontgate dimension" is required to be subject to modification propagation. There are various methods of deciding a sequence of modification propagation. For example, it is possible to define importance of attributes and constraints so as to modify, among attributes related to the constraint having a higher importance, an attribute having a lower importance. However, in this case, the modification is accomplished in an ascending order of description of related attributes associated with the constraint. Consequently, the design procedure is decided such that "P21 Cage core frontgate dimension" is modified to move the position with the size of the cage kept retained, thereby coping with the difficulty. The constraint 12 and the changed attribute "P21" are sent to the executing section 112. In response thereto, a modification value of "P21 Cage core frontgate dimension" is calculated by the function 310 so as to store the value in the attribute model 106 of the design data control section 101 and then the setting state is updated to "modified". After this point, similarly, there is repeatedly accomplished the operation in which a constraint is extracted in association with an attribute value modified in an cooperative manner to determine a modified attribute, thereby obtaining a modified value. Moreover, in a case where the lock/unlock specification of the attribute for modification has been set to the locked state, the user desires to keep the attribute value unchanged, and hence the modification is not carried out. As above, when the modification propagation is terminated without causing any conflict, it is assumed that a design plan is produced and the result is displayed by the display function 103. Through cooperative actions of the design data control section, the design procedure guiding section, and the design operation executing section as above, there is achieved, according to a change request of an attribute value, modification propagation of attribute values of related constraints, thereby deciding attribute values of the design object.

Next, description will be given of another function of the design aiding system, namely, the procedure guiding function 109 of the design procedure guiding section.

When a conflict occurs during constraint propagation (including modification propagation), the design procedure guiding section 107 activates the function 109. That is, the controller 301 first invokes the conflict solving means 308 to search for a cause of the conflict. There are various methods of solving the conflict; however, in this case, know-how of experienced designers is represented in countermeasure rules for removing the conflict. For example, in a case where as a result of a right shift of "doorway core", "cage-right wall distance" becomes to be smaller than "minimum dimension of cage-right wall distance", there occurs a conflict. As know-how to solve the conflict, if there exists a rule

---

IF [conflict of constraint CC1 "minimum dimension of cage-right wall distance":
(cage-right wall distance) > (minimum dimension of cage-right wall distance)]
THEN [countermeasure 1: Move cage core frontgate dimension to the left]
    [countermeasure 2: Change cage size],

--- a procedure guidance of conflict solution can be presented to the user.

In the function 110, when it is impossible to produce a design plan, the guiding section 107 activates the constraint mitigating function 111 of the procedure guide function 109. Accordingly, the constraint used for the constraint propagation is stepwise mitigated based on the mitigation level so as to obtain a substitutional design plan according to the constraint. Although the mitigation levels are determined according to various standards, there may be used a level decision method in which there are included combinations ranging from a combination of attribute values of a standard size to a combination of attribute values of a non-standard size.

Moreover, as for another procedure guiding function, there exists a case where a constraint to be subjected to constraint propagation cannot be detected according to an inputted attribute value and hence additional values are required to be inputted to proceed the design. In such a case, there is prepared an enquiry generating function in which computations are achieved according to the constraint network to determine an attribute value which is to be next inputted to determine possibly the greatest number of attribute values not established, thereby issuing the enquiry to the user.

Even in a case where a conflict occurs at an intermediate point of a specification design work, an appropriate design procedure can be guided thanks to provision of the design procedure guiding section.

Furthermore, the design aiding system includes the design object model change function in which according to values of attributes representing names of a plurality of structure patterns of the design object model, there is acquired a set of necessary attributes and ranges of values to automatically select a structure pattern of the design object model to be used for creation of a design plan for the inputted attribute values. Alternatively, according to a change of attribute values or an occurrence of conflict during the design, the structure pattern of the design object to be used for generation of a design plan is automatically changed. This consequently enables the system to cope with changes of the requested specification during the design job.

In addition, the design aiding system further includes a design object model constructing section constituted of an attribute model constructing and modifying function for registering and modifying attributes and values thereof and a constraint knowledge registering and modifying function for registering and modifying knowledge of constraints and procedure knowhow, thereby facilitating the construction of the design object model.

Moreover, the present invention is applicable to a design aiding apparatus for producing and delivering drawings according to a design solution developed from the design aiding system.

Embodiment 2

Referring now to FIGS. 1 and 2 and FIGS. 14 to 23, description will be given of the second embodiment according to the present invention. In the description of the embodiment, importance of constraints and attributes is set in association with request patterns to assign priority to constraints for activation so as to control behavior of constraint propagation, thereby automatically generating design procedures according to a variety of request patterns.

Figure 14:
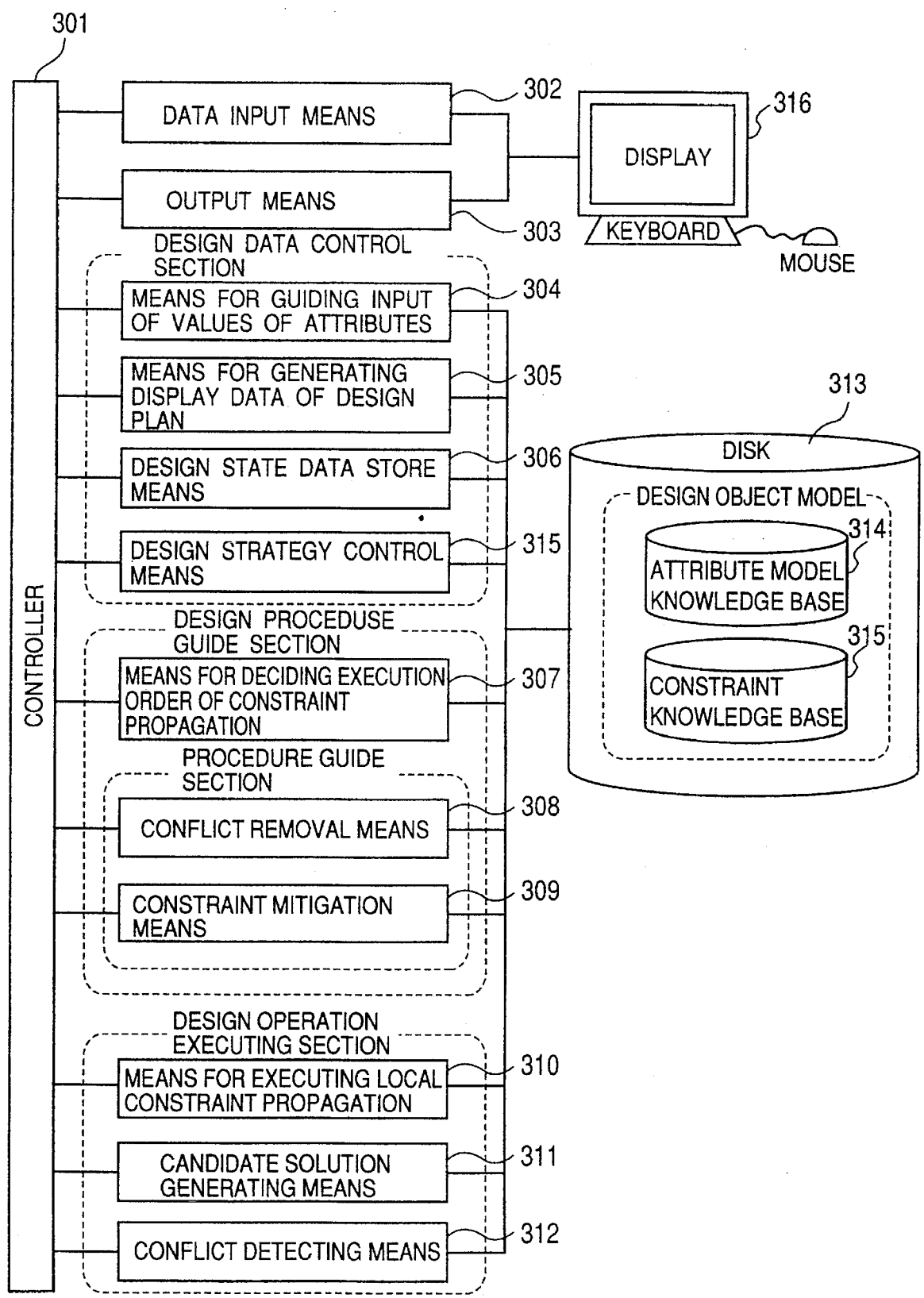
FIG. 14 is a diagram showing the construction of means of a design aiding apparatus in an embodiment according to the present invention.

FIG. 14 shows an example of the software configuration to implement the embodiment. The configuration is not basically different from the constitution shown in FIG. 3. However, in this structure, there is additionally disposed in the design data control section a design strategy control means 315 in which a plurality of weight data items representing importance of the respective attributes are registered for each constraint such that according to a specified request pattern, the weight data items are read to be assigned to attributes and constraints.

According to the design aiding system of the present invention, specification items designating the construction and performance of a product can be arranged as attributes in a list. Namely, the system is applicable to any product of which relations of cause and effect between specification items and design standards can be prepared in expressions and tables in a design manual or the like so as to define constraints. Furthermore, the system is suitable for a product of a type for which there exists a variety of request patterns such that particularly important specification items are changed, the design sequence is altered for each of the patterns, and hence the reference contents of the design manual are varied. Alternatively, for a product of a type for which there frequently takes place a case where a conflict of an attribute value which cannot be analyzed according to the design manual occurs during a design and hence the conflict is solved according to know-how of the designer.

Next, description will be given of, by way of example, an elevator as the object product above. FIG. 15 shows request patterns received from an client of the elevator. The first request pattern indicates a case in which the basic specification of the elevator is known on the client side, namely, such attributes representing the primary functions of the elevator as "load" and "speed". Moreover, the building specification items representing the building space of the elevator such as "elevator shaft" and "machine room" are known, thereby obtaining the standard machine specification and layout specification matching the elevator shaft. In the second request pattern, only the basic specification of the elevator is known so as to obtain a minimum size of the elevator shaft in which the machines can be arranged in conformity with the basic specification. As above, the relationships between the input attributes and the output attributes to be obtained completely vary between request patterns. In this embodiment, description will be given, according to the request patterns 1 and 2, of the process of automatic generation of design procedures respectively associated therewith.

Prior to explanation of the system initiation, description will be first given of data kept in the attribute model knowledge base 313 and the constraint knowledge base 314. FIG. 16 shows the data structure of the attribute model adopted in the embodiment, which includes areas to store therein, for an attribute, a code, a name, a value range, a value, presence or absence of lock/unlock of attribute value, a setting state thereof, and weight data. In the initial state, in the areas respectively of the code, name, and value range, there are beforehand registered data items associated with attributes extracted to represent the design specification of the product. The lock/unlock area is set to "unlock" and the setting state area is set to "to be set". Moreover, the system does not set any value in the areas in which the value and weight data of the attribute are to be kept.

FIG. 17 shows the contents of the constraint knowledge employed in the embodiment. For example, a constraint C1 indicates combinations each including with integrity "load" and "cage width" as well as "cage depth" denoting the size of cage. A constraint C2 is an equation representing a relationship between "elevator shaft frontgate dimension", "cage width", and "gap d" as the gap dimension between the cage and a wall. A constraint C3 is an equation to attain "gap d" as the minimum gap dimension between the cage and the wall from "minimum dimension of gap d". A constraint C4 is an inequality to determine whether or not the "gap d" satisfies the minimum dimension. A constraint C5 is a table constraint to attain "minimum gap dimension between the cage and the wall" from "speed", namely, this constraint is to be satisfied to move "cage" and "weight" upward and downward with safety without any collision against "elevator shaft". These constraints are retained in the constraint activating condition control table of the constraint knowledge base 314.

FIG. 18 shows the contents of the constraint activating condition control table. The table includes areas for keeping therein for each constraint a code, related attribute names, a format such as an equation, an inequality, or a table, and weight data. In the initial state, only the area of the weight data of constraint is kept undetermined. The other areas are in advance loaded with information of constraints C1 to C5 as shown in the diagram. Moreover, the body of each constraint is beforehand registered in the disk 209 with the constraint code as a header thereof as shown in FIG. 19.

Figures 20, 21:
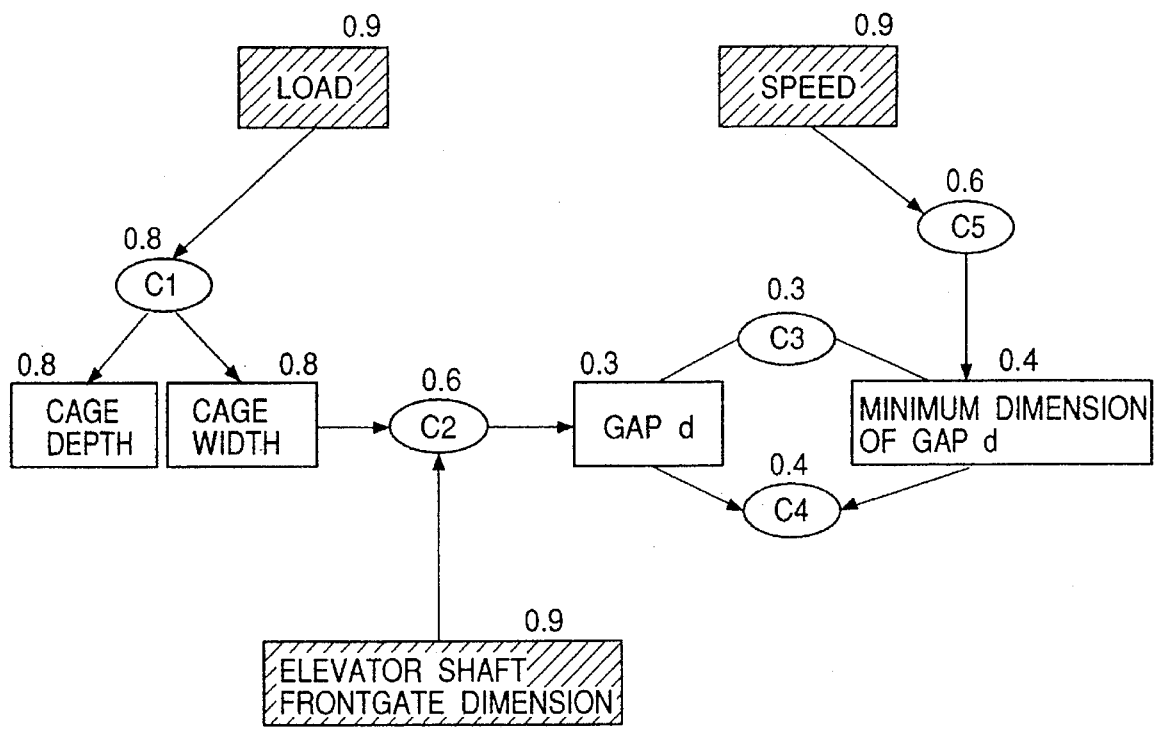
FIG. 20 is a diagram showing a design strategy control table in the second embodiment.
FIG. 21 is a diagram showing a constraint network of a request pattern 1 in the second embodiment.

Furthermore, on the disk 209, there is registered a design strategy control table as shown in FIG. 20. For each request pattern code, importance data items of constraints and attributes are stored in association with the request pattern code. The value of importance data ranges from 0.0 to 1.0, and the upper limit value of importance is indicated by 1.0.

Next, description will be given of a processing procedure in a case where the user conducts a design job for two designs related to the request patterns 1 and 2 above.

When the system is started, the control section 301 accesses via the disk controller 308 the attribute model knowledge base 313 of the design object registered onto the disk 209 to obtain attribute data (FIG. 22) and constraint data (FIGS. 18 and 19) kept in the constraint activating condition control table in the constraint knowledge base 314 and then transfers the data by use of the bus controller 202 through the system bus 201 to store the data in the main storage 204. Next, the control section 301 activates the design strategy control means 315. This means 315 reads all request pattern codes from the design strategy control table (FIG. 20) registered onto the disk 209 to display the codes on the display 206. The user selects, from the request pattern codes displayed, those matching the object from the keyboard 205 or the mouse 207. Description will now be given of a case where the request pattern 1 is selected.

The means 315 reads weight data of constraints and attributes associated with the selected request pattern 1 from the design strategy control table registered to the disk 209 to store the data in the weight data storage area of the constraint activating condition control table in the main storage 204 and the weight data storage area of the attribute model. The system respectively assigns weight data such that 0.8 to the constraint C1, 0.6 to the constraints C2 and C5, 0.3 to the constraint C3, 0.4 to the constraint C4, 0.9 to the attributes p1, p2, and p5, 0.8 to the attributes p3 and p4, 0.3 to the attribute p6, and 0.4 to the attribute Subsequently, the control section 301 activates the guiding means 304 to display an attribute value input menu on the display 206 such that the user inputs attribute values from the keyboard 205 or the mouse 207. Assume that the input attributes are as "load=800", "speed=120", and "elevator frontgate dimension=3000". The means 304 sets these attribute values to the attribute model 106 in the main storage 204 and then the setting state area is set to "already set". According to the inputted attribute values, the following processing is repeatedly executed to decide values of undetermined attributes.

When input values are set to attributes of the attribute model 106, the value setting state and design state 116 is referenced by the guiding section 107 and design state 116 and then a setting order of attribute values on the constraint network is decided by the constraint propagation execution order decision function 108. That is, the controller 301 initiates the means 307 to extract from the established attribute values constraints which can be activated so as to select a constraint therefrom. Next, after the execution constraint is passed as a design procedure 117 to the design operation executing means 112, the local constraint propagation means 310, the candidate solution generating means 311, or the conflict check means 132 is invoked according to the form of constraint, thereby attaining other attributes in accordance with the constraint. Moreover, the constraint propagation can be achieved in both directions. When the obtained attribute values are stored in the attribute model 106 (storage of values 118), a processing flow is finished.

The operation of the means 307 to determine the constraint propagation executing order in the sequence of processing above will be described by reference to the constraint network of FIG. 21 and the flow of determining the constraint propagation order shown in FIG. 22. In this connection, in FIG. 21, numerals over the respective attributes and constraints denote weight data.

Figure 22:
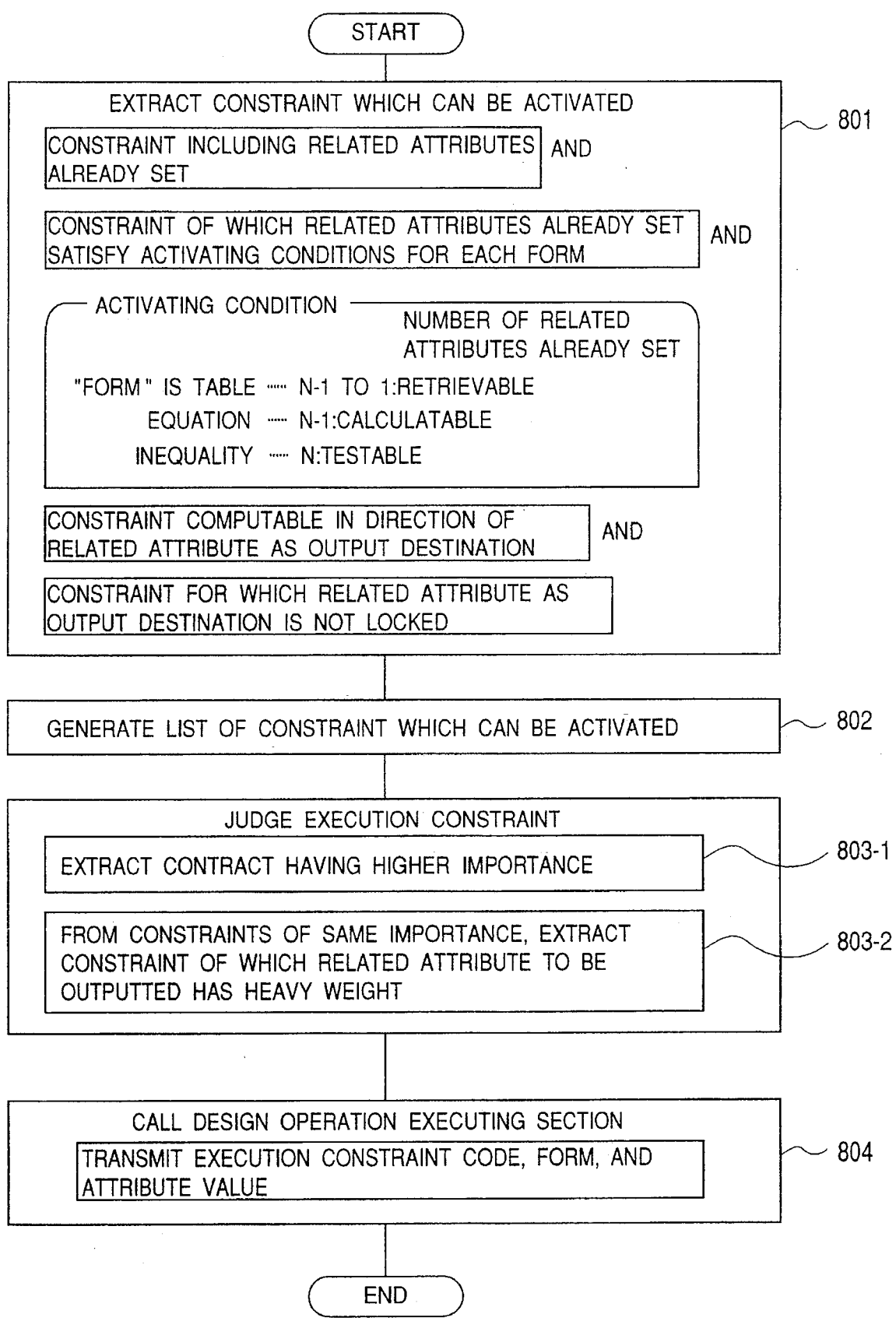
FIG. 22 is a flowchart showing decision of an execution order of constraint propagation in the second embodiment.
Figure 23:
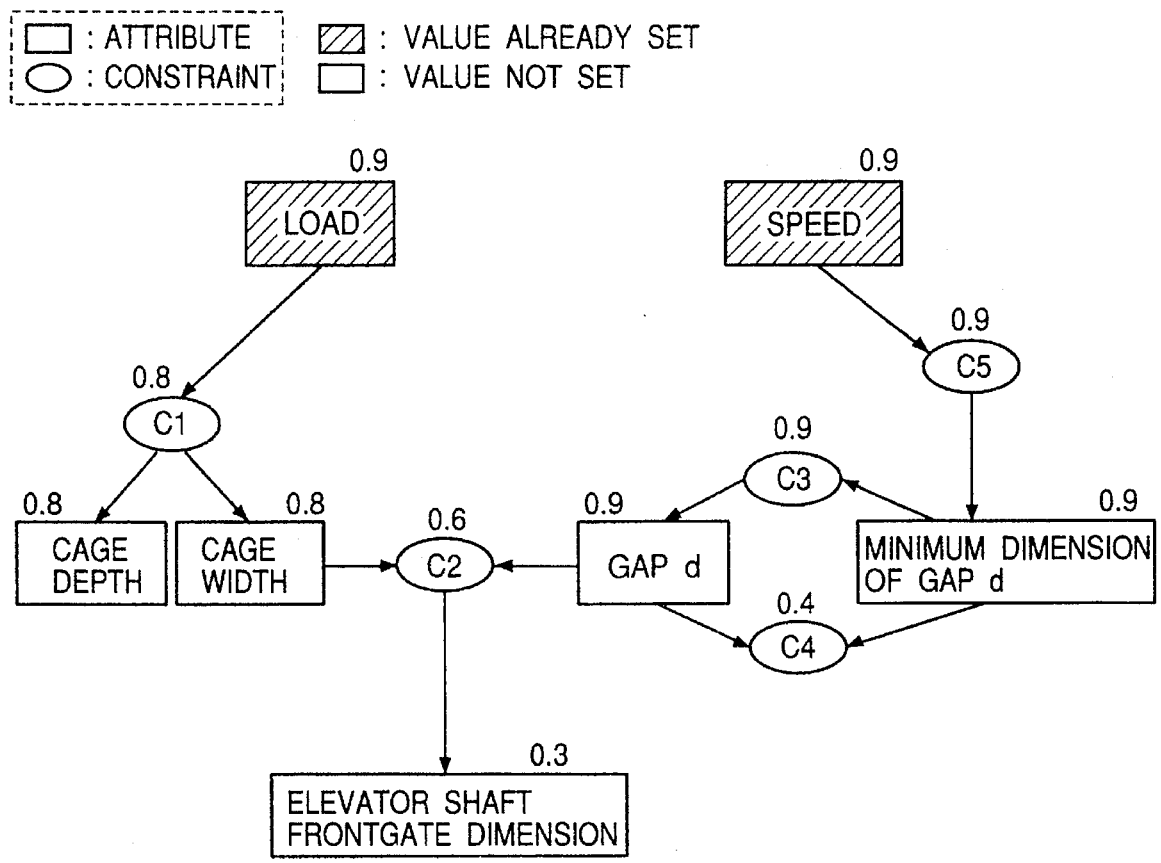
FIG. 23 is a diagram showing a constraint network of a request pattern 2 in the second embodiment.
Figure 24:
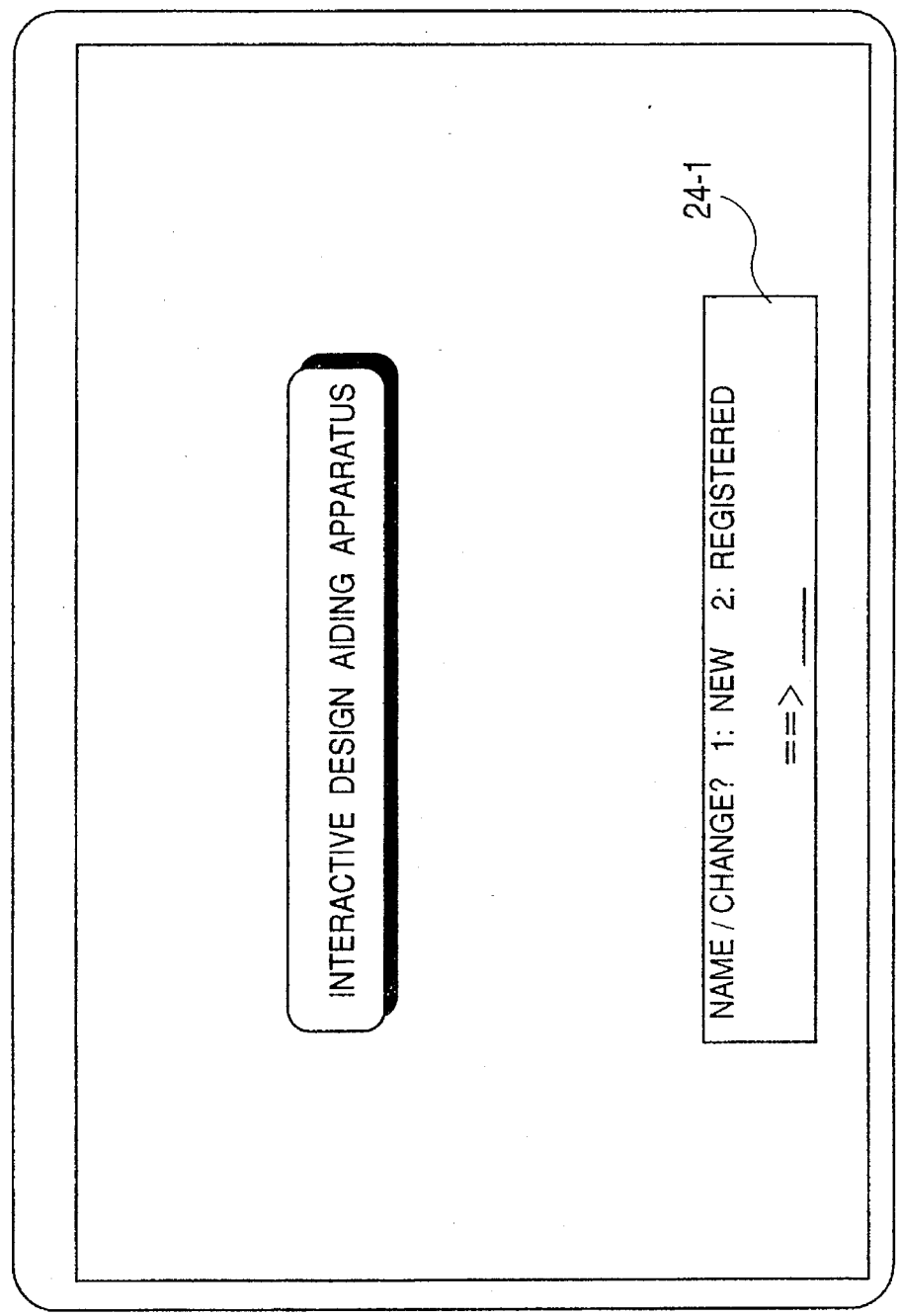
FIG. 24 is a diagram showing a new/registered item data selection screen.
Figure 25:
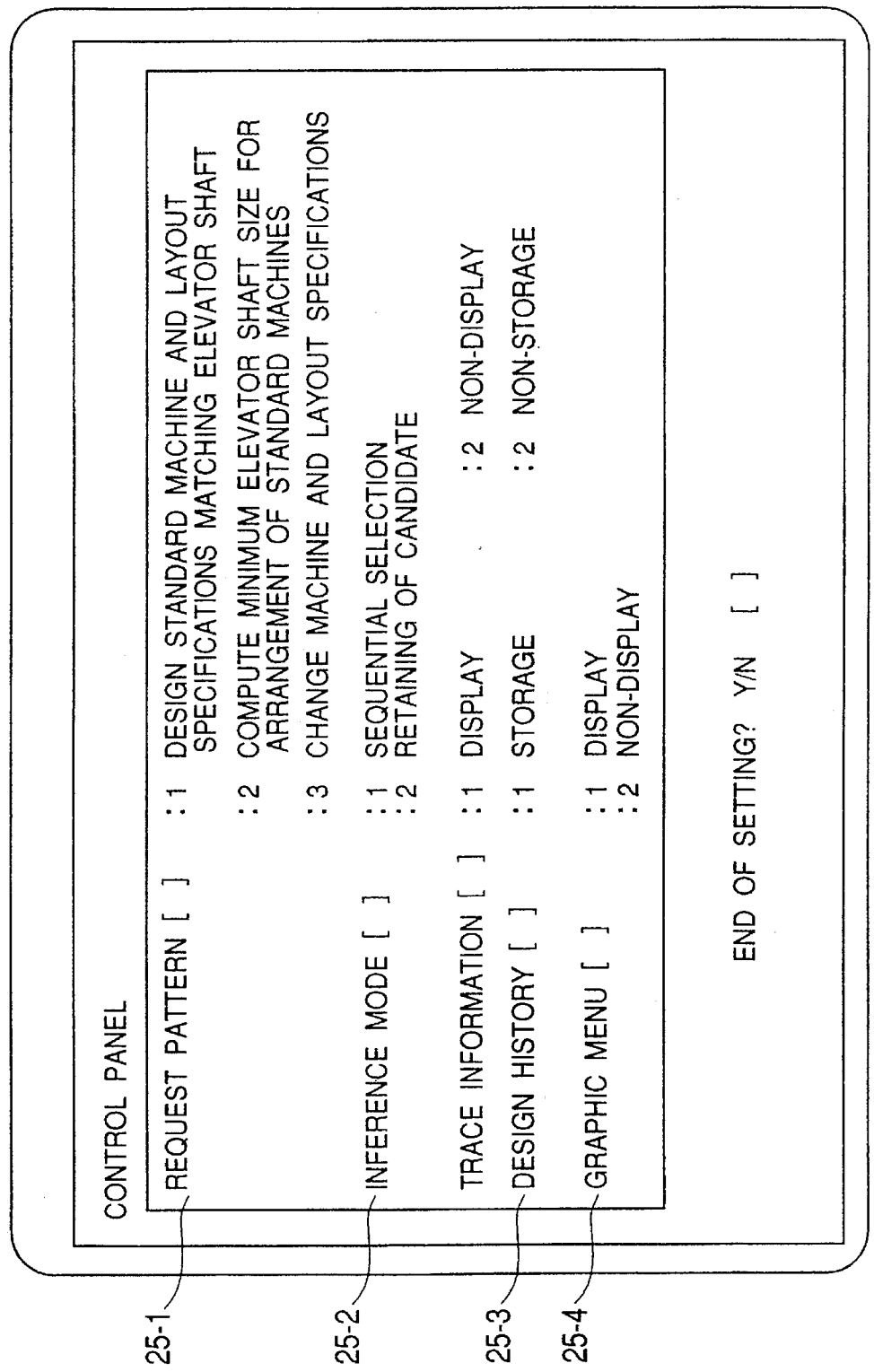
FIG. 25 is a diagram showing a control panel screen.
Figure 28:
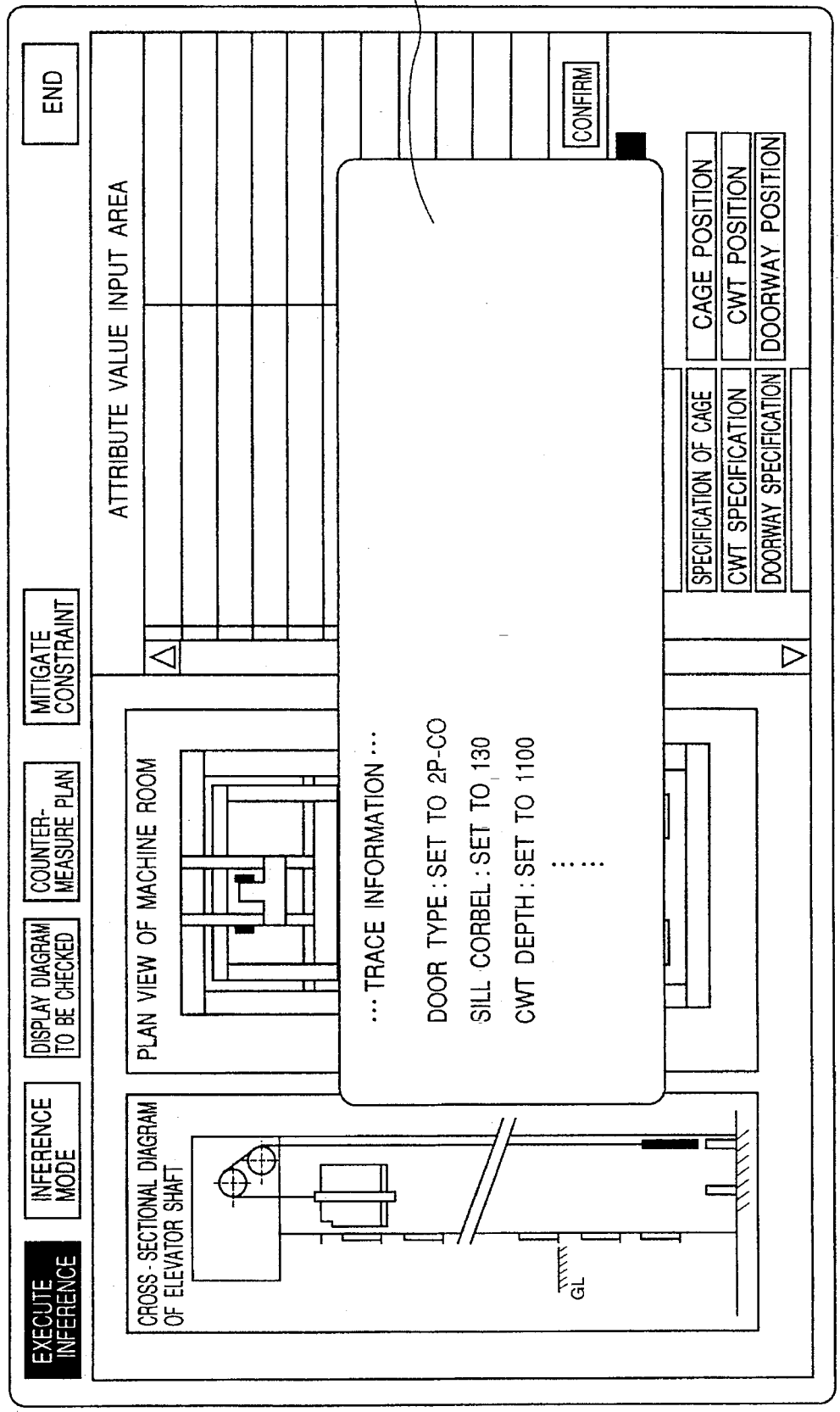
FIG. 28 is a diagram showing an inference execution trace screen.
Figure 29:
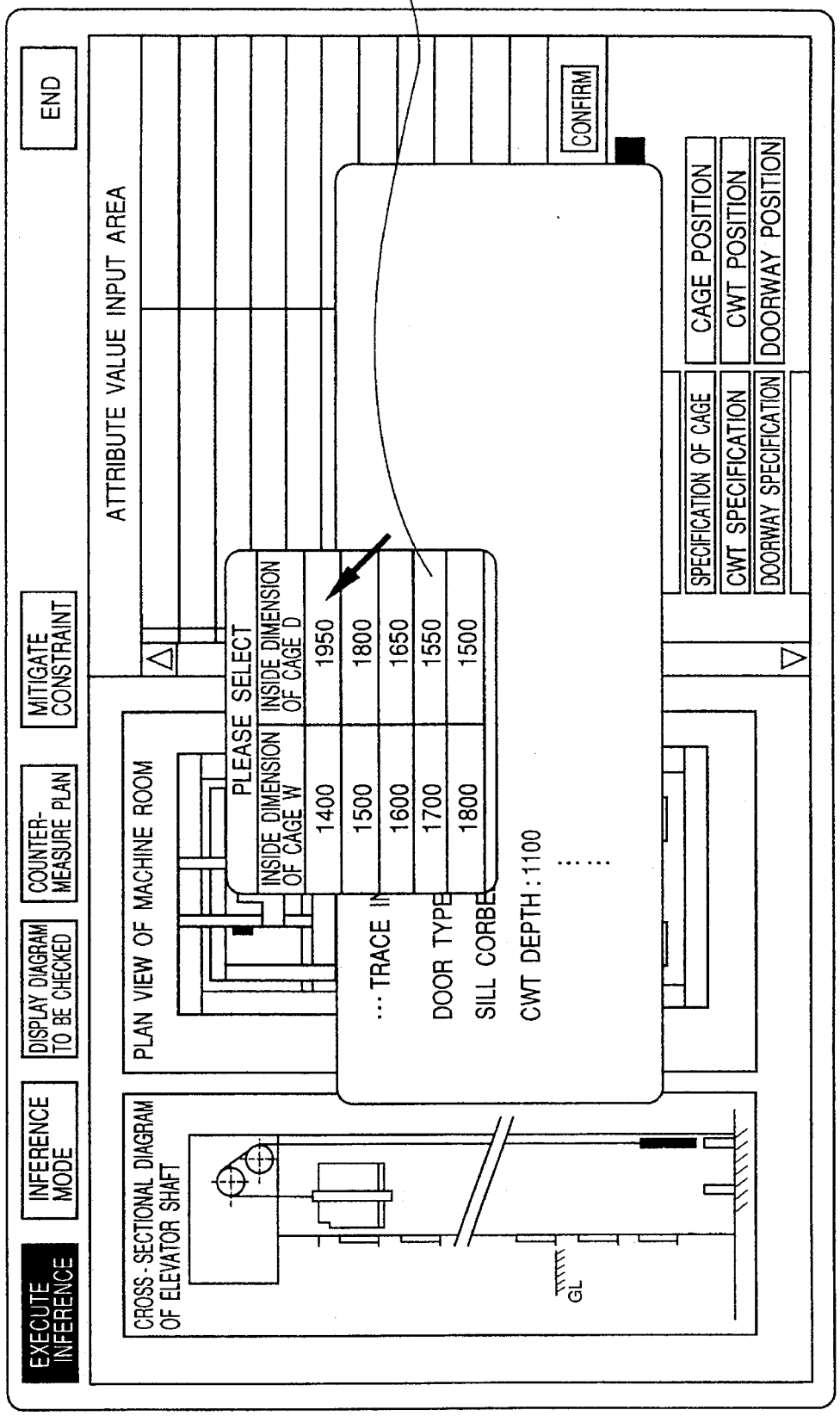
FIG. 29 is a diagram showing an attribute value selection combination screen.
Figure 30:
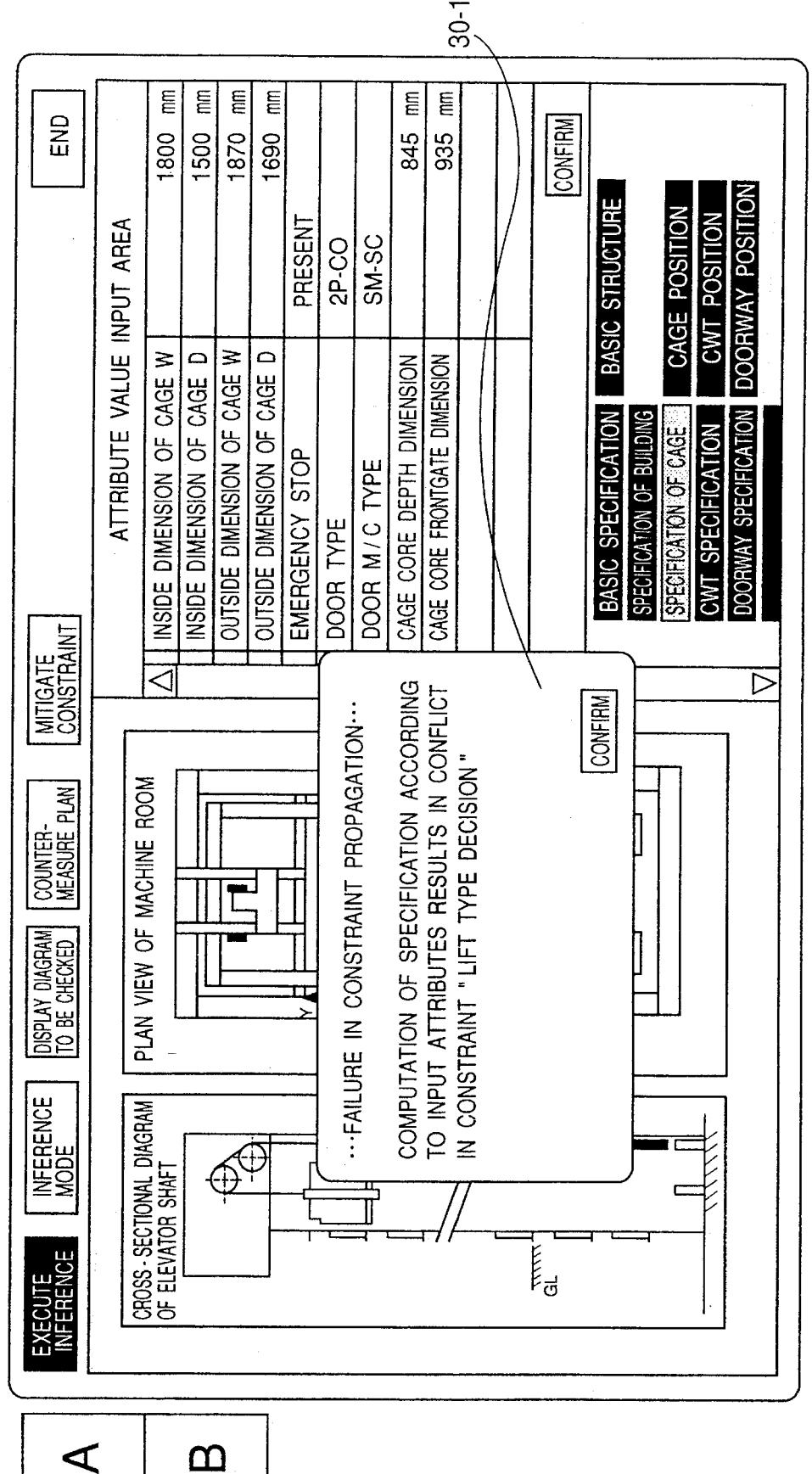
Figure 31:
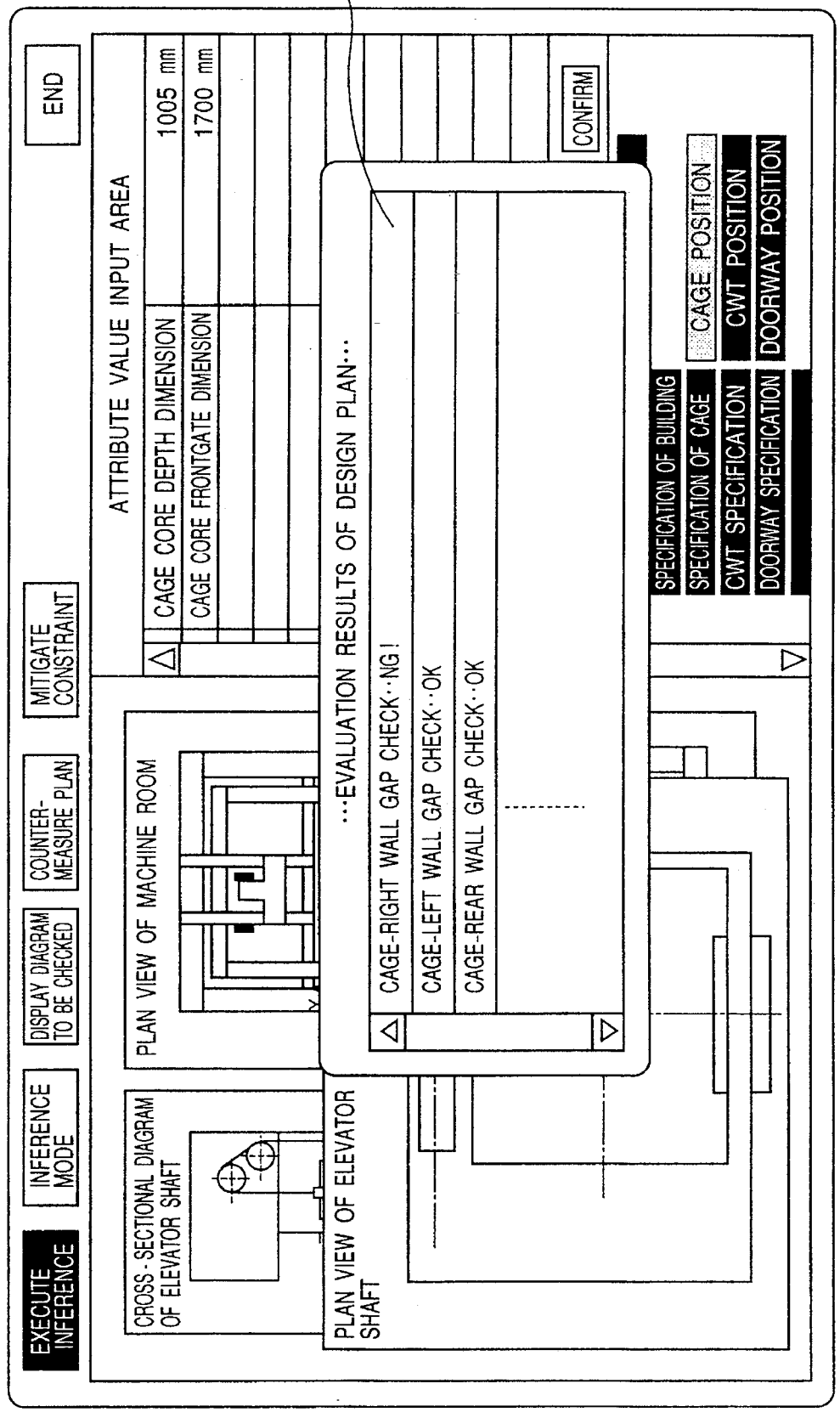
FIGS. 31(A) and 31(B) are diagrams showing a design plan evaluation result screen.
Figure 31:
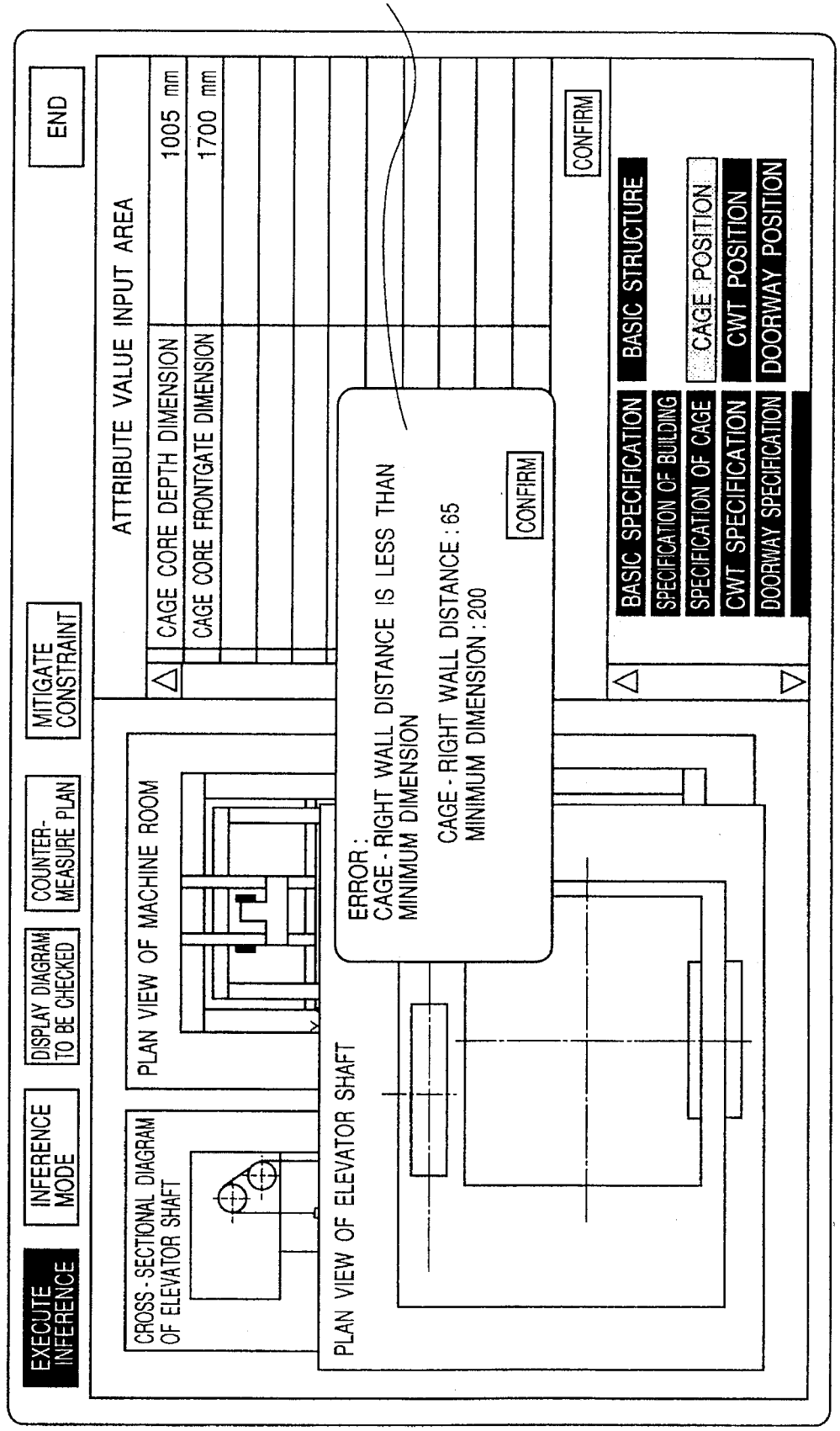
Figure 33:
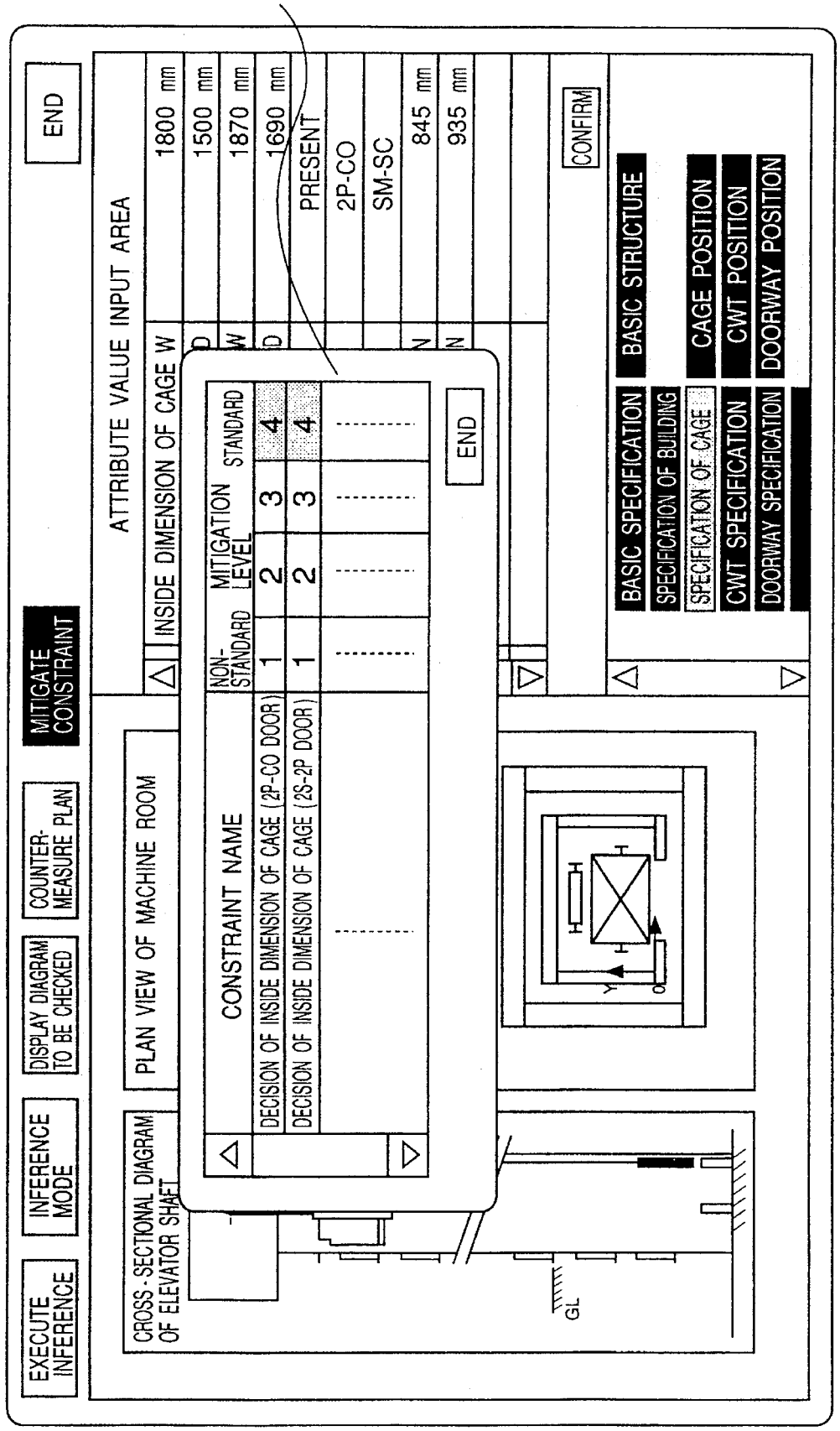
FIG. 33 is a diagram showing a constraint mitigation contents display screen.
Figure 34:
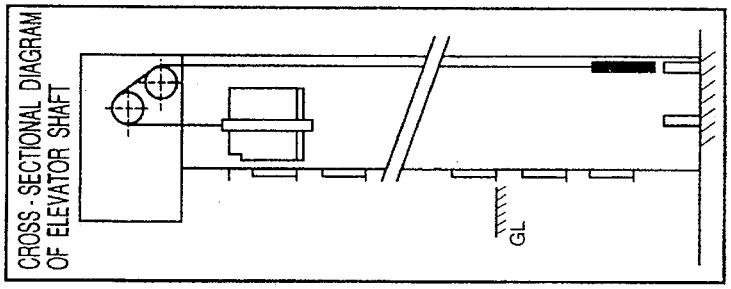

For inputted attribute values of FIG. 21, the means 307 first extracts constraints which can be activated (step 801 of FIG. 22). According to a judge condition determining whether or not a constraint can be activated, there are extracted constraints matching the judge condition by reference to the value setting state and the lock/unlock setting state of each attribute of the attribute model of FIG. 16 and related attribute names and forms of the respective constraints in the constraint condition control table of FIG. 18. As a result, there are detected the constraints C1 and C5 and then the means 307 stores the constraints C1 and C5 as an activation constraint list in the main storage 204 (step 802 of FIG. 22). Next, the means 307 achieves comparison of weight data between the constraints in the list to attain as an execution constraint one of the constraints which has the highest weight value (step 803-1 of Fig. 22). Since the constraints C1 and C5 are respectively assigned with weight values of 0.8 and 0.6, the constraint C1 is selected as the execution constraint in this case. Subsequently, the means 307 judges, for the obtained constraint C1, output attribute names according to attribute names and the form related to the constraint in the constraint condition control table of FIG. 24 and then activates the table-type constraint C1 for the local constraint propagation means 310 of the design operation executing section, thereby issuing an instruction to determine attributes "cage depth" and "cage width" (step 804 of FIG. 22).

On receiving the instruction, the means 310 reads the constraint C1 from the body of constraints (FIG. 19) in the main storage 204 to compute "cage depth=1150"and "cage width=1650" according to the input attribute "load=800", thereby setting the value to the attribute model of FIG. 16.

Description has been given of the first processing flow. In the second and subsequent processing flows, the constraints are activated in a sequence of the constraints C2 and C4 such that attribute values of "minimum dimension of gap D=220" and "gap d=675" are determined and the check of minimum dimension "gap d" is finally confirmed according to the constraint C4. (In this regard, in the second attempt to decide the constraint propagation executing order, the constraints C5 and C2 are extracted as constraints which can be activated. However, since the weight is identical as 0.6, a weight comparison is further conducted, in the execution constraint decision step, between output attributes of the constraints C5 and C2 so as to extract an execution constraint (step 803-2 of FIG. 22)).

As above, it can be understood that there is automatically generated, by determining the sequence of constraint propagation according to the weight values of constraints and attributes, a design procedure matching the request of the client or the user of the sales department. Namely, the design procedure is attained according to a request "based on the basic specification such as "load" and "speed" and the building specification, it is desired to obtain the standard machine specification and layout specification matching the elevator shaft".

Next, description will be given of a case where the request pattern 2 is selected.

The design strategy control means 315 accesses the design strategy control table registered onto the disk 209 to read therefrom data of constraints and attributes corresponding to the selected request pattern 2 and then stores the data in the weight data storage area of the table and the weight data storage area of the attribute model in the main storage 204. Values are respectively assigned as follows: 0.8 to the constraint C1, 0.6 to the constraint C2, 0.9 to the constraint C5, 0.9 to the constraint C3, 0.3 to the constraint C4, 0.9 to the attributes p1, p2, p6, and p7, 0.8 to the attributes p3 and p4, and 0.35 to the attribute p5.

Next, the controller 301 activates the guiding means 304 to display the attribute input menu on the display 206 such that the user inputs attribute values from the keyboard 205 or the mouse 207. Assume that the input attributes are "load=800" and "speed=120". The guiding means 304 sets these attribute values to the attribute values of the attribute model 106 in the main storage 204, and "already set" is indicated in the value setting state area. According to the input attribute values, processing is executed in the same manner as for the request pattern 1 above. Description will next be given of the design procedure finally attained according to the constraint network shown in FIG. 23.

First, the constraint C5 is activated to decide "minimum dimension of gap d=120" from "speed=120". The constraint C3 is then activated to calculate (retrieve) "cage depth=1150" and "cage width=1650" according to the input attribute "load=800". Finally, the constraint (elevator shaft dimension=gap d * 2+cage width" is activated to obtain an output attribute "elevator shaft dimension 2090" from "cage width=1650" and "gap d=120".

Also in the case of the request pattern 2 above, it can be appreciated that there can be automatically generated, only by deciding a sequence of constraint propagation according to the weight values of constraints and attributes, a design procedure matching the request from the client or the user of sales department. Namely, the design procedure is attained according to a request "when only the basic specification of the elevator is know, it is desired to know the minimum elevator shaft size in which the machines satisfying the basic specification can be arranged."

As described above, according to the embodiment, by determining a sequence of constraint propagation according to the weight values of constraints and attributes, there can be automatically created a design procedure matching a particular request pattern; moreover, by keeping weight data of constraints and attributes for each of a plurality of request patterns so as to change weight data when necessary to achieve constraint propagation, there can be provided a design aiding apparatus capable of automatically producing design procedures associated with various design patterns.

Embodiment 3

Next, the third embodiment of the present invention will be described by reference to FIGS. 1, 2, and 14 and FIGS. 24 to 36. In the description of an example of operation according to this embodiment, there are disposed display screens to proceed processing of the design data control section, the design procedure guiding section, and the design execution operating section through interactive operations with the user. When a request of a client is inputted as values of attributes, a design procedure is decided according to constraint knowledge between attributes and possibility or impossibility of change of the respective attribute values. Moreover, when a conflict occurs, the procedure is guided to obtain a design plan satisfying the request.

When the interactive design aiding system is initiated, the attribute value input guiding means 304 of the design control section presents a new/registered item data selection screen (FIG. 24) on the display. The sales engineer as the user selects items from a menu 24-1 according to a condition that a design is to be conducted for a new item or a modification is to be effected for an existing item already having item data. When a new design is selected, the guiding means 304 presents a control panel screen (FIG. 25) on the display including a save/non-save selection menu design history information, a display/non-display selection menu 25-2 for an execution trace screen, and a display/non-display selection menu 25-4 for a graphic screen. Moreover, the design strategy control means of the design data control section displays a selection menu 25-1 for a request pattern number on the control panel screen. When the sales engineer as the user chooses a request pattern, the control means 315 assigns weight data items of the respective attributes registered for each request pattern to attributes and constraints in the design object model storage means. Furthermore, when the user next selects values of the inference mode, design history information, inference execution trace screen, and graphic menu, the respective data items are set to the control section 301. When the setting operation is finished, an attribute value input/and display screen 27-1 of the design object is presented on the display by the guiding means 304 of the design data control section.

Alternatively, when the sales engineer as the user selects a registered item in the new/registered item data selection screen (FIG. 24), data of the registered item is read from the history data base such that the guiding means 304 of the design data control section sets the obtained values to the attribute value input/display screen 27-1 of the setting object in the display, thereby presenting the screen.

Subsequently, in a case where the user inputs attribute values requested from the client, when the user clicks attribute value fields corresponding to the requests in the screen 27-1, a list of values to be selected for the attribute values is displayed with letters 27-3, as a range of values, or in a graphic menu 27-6. When values are selected therefrom, the selected attribute values are set to associated attributes of the attribute model in the design object model storage means. In addition, for input attribute values for which the user desires to inhibit changes of values thereof through inference, when the lock/unlock setting field 27-5 of the pertinent attribute is clicked, the value is set to the locked state. There may be employed an attribute value input method in which an attribute header item list 27-4 is displayed such that when the user selects one of the headers, an attribute of the header item is presented in the screen 27-1. Moreover, it may also be possible in a case of input operations of attribute values related to contours of a design objects that when the attribute values representing a contour pattern of the design object are inputted (FIG. 26), a not-scale drawing 26-1 beforehand registered is displayed to indicate a dimension line 26-2 as correspondence between an attribute associated with the request of the client and a dimension, thereby conducting a guidance.

When the request input is finished by repeatedly conducting the operation, the user clicks an inference execution command menu 27-2. The design data control section then conducts, in response to the inputted request specification, an automatic selection of a type of a design object model to be used for creation of a design plan. Next, referring to the setting state of attribute values and design state such as "setting of a new value", "modification of a value", or "occurrence of conflict", the design procedure guiding section decides a procedure to attain a design solution. For example, in a case of "setting of a new value", the constraint propagation executing order decision means of the design procedure guiding section is activated to access constraint knowledge stored in the design object model storage means of the design data control section so as to reference attribute values already set and presence or absence of lock/unlock specification for attribute values, thereby extracting constraints which can be activated. When a plurality of constraints are extracted, there is selected a constraint therefrom for execution of new constraint propagation. Moreover, when the design state is "modification of a value", for the attribute of which the value is modified, the system extracts, according to presence or absence of lock/unlock specification for the attribute value, constraints which can be activated. When a plurality of constraints are extracted, a constraint is selected therefrom for execution of modification propagation so as to send the constraint name and the related attribute values as data of design procedure to the design operation executing section. In this situation, when there are extracted a plurality of constraints which can be activated, a weight comparison is accomplished between conflicting constraints to decided as an activation object a constraint having the highest importance. Furthermore, when there exists a plurality constraints associated with the highest importance, a weight comparison is achieved between attributes related to the conflicting constraints to determine as an activation object a constraint for which an attribute of a higher importance can be set.

The design operation executing section attains a design solution according to the constraint indicated by the design procedure guiding section and then stores the values in the design data control section. In the executing section, the attribute values already set are assigned by the local constraint propagation means to attributes of parameters of the constraint represented by an equation so as to calculate values of undetermined attributes, thereby storing the results in the attribute model of the design object model in the design data control section. In the control panel screen (FIG. 25), when "display" is beforehand set for the inference execution trace screen (25-3), an inference execution trace screen (FIG. 28) is displayed to sequentially present attribute values set through the inference and/or calculation.

Moreover, in a case where a plurality of combinations of attribute values are obtained in the inference, when "sequential selection" is beforehand set in the inference mode 25-2, an attribute value selection combination screen (FIG. 29) is sequentially presented on the display such that user interactively selects items therefrom so as to determine attribute values from the candidates of combinations. A combination of attribute values thus selected is stored in the attribute model of the design object model in the design data control section. Alternatively, when "retaining of candidate" is selected in the inference mode 25-2, the inference is continued while retaining the values as candidate values in the value ranges of the respective attributes of the attribute model. After the inference is finished, the candidate values are displayed in the different colors in the menu of attributes on the attribute input and display screen. Alternatively, attribute values already set are assigned by the candidate solution generating means 31 to the attributes of parameters of the constraint represented in a table to retrieve values of undetermined attributes, thereby obtaining combinations of attribute values. As a result, when a plurality of combinations are obtained, in consideration of also plural constraints on the constraint network, there can be determined a combination of candidate attribute values according to inter-relationships therebetween.

Alternatively, attribute values already set are assigned to all attributes of parameters of the constraint represented by an equation, a table, or an equality so as to determine by the conflict check means 312 whether or not the equation or inequality is satisfied or whether or not the table contains identical combinations of attribute values, thereby storing the results in the attribute model of the design object model in the design data control section. When the check results in O.K., namely, when there does not exist any conflict, the design procedure guiding section executes any constraints which can be subjected to execution of constraint propagation due to the attribute values including the new values thus set. When the conflict check results in N.G., namely, when there occurs a conflict, the execution of constraint propagation is interrupted to display a conflict occurrence message screen (FIG. 30) representing a message of a constraint causing the conflict. When the user clicks "confirm" in the screen, the system clears the attribute values set through the inference up to the point of occurrence of the conflict. Alternatively, in the final stage of execution of constraint propagation, there is conducted a check of such a constraint in the form of an inequality representing a design standard as "whether or not the attribute value exceeds the minimum allowable value" so as to display the check results in the design plan evaluation result screen (FIGS. 31(A) and 31(B)).

In this situation, when the user clicks the procedure guide command menu to attain a method of solving the conflict, the procedure guiding means is initiated to create an attribute value change method to remove the conflict so as to display a countermeasure plan screen (FIG. 32) such that the user selects items from the contents for the removal of conflict to alter attribute values. When such a conflict removal method is missing, mitigation of constraints is to be achieved in an automatic manner or according to judgement conducted by the user through interactive operations. Namely, a constraint mitigation contents display screen (FIG. 33) is presented for selection of mitigation of constraints to desired levels. Thereafter, when the command menu 27-2 is again clicked, the design operation executing section modifies the attribute values to store the values in the attribute model. By repeatedly executing the operation above, there is generated a substitutional design plan.

Figure 35:
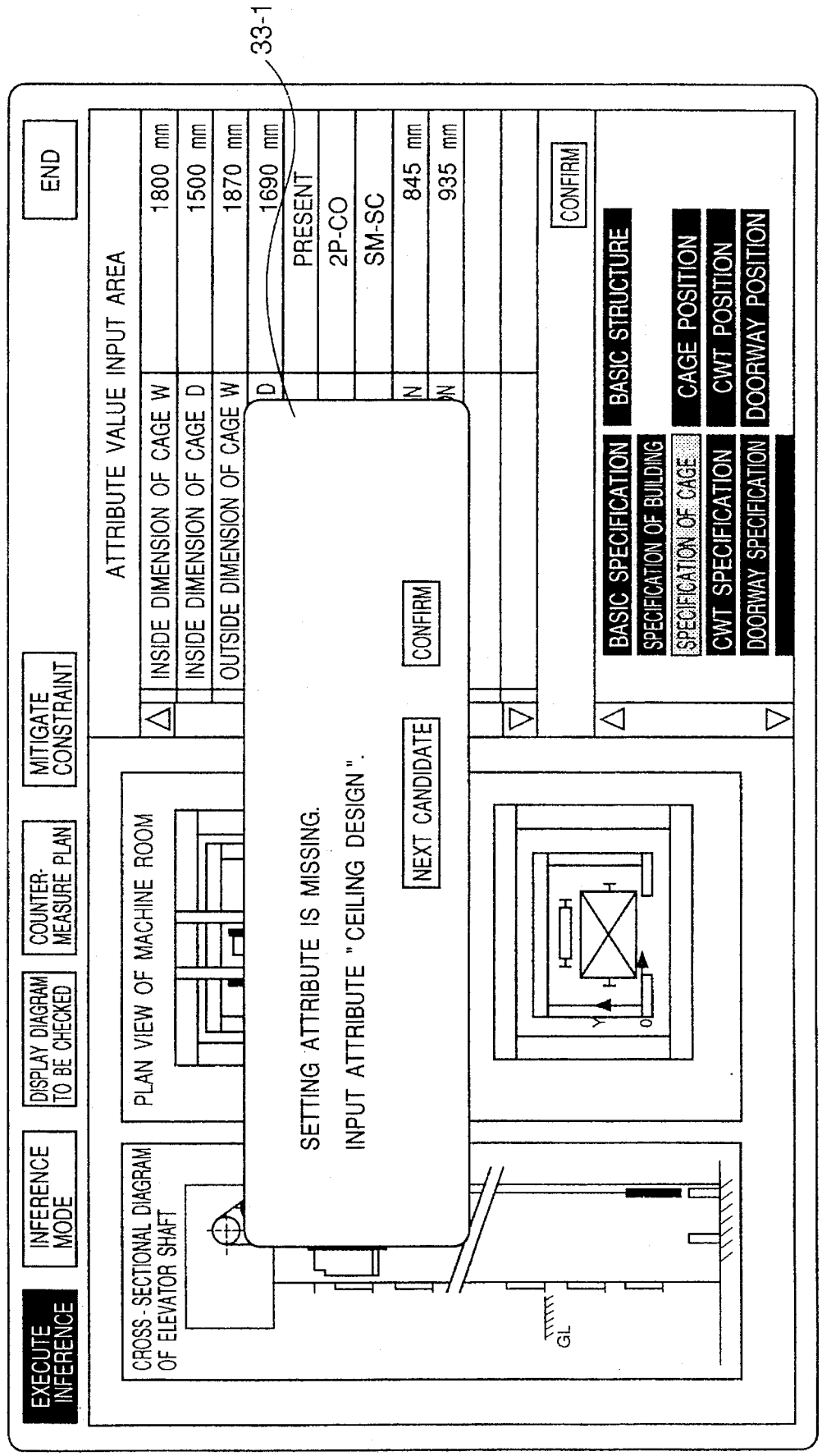
FIG. 35 is a diagram showing an attribute value input and display screen presented as a result of a design work.
Figure 36:
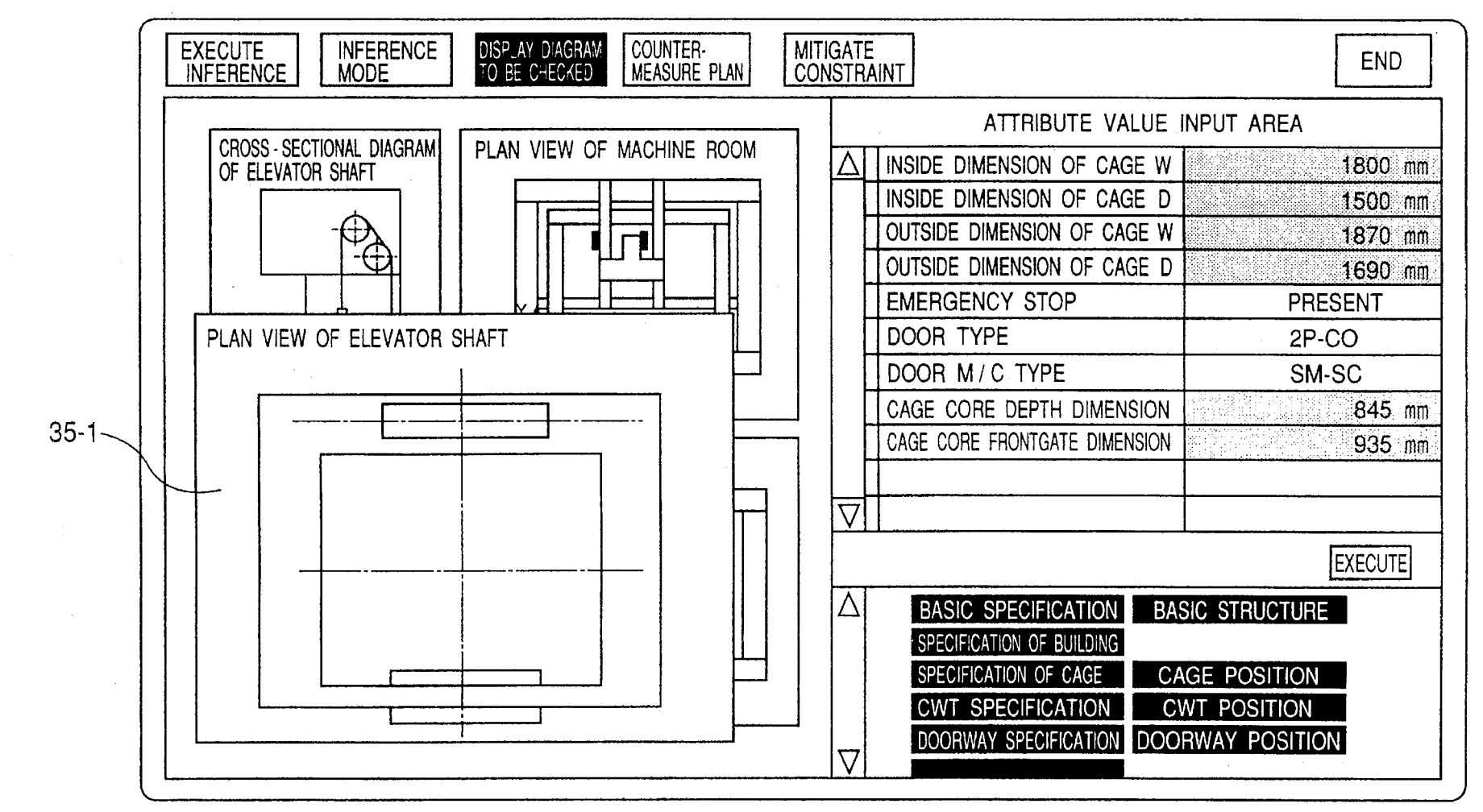

In a case where there still remain undetermined attribute values and there does not occur any conflict, the design processing is to be interrupted. To overcome this difficulty, the enquiry generating function is activated to create an attribute which decides, when a value thereof is inputted, possibly the largest number of undetermined attribute values so as to display an enquiry generation screen (FIG. 34), thereby requesting the user to input the value of the attribute. When the user inputs the value, the value is set to the attribute model so as to accordingly execute constraint propagation. After the processing above is repeatedly effected, in a case where all attribute values of the design object model are established without any conflict, when the user clicks the check or discussion diagram display command menu, the design plan display data creating means of the design data control section presents a design plan display screen (FIG. 36) on the display. In addition, on the attribute value input and display screen 34-1, the respective attributes are displayed in different colors according to a condition that each value is inputted by the user, is a default value, or is set through the inference (FIG. 35).

Moreover, when an attribute value related to the structure pattern of the product is varied during the design, the design data control section changes a set of attributes and a set of constraints as the design object model to be used for generation of a design plan and then displays the attribute value input and display screen undergone the change so as to allow the user to input and to display attribute values with integrity, thereby continuing the design according to a dynamic change of the product structure.

As described above, according to the embodiment, with the provision of the respective display screens to interactively proceed processing of the design data control section, the design procedure guiding section, and the design execution operating section with the user, when values of attributes requested by the client are inputted or when existing attribute values are modified, a design procedure is decided according to constraint knowledge between attributes and possibility or impossibility of change of each attribute value so as to interactively attain a design plan satisfying the request. Moreover, since the execution order and direction of constraints are controlled according to importance of constraints and importance of attributes, design procedures conforming to a variety of request patterns can be automatically produced according to importance data of attributes and constraints registered for each request pattern. Furthermore, when a conflict occurs during a design job, a substitutional design plan is created according to a conflict removal method and constraint mitigation so as to provide a design aiding apparatus capable of guiding the design procedure for the user to appropriately conduct the design work at a high speed.

Embodiment 4

Figure 37:
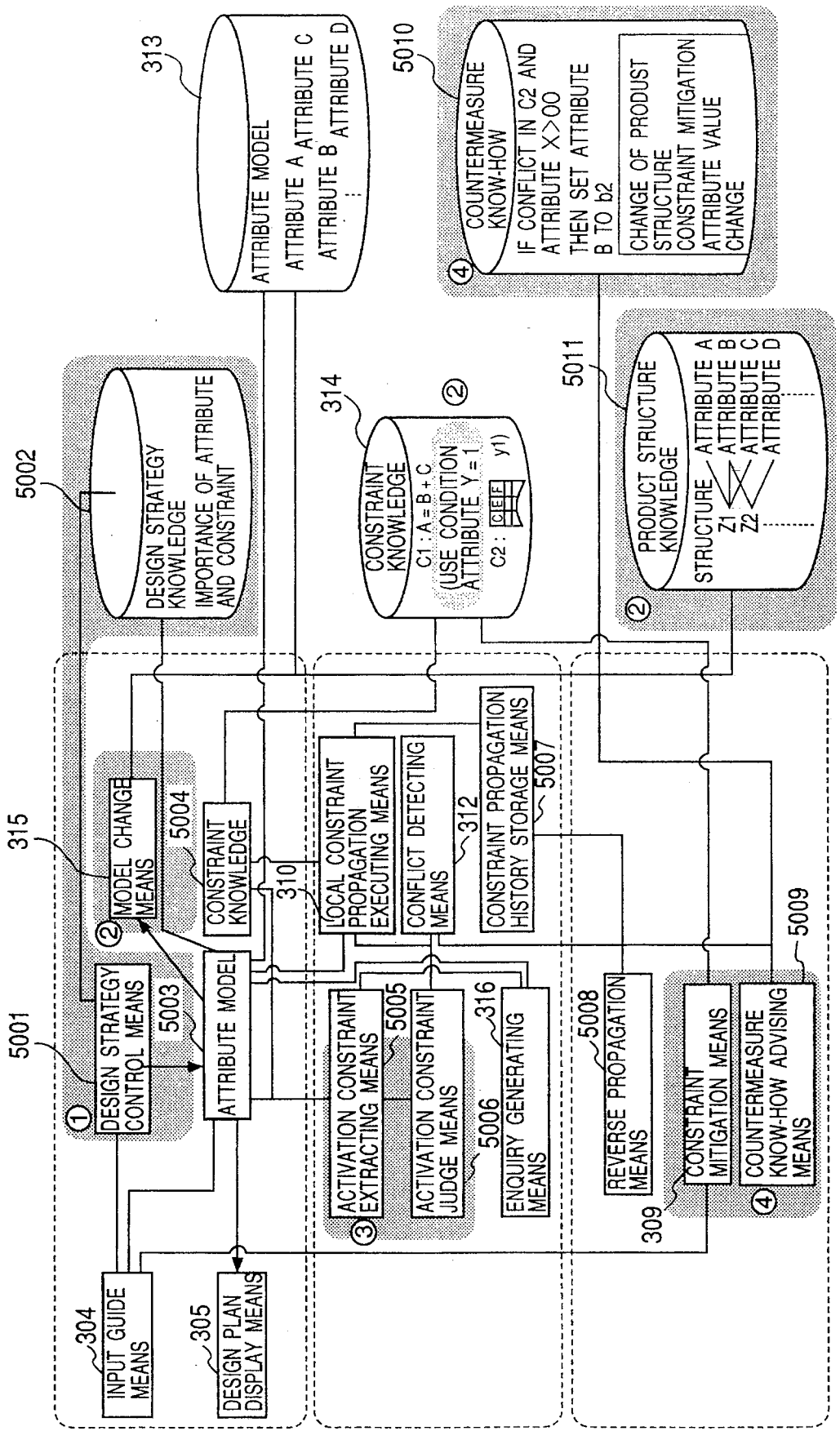
FIG. 37 is a diagram showing the configuration taken from a different point of view of the functional construction of FIG. 1.
Figure 38:
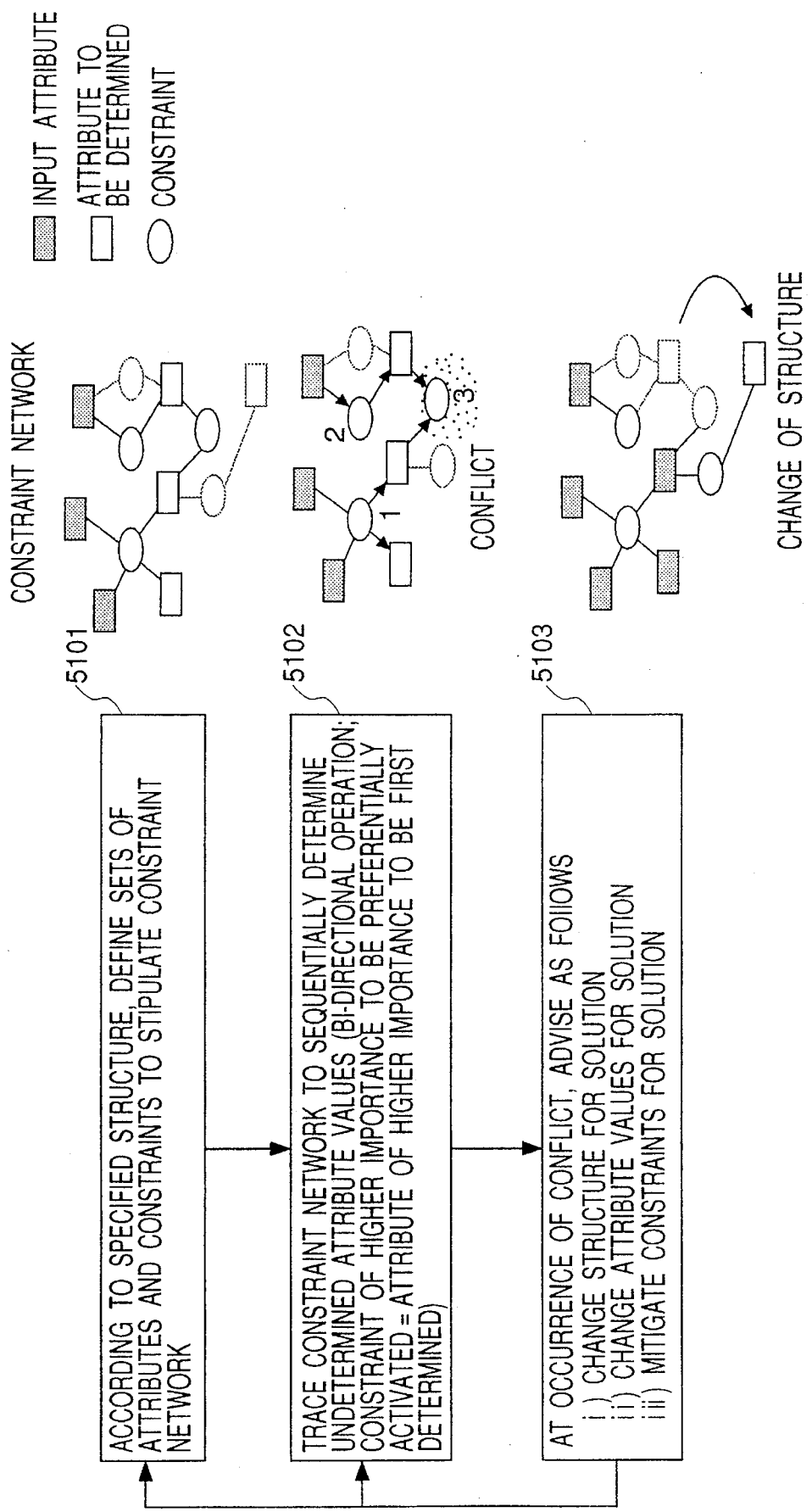
FIG. 38 is a general flowchart related to the constitution diagram of FIG. 37.

Referring next to FIGS. 37 to 45, description will be given of a fourth embodiment according to the present invention. FIG. 37 shows an example of the software configuration to implement the embodiment. Basically, the example is constituted of means shown in the software constitution diagram of FIG. 3. In FIG. 37, however, the respective means are linked with each other according to relationships of reference in the operation thereof to clarify the relationships so as to describe operation of characteristic portions of the present invention. The construction of FIG. 37 includes a design strategy control means 5001 in which a plurality of weight data items representing importance of each attribute and each constraint are registered such that weight data items are read according to a specified request pattern to assign the items to attributes and constraints and design strategy knowledge 5002 for storing therein the weight data. Moreover, there are disposed usage conditions for constraints of product structure knowledge 5011 and the constraint knowledge 314 to be referenced by the design object model change means 315. In addition, the constraint propagation execution order deciding means 307 is further constituted of activation constraint extracting means 5005 and activation constrain judge means 5006. Furthermore, the conflict removal means 308 is formed of countermeasure know-how advising means 5009 for advising countermeasure to solve conflict according to the know-how of experienced persons, countermeasure know-how 5010 to be referenced by the means 5009, constraint propagation history keeping means 5007, and a reverse propagation means 5008. In addition, FIG. 38 shows a general flowchart of the operation.

The operation of the design aiding system will next be described by reference to, by way of example, a case of an elevator as an object product. In a case where there is displayed by the input guide means 304 attributes related to the basic specification and structure of the design object in the attribute value input area. When default values are set to the pertinent attribute values, an attribute value input screen displaying initial values and a menu of a request pattern of the client are displayed. When the user selects desired attribute values and a request pattern, the design object model change means 315 changes a set of attributes to be used in an inference according to the product structure knowledge 501, for example, such knowledge to activate a set of attributes representing a design object according to classification of a product structure as "when the value of an attribute Z expressing classification of the product structure is Z1, the design object is represented by a set of A, B, C, etc., and when the value is Z2, the object is represented by a set of attributes B, D, etc.". That is, attribute data of the set is extracted from the attribute model knowledge base 313 to be developed on the attribute model 5003 which is a work area to store therein data of attributes for use in the inference. Moreover, the change means 315 extracts from the constraint knowledge base 314 constraints for which the attributes developed on the model 5003 are assumed as related attributes thereof and constraints conforming to the constraint use conditions associated with the input attribute values, for example, constraints satisfying a condition "when the value of an attribute Y is y, the constraint C1 (attribute A=attribute B+attribute C) is employed in the inference", thereby developing the constraints on the constraint knowledge as a work area to store therein constraint data to be used in the inference.

Next, description will be given of the following examples of request patterns related to an elevator, for example, as shown in FIG. 15, selected by the user so as to be processed by the design strategy control means 5001.

1) There are known, on the client side, the basic specification of the elevator, for example, attributes such as "load" and "speed" representing primary functions of the elevator and the building specification such as "elevator shaft" and "machine room" representing the building space of the elevator. Based on these attribute values, it is desired to obtain the standard machine specification and layout specification matching the elevator shaft.

2) Only the basic specification of the elevator is known. Under this condition, it is desired to determine the minimum size of the elevator shaft in which machines satisfying the basic specification are arranged.

To conduct automatic creation of design procedures respectively corresponding to the request patterns 1 and 2, importance items of constraints and attributes associated with values of the request patterns are read from the design strategy knowledge 5002 to be set to attributes and constraints in the attribute model 5003 and the constraint knowledge 5004 onto which the attributes and constraints to be used for an inference are developed. Moreover, the input guide means 304 sets the input values to the developed attributes (processing from the initiation up to this point corresponds to a step 5101).

When the inference is started in response to a selection by the user, the activation constraint extracting means 5005 extracts, for the inputted attributes, constraints which can be activated. In the extraction, judgement is conducted to decide the form (table, equation, or inequality) of each contract and the activation form (set or check) of the constraint according to a direction of activation. When a plurality of activation constraints are extracted and hence there occurs conflict therebetween, the activation constraint judge means 5006 determines constraints having a higher importance according to importance of the conflicting contracts and attributes and then decides, as an execution contract, a contract causing to determine a value to a related attribute having a higher importance, thereby reporting the contract to the local contract propagation means 310. In addition, when modification of an attribute value is to be propagated, there is selected, paying attention to importance of attributes related to the constraint, an attribute having a lower importance for modification so as to pass the attribute to the propagation means 310. The means 310 then reads the body of the constraint indicated by the judge means 5006 to calculate, according to the activation form, values of undetermined attributes and modification attributes (the processing from the initiation of inference to this point corresponds to a step 5102). In addition, the conflict detection means 312 detects any conflict occurred during the execution of local constraint propagation. At detection of such a conflict, the means 312 interrupts the inference and notifies the occurrence of conflict to the user. When the user selects a countermeasure plan in response thereto, the advising means 5009 advises a method of changing the product structure, a method of mitigating the conflicts, and a method of altering the inputted request attribute values according to the countermeasure know-how of experts to remove the conflict based on the constraint for which the conflict occurs and the state of other attribute values, for example, as follows (step 5103).

| | |
|---|---|
| IF | Conflict in constraint C and attribute X > X1 |
| THEN | Change product structure Z to Z2 |
| | or |
| | Mitigate conflict C2 |
| | or |
| | Alter attribute B to B2 |
| | When the user selects a change of attributes | representing the product structure and the value change is accordingly achieved for the product structure, the change means 315 operates according to usage conditions of the product structure knowledge 5011 and the constraint knowledge base 314 to establish the attributes not to be used for the inference due to the attribute value change of the product structure and the constraints related thereto, and then constraints satisfying the use conditions are set to the active state. A set of attributes and a set of constrains changed as a result are developed onto the attribute model 5003 and the constraint knowledge 5004. Thereafter, the execution of constraint propagation is commenced again.

Alternatively, when the user selects mitigation of constraints, the constraint mitigating means changes the mitigation level of the constraint specified by the user and then the execution of constraint propagation is commenced again.

Alternatively, when the user selects modification of attribute values, the constraint propagation retaining or keeping means 5007 keeping history of constraint propagation-including history of a case where the sets of constraints and attributes are changed at an intermediate point of processing, extracts input attributes related to the constraint causing the conflict, namely, the conflict cause attributes. Moreover, the reverse propagation means 5008 calculates modification values for the input attribute values. When the user selects the modification values, the constraint propagation is initiated again.

The processing above is repeated until all attribute values to be used in the inference are determined without any conflict. When the attributes are thus desired, the design solution display means 305 displays the contour of the design object associated therewith. When the inference is finished with some attribute values undetermined, the enquiry creating means 316 generates an enquiry to request the user to input undetermined attribute values.

As above, in the design aiding system according to the present invention, design procedures can be generated in association with various request patterns. Furthermore, the inference can be continued even when there occurs a structure change, and know-how can be incorporated in the system, thereby obtaining a design solution while interactively solving conflicts at a high speed.

The design solution is attained through the operations of the respective means above. Next, description will be given of the contents of the respective means.

Figure 41:
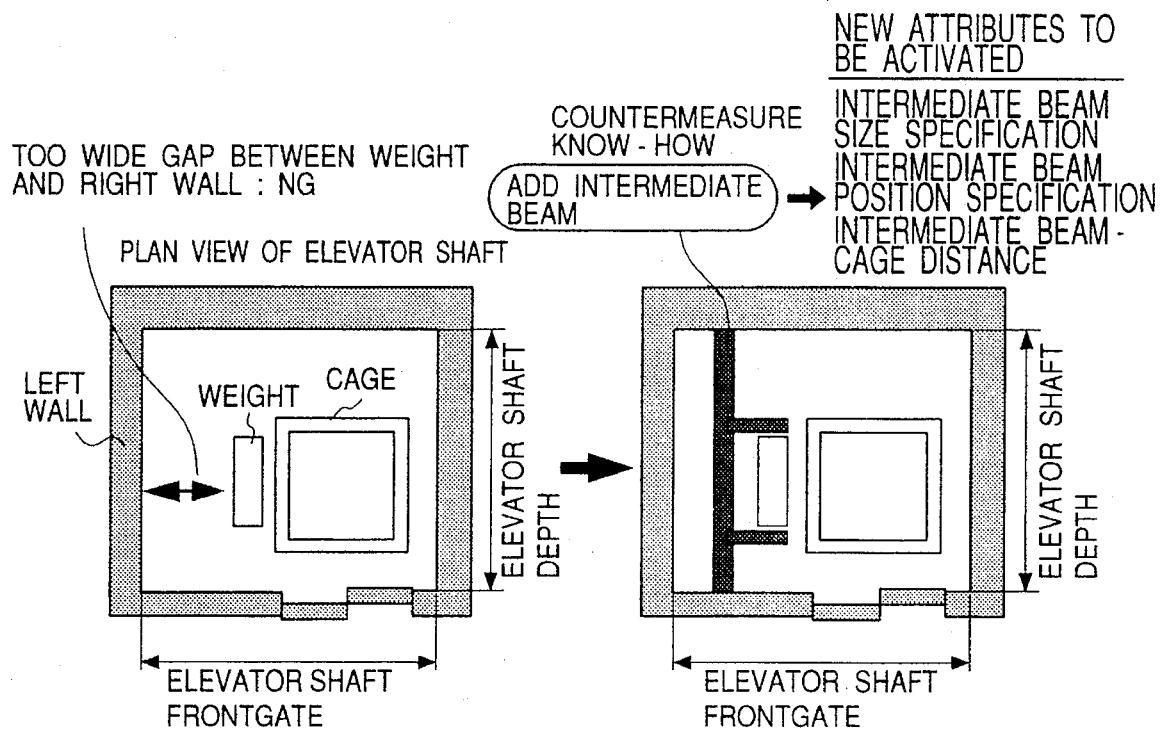
FIG. 41 is a diagram showing an example of countermeasure know-how to instruct, for removal of a conflict taking place during constraint propagation, change of a product structure.
Figure 42:
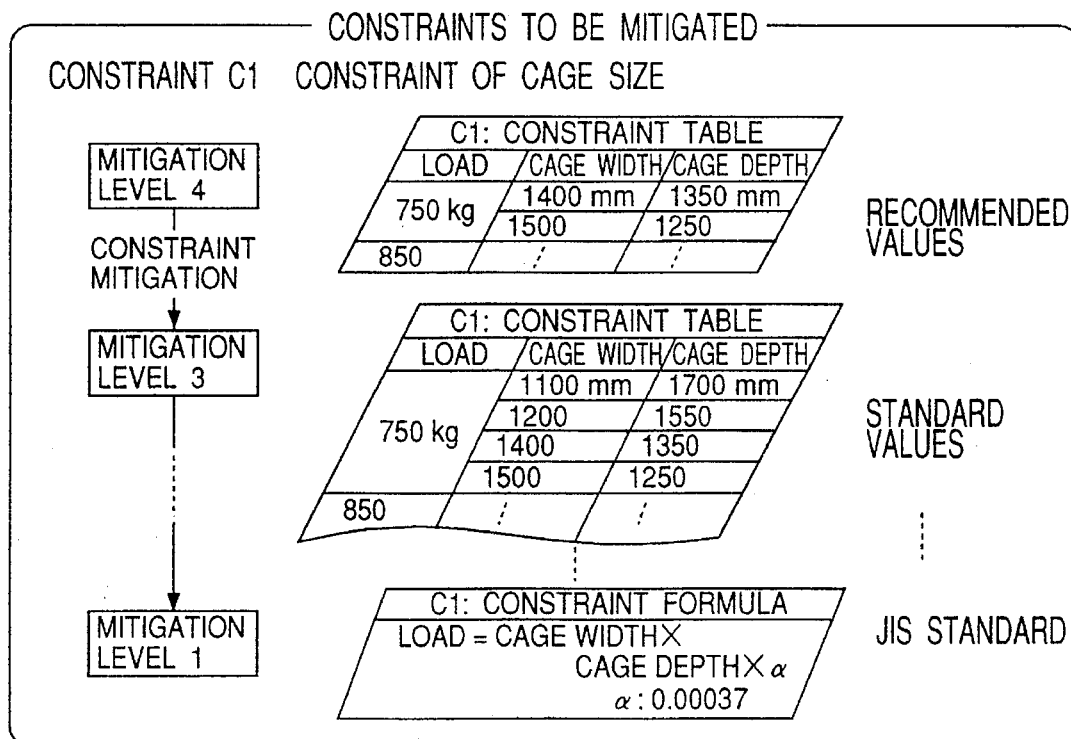
FIG. 42 is a diagram showing the contents of constraint mitigation.

For the model change means 315, assume an example of change of the sets of attributes and constraints. Namely, as shown in FIG. 39, the weight of cage is considerably increased for the elevator of 1:1 roping system in the initial state. Since there exists a constraint of allowable limit load between the 1:1 roping and the cage weight, the roping system is required to be changed to 2:1 roping. However, for the 2:1 roping, there are additionally required two pulleys to hang the cage and the weight. Consequently, in order to continue the constraint propagation to proceed the design, it is necessary to add items related to the new pulleys to the sets of attributes and constraints. Moreover, the contents of constraints also vary according to values of attributes. For example, as shown in FIG. 40, comparing a case of a single-swing door (2S-2P) and a case of a double-leaf door (2P-CO), the contents of constraint associated with core shift L between the cage and the door vary therebetween. In consequence, it is necessary to change the contents of the constraints according to the door type to achieve constraint propagation so as to calculate the appropriate attribute values. In a case, as shown in FIG. 41, where the gap distance between the weight and the wall is too large as a result of the inference, an intermediate beam is added to attach a rail thereonto for the weight such that a change is required to add attributes and constraints of the specifications of the size and form of the intermediate beam and a position thereof to the sets of attributes and constraints. Namely, the change means 315 changes, in the case above, the sets of attributes and constraints with integrity.

Furthermore, for the constraint mitigating means 309, there stepwise exist several levels of strictness for constraints. For example, in a case "cage size selecting constraint" in the diagram, there are used constraints including first a constraint of recommended value, i.e., "design is effected with this value if possible" and stepwise selection standards in a broad range prepared on the side of the firm. In a case of the broadest selection range, there is used a constraint of an equation type, namely, "any value may be adopted only if the product between the cage width and the depth is constant to be proportional to the load" stipulated by JIS. In a technical discussion process, for a particular change request or the like of the cage size, mitigation is achieved from the constraint (recommended value) of the higher strictness to the constraint of the lower strictness in a stepwise manner, thereby obtaining a design solution. In this situation, for the constraints which can be mitigated as above, it is allowed to register the constraints in a hierarchic fashion according to, for example, mitigation levels thereof.

Moreover, to carry out the operation above, the data description format of the attribute model 313 can be represented, for example, as shown in FIG. 43. There are registered ① attribute name, ② unit, ③ form, ④ value range in which the value can take a value, ⑤ default value, ⑥ classification, and ⑦ activating conditions as description items to control a set of attributes, namely, any condition for constraint propagation due to activation of the attribute registered in association with a value of a basic structure attribute (e.g. roping). For these items, all specification items necessary to complete the design are extracted and are defined as attributes.

Figures 44, 45:
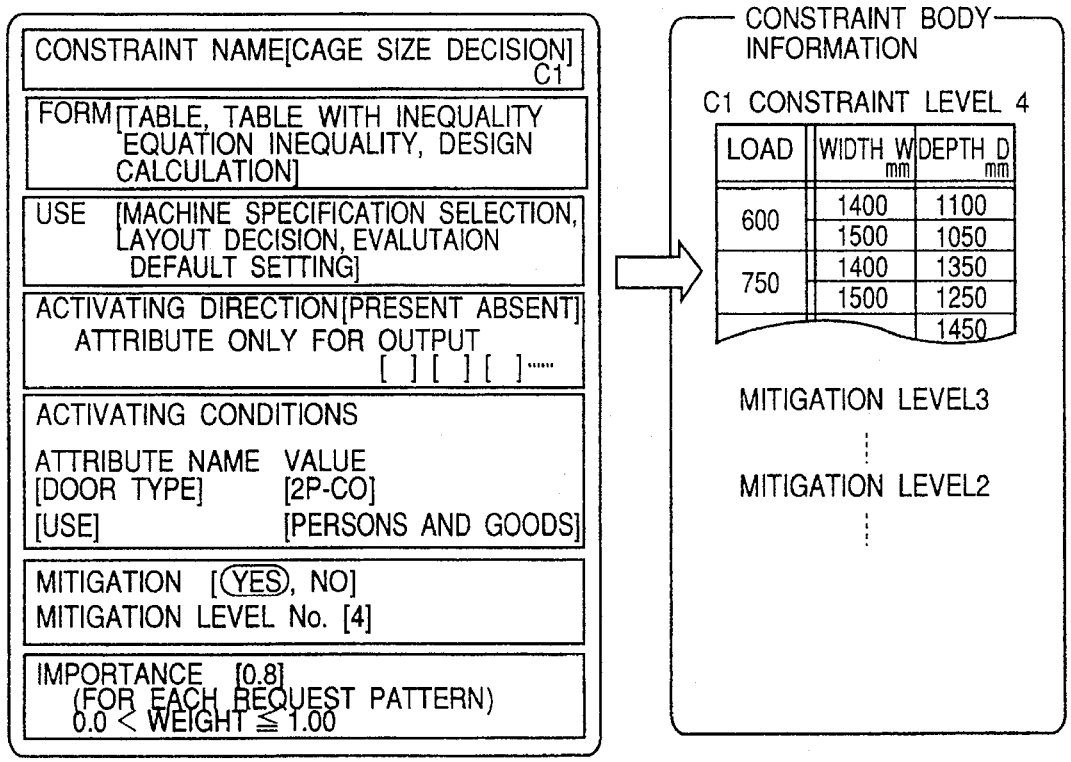
FIG. 44 is a diagram showing the description format of constraint knowledge.
FIG. 45 is a diagram showing conditions for activation of constraints.

Furthermore, as for the description format of the constraint knowledge 314, items can be represented, for example, as shown in FIG. 44. There are registered ① constraint name, ② form, ③ use, ④ activating direction to be defined together with an output attribute name when the constraint activation direction is specified as "present", ⑤ activating condition as a description item to control a set of constraints in which any condition of activation of constraint for propagation thereof is registered in association with a value of an attribute, and ⑥ possibility or impossibility of mitigation to declare the constraint which can be mitigated. The level number for the mitigation are registered together with the body of constraint for each mitigation level.

In addition, for the relational rules between attributes, data of constraint body can be represented, for example, as shown in FIG. 45. That is, the data can be defined in either one of five forms including a table, a table with inequality, an equation, an inequality, and a design calculation. In the constraint propagation process, there are two activation forms of constraint, namely, 1) "set" (to set attribute values by use of a constraint) and 2) "check" (to decide, according to the determined attribute values, whether or not the constraint is satisfied). Moreover, the activation form varies depending of differences of use. For example, in the default setting constraint, when the user does not input any value, standard attribute values are set; however, even when the constraint is not satisfied, there does not occur conflict. In contrast therewith, for the machine specification selection and the layout decision constraint, the attribute values are determined (set) and a check is made to guarantee that the constraint is satisfied.

Embodiment 5

Referring now to FIGS. 46 to 50, description will be given of the fifth embodiment according to the present invention. In this embodiment, in a case where a conflict occurs in constraint propagation, a method of changing attribute values is notified by the countermeasure know-how advising means 5009 such that the attributes to be altered are indicated according to the qualitative know-how of experts or the cause of conflict is determined through the history of constraint propagation so as to attain modification values for the attributes to solve the conflick. Particularly, the embodiment is related to a conflict removal method in a constraint propagation including a constraint of which the contents vary according to values of attributes.

Ordinarily, the history of constraint propagation is stored only for variables as attributes of which values are already determined, namely, the history of changes of contents of constraints are not stored. This consequently leads to a problem when a cause of a conflict is to be decided according to the history of constraint propagation, namely, consideration has not been given to variables associated with changes of the contents of constraints and hence there cannot be obtained as a conflict cause such a variable related to a change of the constraint contents.

Furthermore, only the decision a variable as the cause of conflict in the constraint propagation has been considered, namely, it has not been considered how to alter the variable. Consequently, there has been a problem that the value of a variable obtained, to solve the conflict, as the cause of conflict is required to be changed in a trial-and-error manner, thereby checking the value of the variable.

An object of the this embodiment is to attain, for a conflict occurring, for example, in a process of constraint propagation, an input variable causing the conflict by tracing the history of constraint propagation so as to obtain a cause of conflict which makes it possible to solve the problem, thereby solving the problem above.

To achieve the object above, the configuration of the embodiment includes constraint propagation means to execute constraint propagation, constraint change means to change the contents of constraints, constraint propagation history storage means and constraint change history storage means for respectively recording and for keeping therein history respectively of the constraint propagation means and the constraint change means, constraint propagation history data generated by the constraint propagation history storage means, constraint change history data created by the constraint change history storage means, and constraint reverse propagation means operative at occurrence of conflict to conduct a trace according to the constraint propagation history data and the constraint change history data in the reverse direction so as to obtain a cause of the conflict and a method of solving the conflict.

With the provision above, the history of changes of contents of constraints caused by the constraint change means can be retained (as the constraint change history data) by the constraint change history storage means and hence the constraint reverse propagation means can obtain as a cause of conflict also a variable related to a change of the contents of constraint.

In addition, thanks to the constraint reverse propagation means, the history of constraint propagation can be traced in a reverse direction with respect to the direction of constraint propagation to attain a variable as the cause of conflict. Moreover, a value can be propagated in the reverse direction with respect to the direction of constraint propagation to attain a value of the variable causing the conflict, the value making it possible to solve the conflict. According to the present invention, consequently, there can be obtained, for a conflict occurring in a process of constraint propagation, a variable as the cause of conflict and a value thereof which enables the conflict to be solved.

Figure 46:
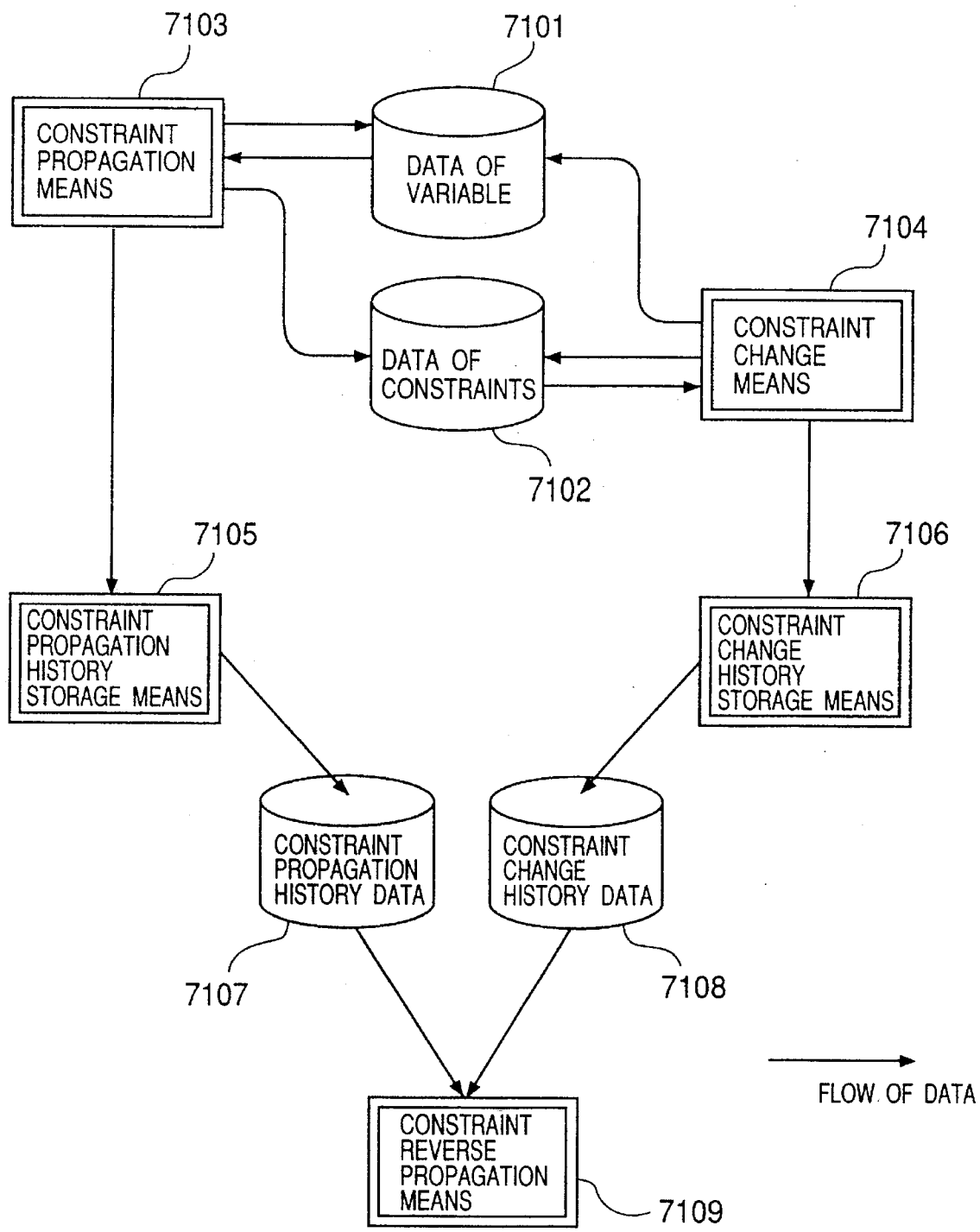
FIG. 46 is a diagram showing the constitution of a constraint propagation system according to the present invention.

FIG. 46 shows the construction diagram of the embodiment. This diagram includes data of variables 7101 constituted of values of variables and the determined state of value, constraint data 7102 indicating the contents of constraints as relational rules between variables, constraint propagation means 7103 for reading determined states and values of variables from the data 7101 and the contents of constraints from the data 7102, determining and writing values of undecided variables in the data 7101, constraint change means 7104 for replacing the values of variables from the data 7101 and the constraint data from the data 7102 with the contents of constraints thus read and writing the results in the data 7102, constraint propagation history storage means 7105 operative when a value of variable is determined by the means 7104 for writing a constraint related to determination of the value and the variable necessary for the determination and the determined variable in constraint propagation history data 7107, constraint change history storage means 7106 operative when the contents of constraints are changed by the means 7103 for writing the variable as the change condition and the constraint resultant from the change in the data 7107, the constraint propagation history data 7107 including data written by the means 7106, constraint change history data 7108 including data written by the means 7105, and means 7109 for tracing, according to the data 7107 and 7108, constraints and variables in a direction reverse to the direction of constraint and value propagation and propagating the values in a direction reverse to the direction of the constraint and value propagation.

Figure 47:
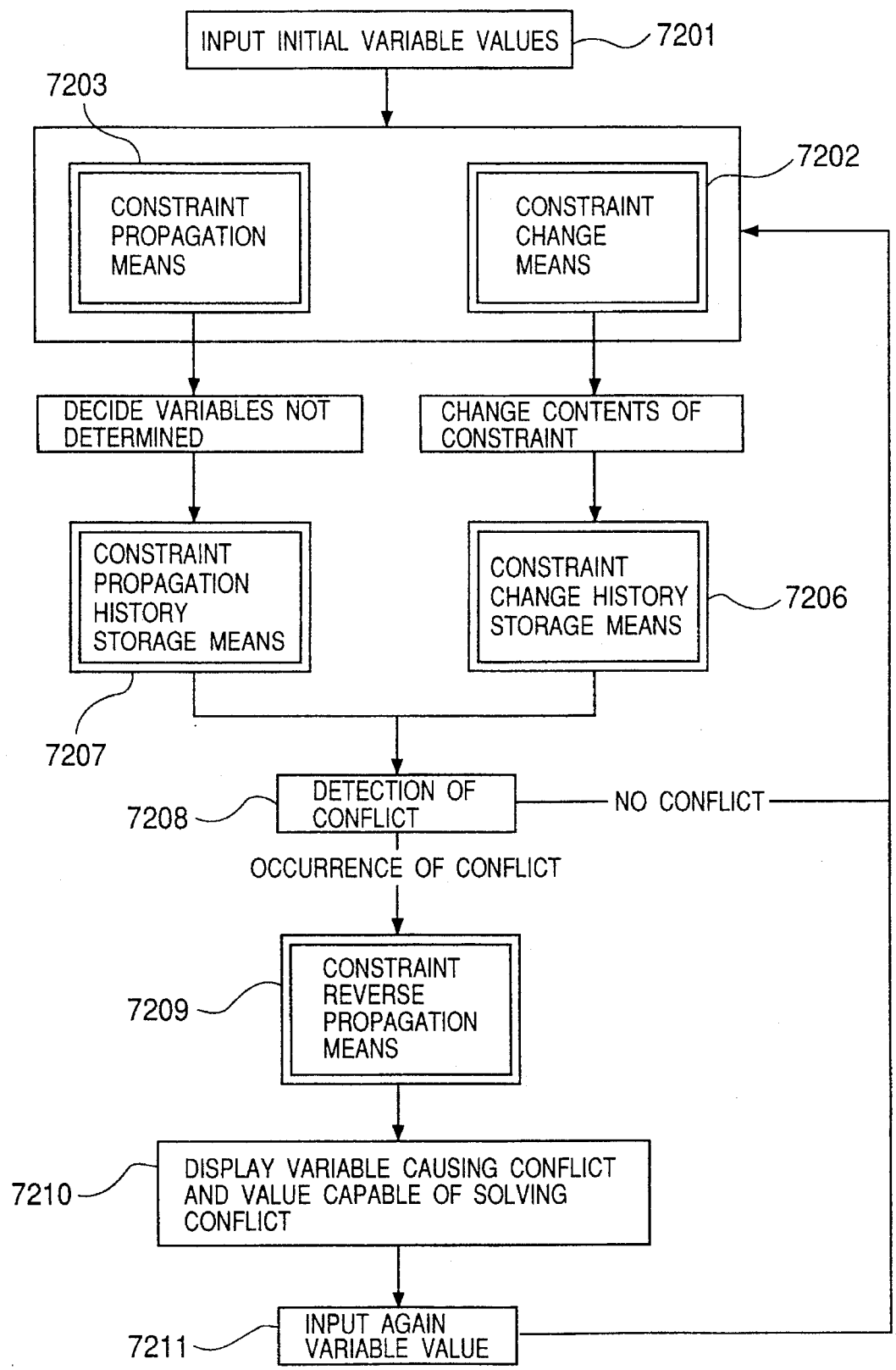
FIG. 47 is a flowchart showing the operation of the constraint propagation system according to the present invention.

FIG. 47 shows a flowchart of a processing procedure. Referring to FIG. 47, description will be given of a process of achieving the object above.

First, initial values are inputted for variables and then the input values are determined (step 7201). Among the determined variables, for any variable which enables the constraint propagation means and the constraint change means to be executed, these means are executed (steps 7202 and 7203). When the constraint propagation means is executed (step 7203), values of undetermined variables are decided and then the constraint propagation history storage means records the history thereof in the constraint propagation history data (step 7207). When the constraint change means is executed (step 7202), the contents of constraint are changed such that the constraint change history storage means records the history thereof in the constraint change history data (step 7206). When the constraint propagation means or the constraint change means is executed, a check is made to decide whether or not a conflict occurs (step 7208). If any conflict is not detected, control is returned to processing of the constraint propagation means and the constraint change means. If the check results in an occurrence of conflict, the constraint reverse propagation means is initiated (step 7209).

First, the constraint reverse propagation means makes a search through the constraint propagation history data to attain history in which the value of variable causing the conflict is determined so as to set as a provisional conflict cause variable the variable recorded as a variable necessary to determine the variable in the history. In addition, a check is made to determine whether or not the contents of the constraint determining the variable of the history are changed in the constraint change history data. If this is the case, the variable as the change condition is also set as a provisional conflict cause variable. For each variable as the provisional conflict cause, the processing of the constraint reverse propagation means is repeatedly accomplished to conduct a trace in a direction reverse to the direction of propagation of constraints and values. When there is missing the history related to determination of the variable of provisional conflict cause, the pertinent variable is assumed to be related to the conflict cause.

In the processing of the constraint reverse propagation means, for values of provisional conflict cause variables which can solve the conflict, the constraint is concurrently executed in a direction opposite to the direction of the propagation of constraints and values, thereby attaining values thereof.

When the processing of the constraint reverse propagation means is completely finished, the conflict cause variables thus detected and the values to solve the conflict are presented (step 7210), and then values of variables for removing the conflict are inputted from an external device, thereby returning control again to the processing of the constraint propagation means and the constraint change means.

The overall processing above is repeatedly accomplished until there does not exist any processing to be executed by the constraint propagation means and the constraint change means.

Figures 48, 49, 50:
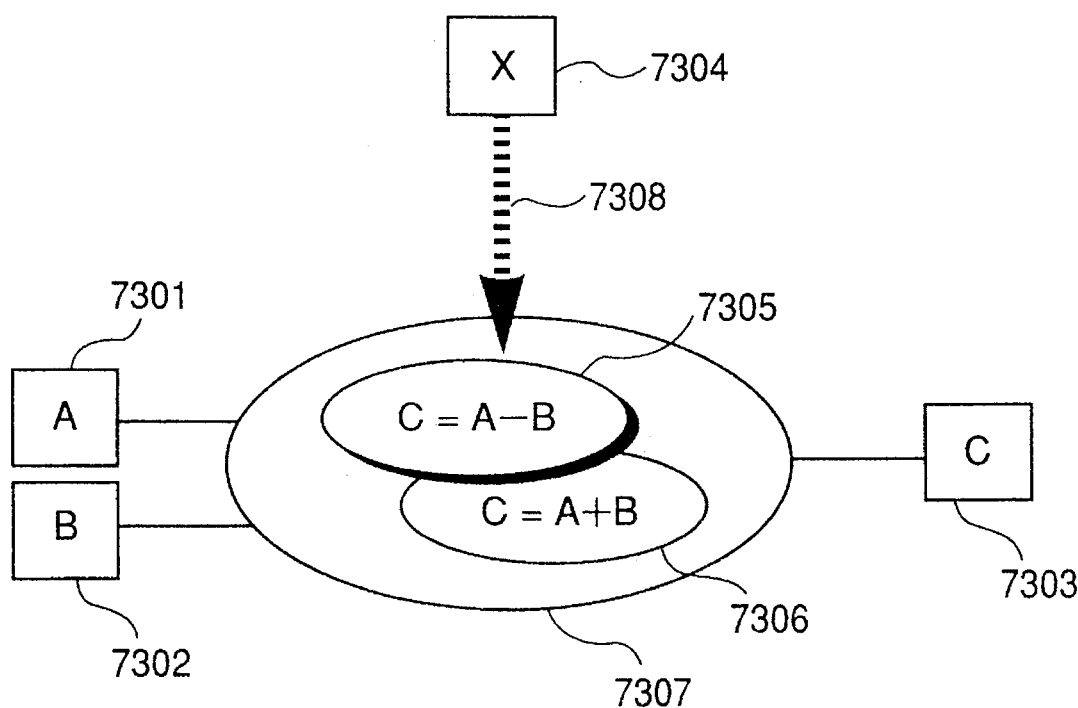
FIG. 48 is a diagram showing the relationships between constraints and variables to explain an embodiment 5 according to the present invention.
FIG. 49 is a diagram showing history data of constraint propagation of the embodiment 5.
FIG. 50 is a diagram showing history data of constraint change operation of the embodiment 5.

Description will be given of a case where a conflict occurs in constraint propagation according to the constraint relationships including those shown in FIG. 48. In FIG. 48, reference numerals 7301 to 7304 respectively indicate variables X, A, B, and C, a numeral 7305 is a constraint between the variables A, B, and C represented by an expression C=A+B, a numeral 7306 stands for a constraint between the variables A, B, and C represented by an expression C=A−B, and a numeral 7307 designates a constraint between the variables A, B, and C of which the contents are represented by the constraint 7305 or 7306 according to the variable X. A numeral 7308 indicates a relationship to change the contents of the constraint 7307 in which the contents thereof are represented by the constraint 7305 when the value of variable X is at least 0 and by the constraint 7306 when the value of the variable x is less than 0.

The constraint propagation is executed as follows.

(1) Variable X=−10 is determined according to the value externally inputted, and hence the expression 7306 is set as the contents of the constraint 7307 by the constraint change means.

(2) Values of variables A and B are also externally supplied so as to determine A=200 and B=100.

(3) Since the variables A and B are determined, the constraint 7307 is executed by the constraint propagation means.

C=A−B=200−100=100

As a result, the variable C is determined as C=100.

(4) The value of variable C is thud determined, the constraint propagation is continuously executed.

(5) As a result of processing (1) and (2), there is attained history of constraint propagation only with respect to constraint relationships of FIG. 48. The history includes the constraint propagation history data of FIG. 49 and the constraint change history data of Fig. 50.

Assume that a conflict has occurred in a process of the constrain propagation. The constraint reverse propagation means is initiated from a variable where the conflict has occurred. Achieving the trace in the reverse direction, the variable C in the constraint relationships of FIG. 46 is attained as a provisional conflict cause variable. Moreover, for the variable C, the value which can solve the conflict is attained as 300. Thereafter, processing of the constraint reverse propagation means is accomplished as follows.

(6) Making a search through the constraint propagation history data for a constraint having determined the value of variable C, there is obtained the constraint 7307. The determination is caused by the variables A and B. The variables A and B are assumed to be provisional conflict cause variables.

(7) Conducting a retrieval through the constraint change history data for history having determined the contents of constraint 7307, it is recognized that the variable X is the condition of determination of the contents. The variable X is assumed to be a provisional conflict cause variable.

(8) According to the results of (6) and (7), it is found that the value of variable C is determined by the variables A, B, and X. In addition, there does not exist any constraint determining the values of these three variables (i.e. these values are externally inputted), the three variables are obtained as the cause of conflict.

(9) For the variable C, the value which can solve the conflict is 300. In this connection, since the variables A, B, and X are provisional conflict cause variables in the constraint relationships of FIG. 48, calculations are carried out for the three variables to solve the conflict. First, transforming the expression 7 of the constraint 7307, C=A−B
A=C+B.
From these expressions,
A=C+B=300+100=400
Namely, it is appreciated that the conflict can be removed when A=400. Similarly, for the variable B,
B=A−C=200−300=−100.
That is, the conflict can be removed when B=−100.
Subsequently, a calculation is made for the variable X to attain a value to solve the conflict.
When X is 0 or more, the contents of constraint 7307 is represented by the expression 7305.
C=A+B
300=200+100
When X is less than 0, the contents of constraint 7307 is represented by the expression (of the current constraint)
C=A−B
300≠200−100=100
As a result of the calculation for X, the calculation can be achieved without any conflict when X is 0 or more. Accordingly, the conflict can be solved in either one of the following cases.
A=400
B=−100
X≧0.

Embodiment 6

Figures 51, 52, 53:
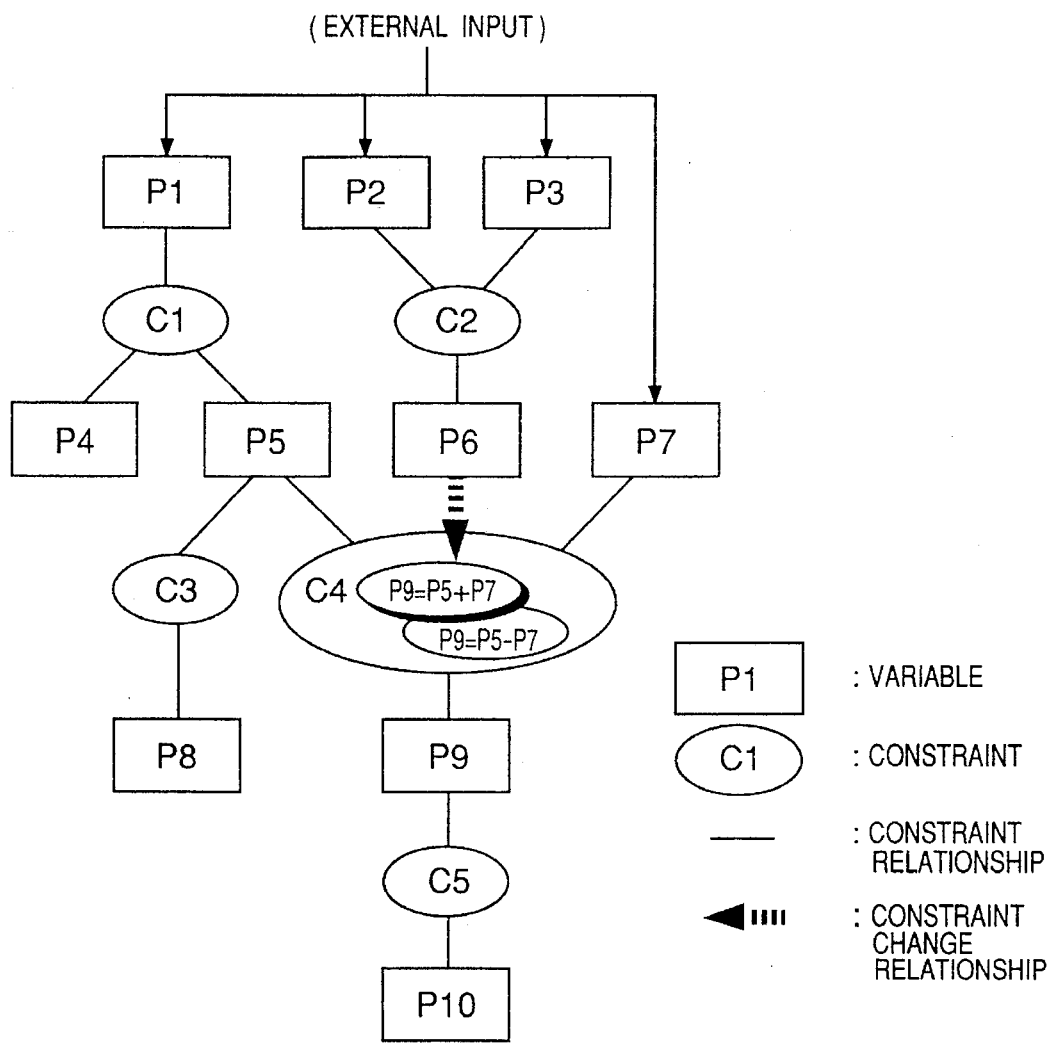
FIG. 51 is a diagram showing the relationships between constraints and variables to explain an embodiment 6 according to the present invention.
FIG. 52 is a diagram showing history data of constraint propagation of the embodiment 6.
FIG. 53 is a diagram showing history data of constraint change operation of the embodiment 6.

Next, description will be given of the sixth embodiment of the similar configuration according to the present invention. This embodiment is associated with an example of constraint propagation based on relationships between variables and constraints shown in FIG. 51. When the constraint propagation is accomplished in this example, there are attained constraint propagation history data of FIG. 52 and constraint change history data of FIG. 53. When a conflict occurs in a variable P10 during the constraint propagation, the constraint reverse propagation means carries out the reverse trace, for example, as follows.

(1) From the constraint propagation history data, there is detected history having determined the value of variable P10.

(2) It is recognized that the value of variable P10 is determined by a constraint C5 and the variable P9 is necessary for the determination. The variable P9 is assumed as a provisional conflict cause variable.

(3) Making a search, like in the case of (2) above, through the constraint propagation history data for history having determined the value of the provisional conflict cause variable P9, there is obtained a constraint C4. Variables P5 and P7 necessary for the determination are assumed as provisional conflict cause variables.

(4) The constraint C4 is in the constraint change history data and hence the variable P6 used as the condition for the change is also assumed as a provisional conflict cause variable.

(5) A search is made, like in the case of (2) above, for provisional conflict cause variables P5, P7, and P6 in the history data. Since the values of P5 and P6 are determined according to the constraints C1 and C2, variables P1 to P3 respectively necessary for the determination are assumed as provisional conflict cause variables.

(6) History determining the value of the provisional conflict cause variable P7 is missing in the constraint propagation history data, and hence the variable P7 is assumed as a provisional conflict cause variable.

(7) An attempt is conducted, like in the case of (2) above, to detect history having determined the values of the provisional conflict cause variables P1 to P3 in the constraint propagation history data. Since the history is missing therein, the variables P1 to P3 are assumed as provisional conflict cause variables.

(8) As a result of processing above, the variables P7, P1, P2, and P3 are determined as the variables causing the conflict.

For the values of these four variables, there are conducted calculations, like in the first embodiment, to attain values which can solve the conflict.

As above, even when a conflict occurs in the design aiding system according to the present invention, the cause of conflict can be obtained and the method of solving the conflict can also be presented.

Moreover, there may be employed a method of removing the conflict in which the values of variables causing the conflict are kept undetermined such that based on the history, there is repeatedly achieved an operation in which the variable determined by the variable kept undetermined is set to the undetermined state.

Embodiment 7

Next, referring to FIGS. 54 to 59, description will be given of the seventh embodiment according to the present invention.

Figure 54:
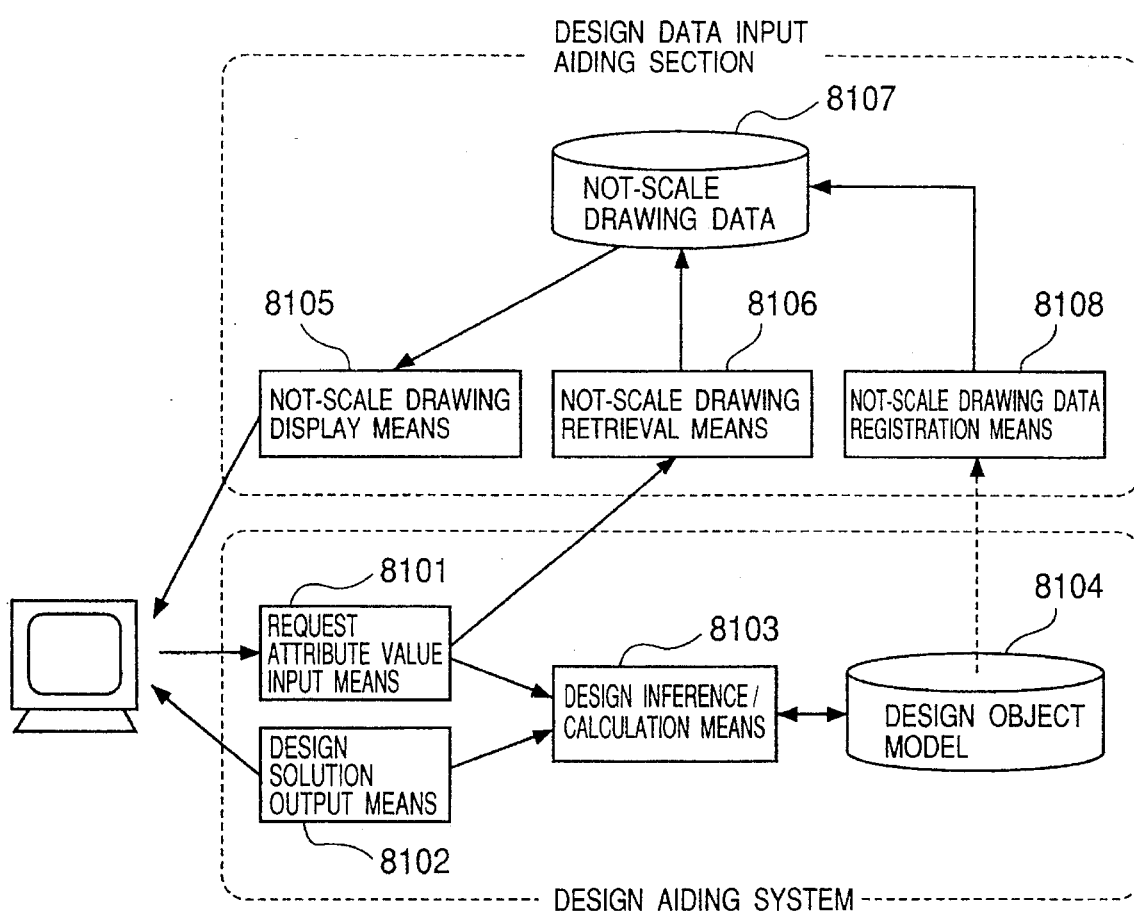
FIG. 54 is a diagram showing the functional configuration of a design data input support system in an embodiment according to the present invention.

FIG. 54 is a diagram showing the general functional constitution of a design aiding apparatus including a design data input aiding system in the seventh embodiment according to the present invention. In FIG. 54, a reference numeral 8101 indicates request attribute value input means for storing an attribute model and constraint knowledge of a design object model and inputting therefrom attribute values, a numeral 8102 denotes design solution output means for producing a design solution as a result of design inference and or calculation, a numeral 8103 stands for design inference/calculation means, a numeral 8104 indicates a design object model including a design object model constituted of attribute models and inference rules, a numeral 8105 designates a not-scale drawing display means, a numeral 8106 denotes a not-scale drawing retrieval means, a numeral 8107 stands for not-scale drawing data, and a numeral 8108 indicates not-scale drawing data registration means.

Figure 55:
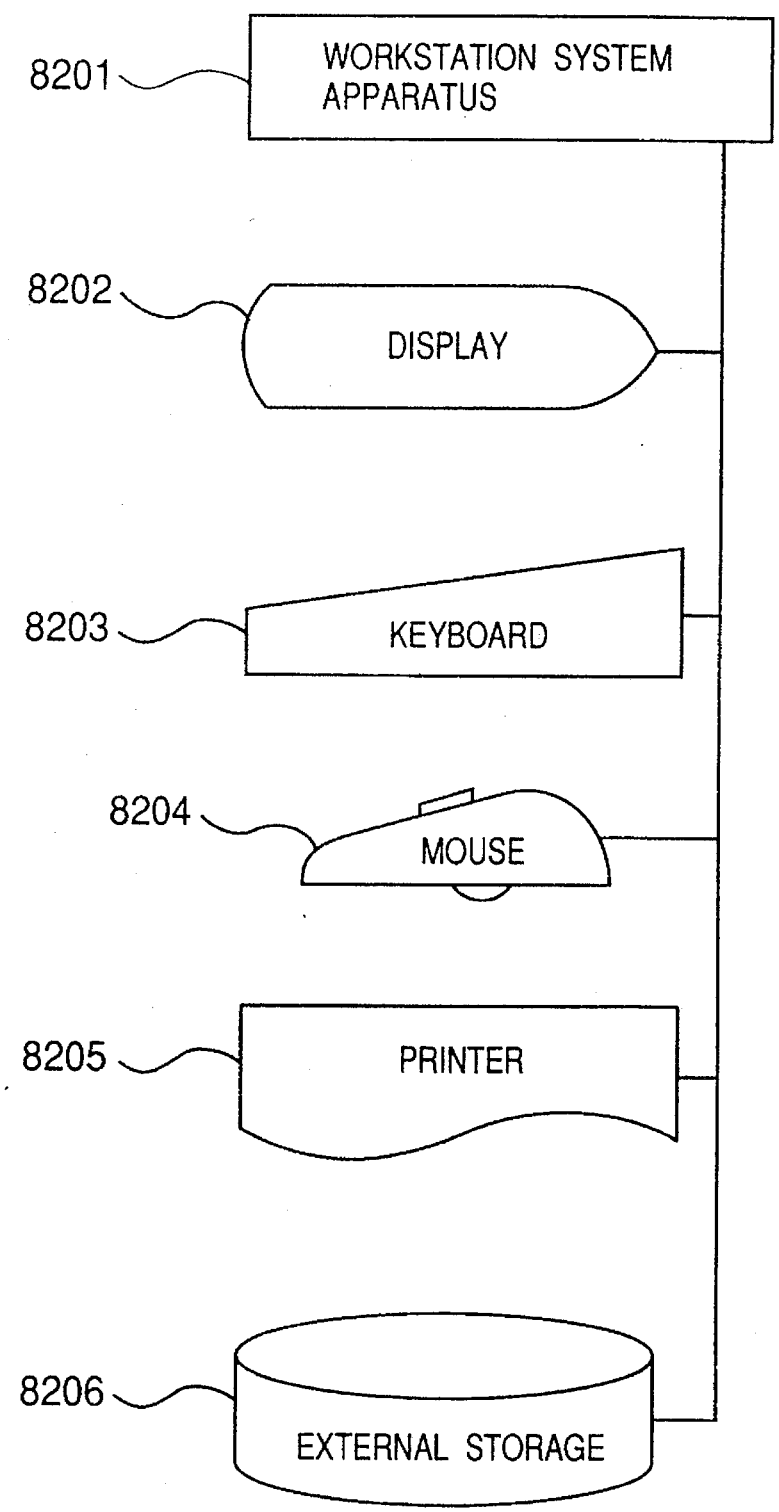
FIG. 55 is a diagram showing the hardware constitution to explain utilization of the apparatus of FIG. 1.

FIG. 55 shows an example of the hardware construction to achieve the functions of FIG. 54. The hardware system includes a workstation 8201, a display 8202, a keyboard 8203, a mouse 8204, a printer 8295, and an external storage 8206.

Figure 56:
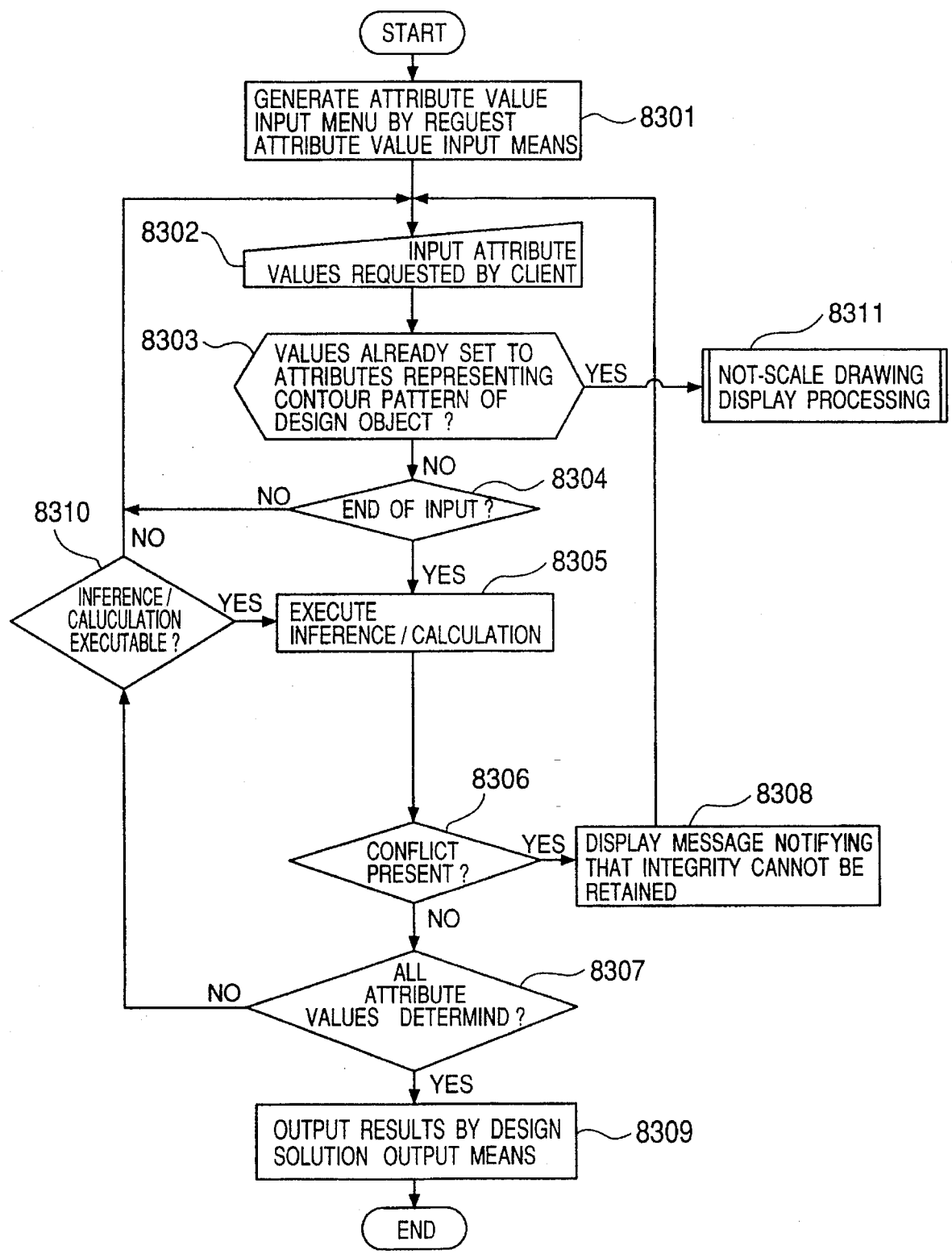
FIG. 56 is a flowchart showing the operation of a design data input support system to possess the method of FIG. 1.

FIG. 56 shows a flowchart of software implementing the functions of FIG. 54. First, a menu to input attribute values is created by the attribute value input means. According to the menu, the user inputs request attribute values. In this operation, when a value is inputted for an attribute representing a contour pattern of the design object, the not-scale drawing display processing is activated.

Thereafter, when the request items are completely inputted, the inference and/or calculation are/is executed. When there exists a conflict, a message is displayed to notify that the items are without integrity. Moreover, in a case where the design attribute values are completely obtained without any conflict, a result is outputted from the design solution output means. When there remains any undetermined attribute value, the input and/or inference operation are/is repeatedly conducted.

Figure 57:
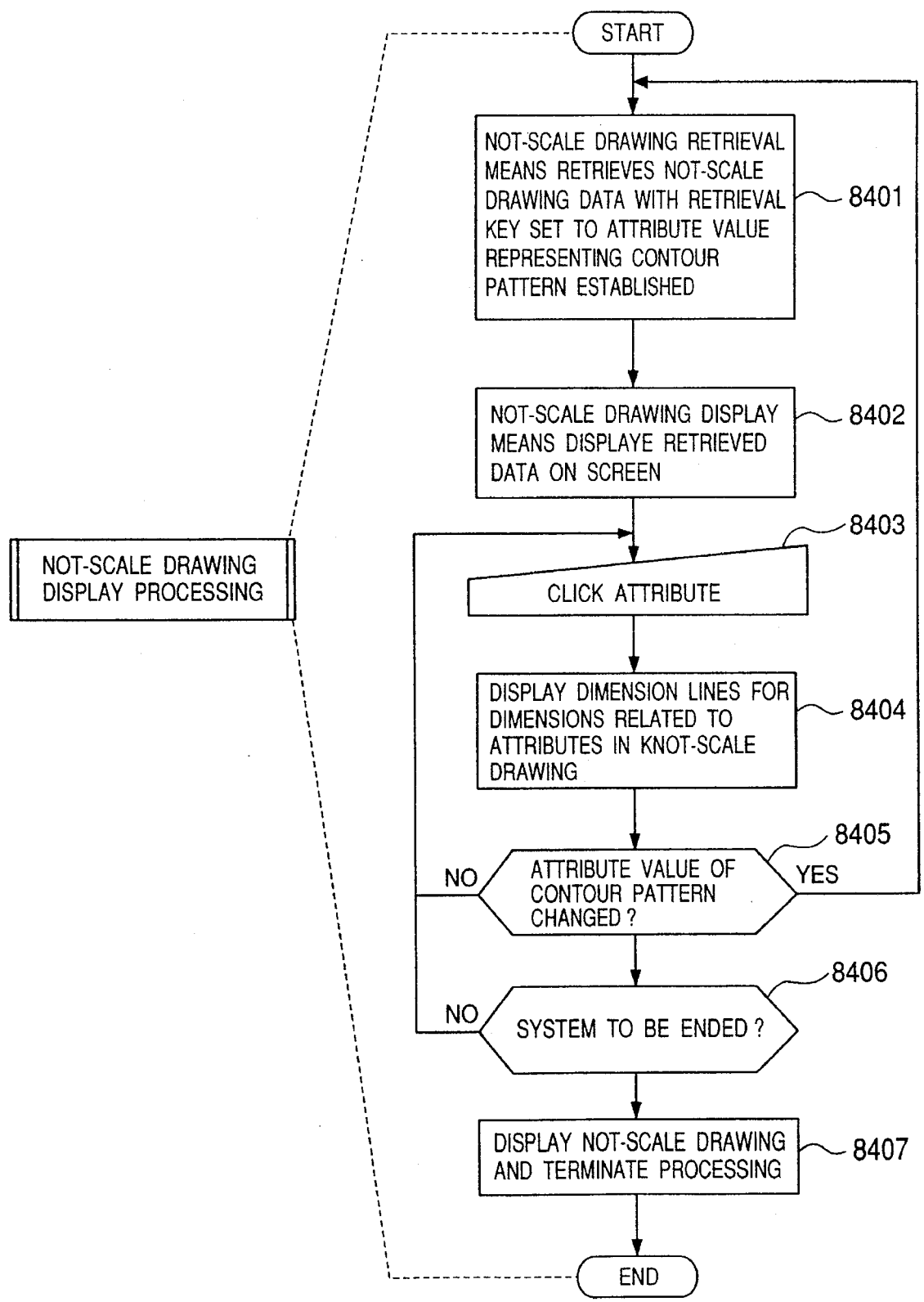
FIG. 57 is a flowchart showing the operation to display not-scale drawings.
Figure 59:
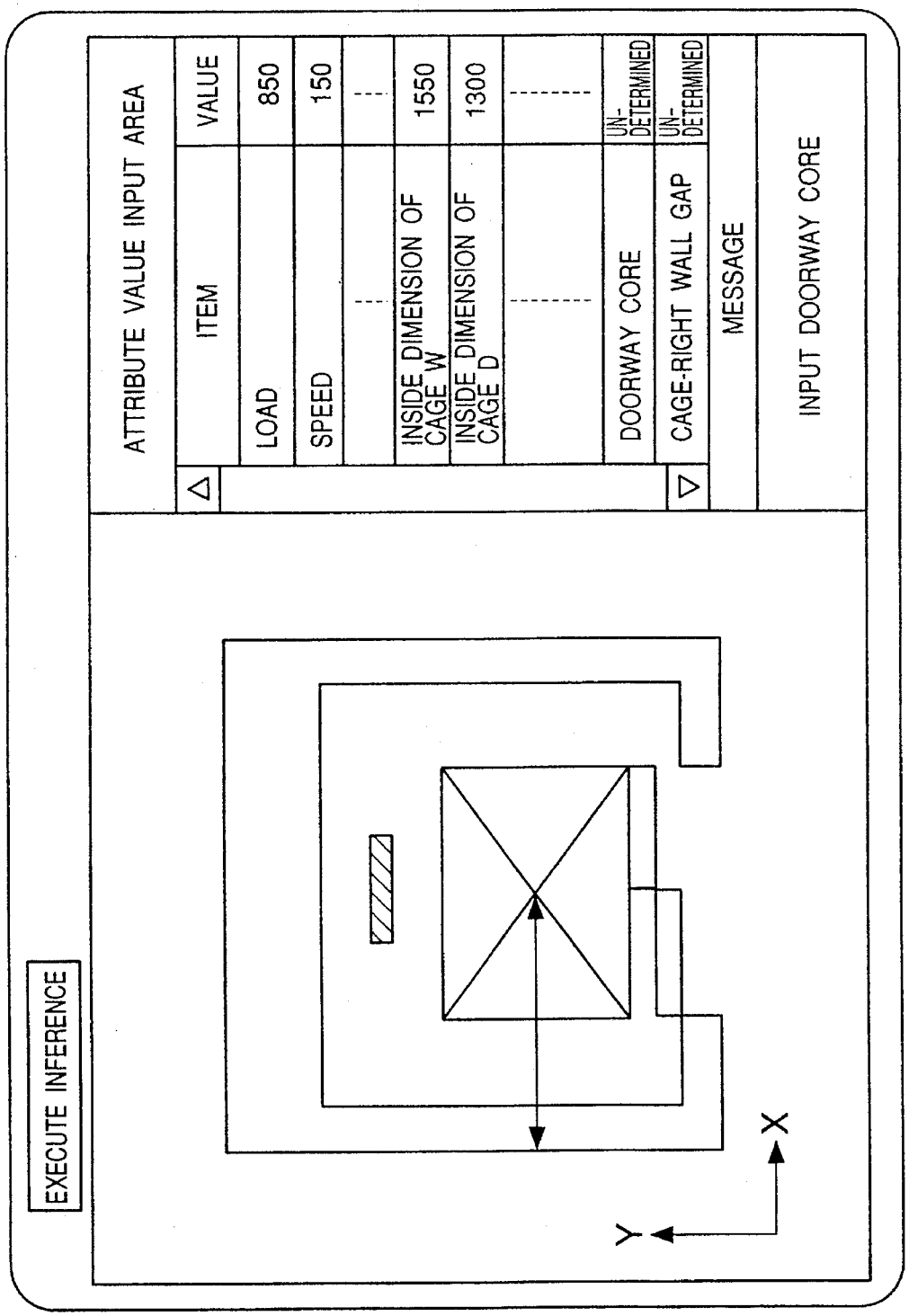
FIG. 59 is a diagram showing a not-scale drawing display screen.

Next, the not-scale drawing display processing will be described by reference to FIG. 57. First, setting as a key the attribute value expressing the contour pattern, the not-scale drawing retrieval means carried out a retrieval for not-scale drawing data. Subsequently, the not-scale drawing display means presents the retrieved data on the screen. In this situation, when the user clicks attribute items in the request attribute value input screen, dimensions of the associated attributes are displayed as dimension lines in the not-scale drawing (FIG. 59). After this point, the retrieved not-scale drawing is kept displayed until the attribute value of the contour pattern is varied. When the value is altered, the retrieval processing and the display processing are carried out again. The screen is cleared when the system is terminated.

FIG. 58 shows an example of not-scale drawing data. Arrangements of the design object model and attributes of the arrangement patterns are defined so as to register, for each arrangement pattern, correspondences between dimensions in contour data and attributes associated with the dimensions. Resultantly, with an arrangement pattern number set as a key, it is possible to retrieve a basic structure, though in the not-scale form, of the design object, which enables the user to visually confirm the basic structure and to easily understand correspondences between the respective attributes and dimensions.

Moreover, when the design data input aiding system further includes not-scale drawing data registration means to register not-scale drawing data, correspondences between the drawing data and attribute names, and retrieval conditions of not-scale drawings, there can be easily constructed the not-scale drawing data.

Embodiment 8

Referring now to FIGS. 60 to 68, description will be given of the eighth embodiment according to the present invention.

Figure 61:
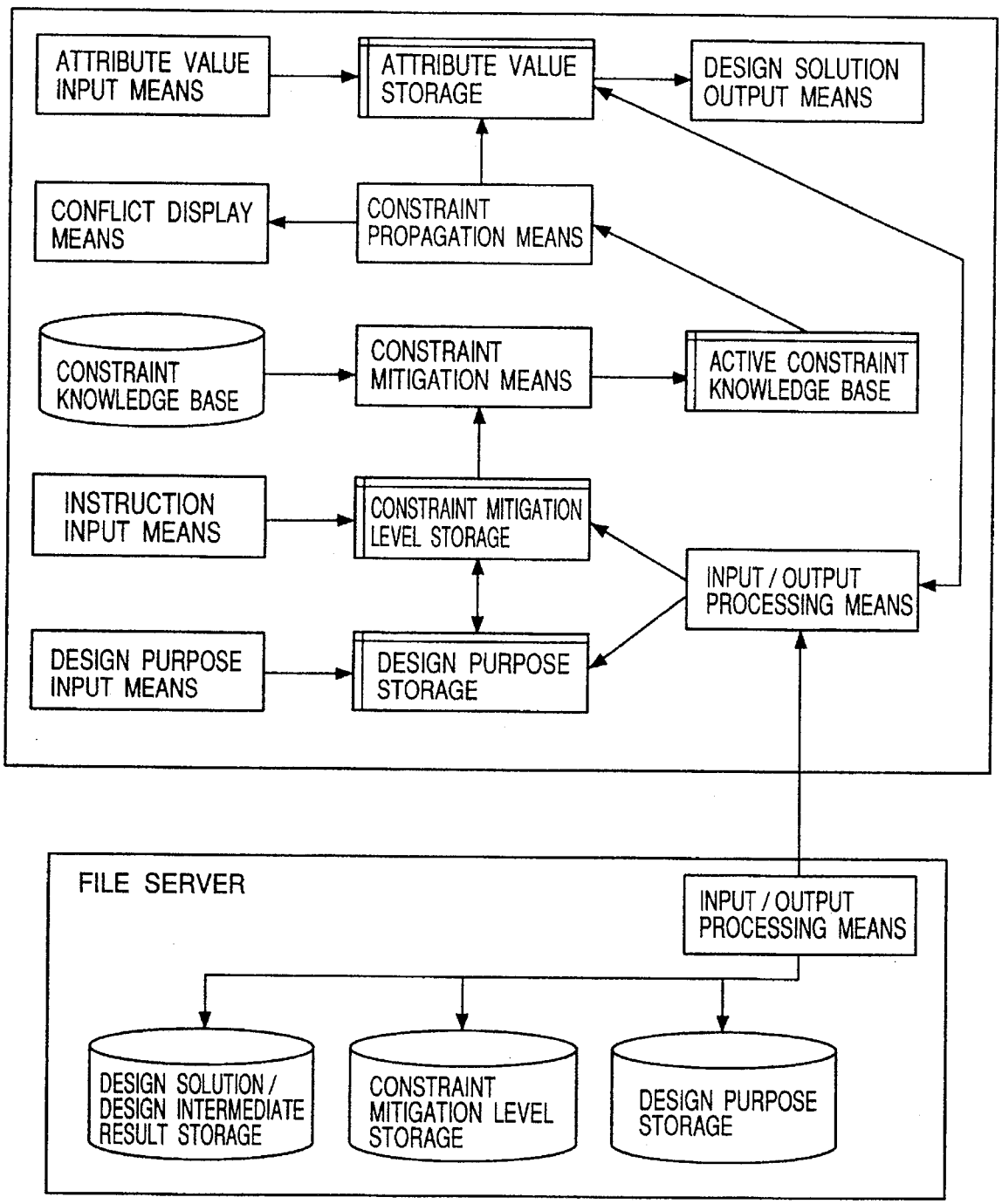
FIG. 61 is a diagram showing the constitution of a design aiding system implementing the embodiment of FIG. 60.

FIG. 61 is a diagram showing the construction of a design aiding system in the eight embodiment implementing a constraint control system according to the present invention. In FIG. 61, reference numerals 9201 to 9203 each denote a design aiding apparatus such as a workstation, a numeral 9210 is a file server to share a design solution, an intermediate result of design, mitigated constraints, constraint mitigation levels, and information related to design purpose to mitigate constraints, and a numeral 9211 designates a network to exchange information between the file server 9210 and the design aiding apparatus.

Figure 60:
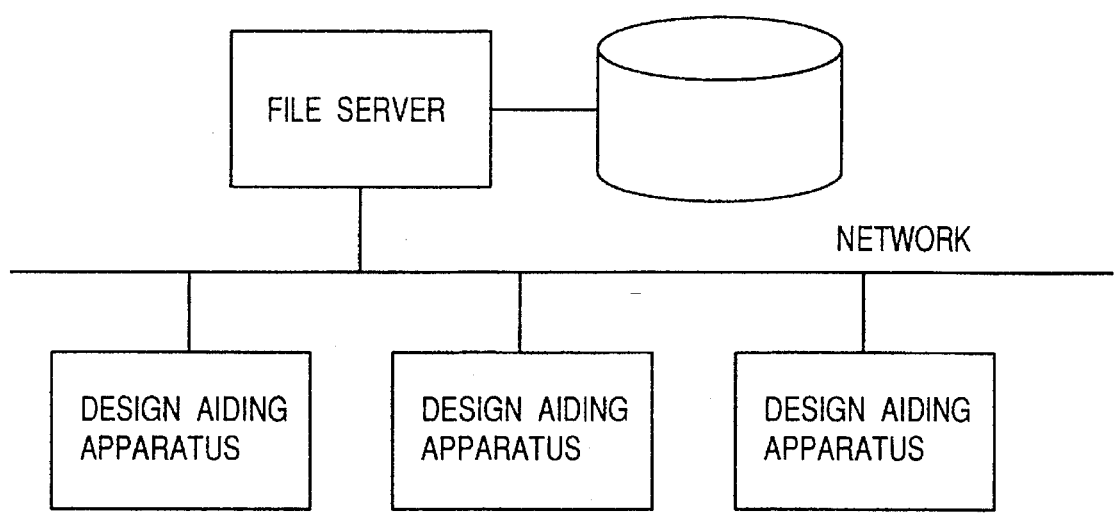
FIG. 60 is a diagram showing the functional configuration of a constraint control in an embodiment according to the present invention.

FIG. 60 is a diagram showing the functional constitution of the constraint control system. This configuration includes attribute value input means 9101 for inputting attribute values requested by the client, attribute value storage means 9102 for storing therein a specification of a design object represented with attribute values, design solution output means 9103 for outputting in the form of drawings or the like a design solution or an intermediate result of design according to the attribute values stored in the attribute value storage section 9102, a constraint knowledge base 9104 for storing therein constraints between attributes, an active constraint knowledge base 9105 for storing therein currently active constraints, constraint mitigating means 9106 for acquiring currently active constraints from the constraints stored in the constraint knowledge base 9104 and setting the constraints in the active constraint knowledge base 9105, constraint propagation means 9107 for confirming presence or absence of conflict between attribute values according to the active constraint knowledge base 9105 and obtaining undetermined attribute values according to attribute values already set so as to set the values to the attribute value storage section 9102, conflict display means 9108 for displaying, when a conflict exists between attribute values, the contents of conflict, constraint mitigation indication input means 9109 for inputting a constraint mitigation indication when a conflict between attribute values is confirmed by the conflict display means and the designer decides mitigation of constraints, constraint mitigation level storage section 9110 for storing therein a constraint mitigation level according to a constraint mitigation indication inputted from the indication input means 9109, design purpose input means 9111 for inputting, when the designer decides mitigation of constraints, a design purpose, design purpose storage means 9112 for storing therein the design purpose inputted from the input means 9111, and input/output processing means 9113 for acquiring from or storing in the file server values of attributes, constraint mitigation levels of constraints, and design purposes respectively in association with design solutions or intermediate results of design. These constituent elements are entirely disposed in the design aiding apparatus.

Reference numeral 9121 denotes a design solution/intermediate design result storage section for storing therein a design solution or an intermediate result of design achieved by the design aiding apparatus, a constraint mitigation level storage section 9122 for storing therein the contents of constraints mitigated in the operation to obtain the design solution or the intermediate result of design, and design purpose storage section 9123 for storing therein design purposes for which constrains are mitigated. These items are stored in the file server in association with the respective design solutions and/or intermediate results of design.

Figure 62:
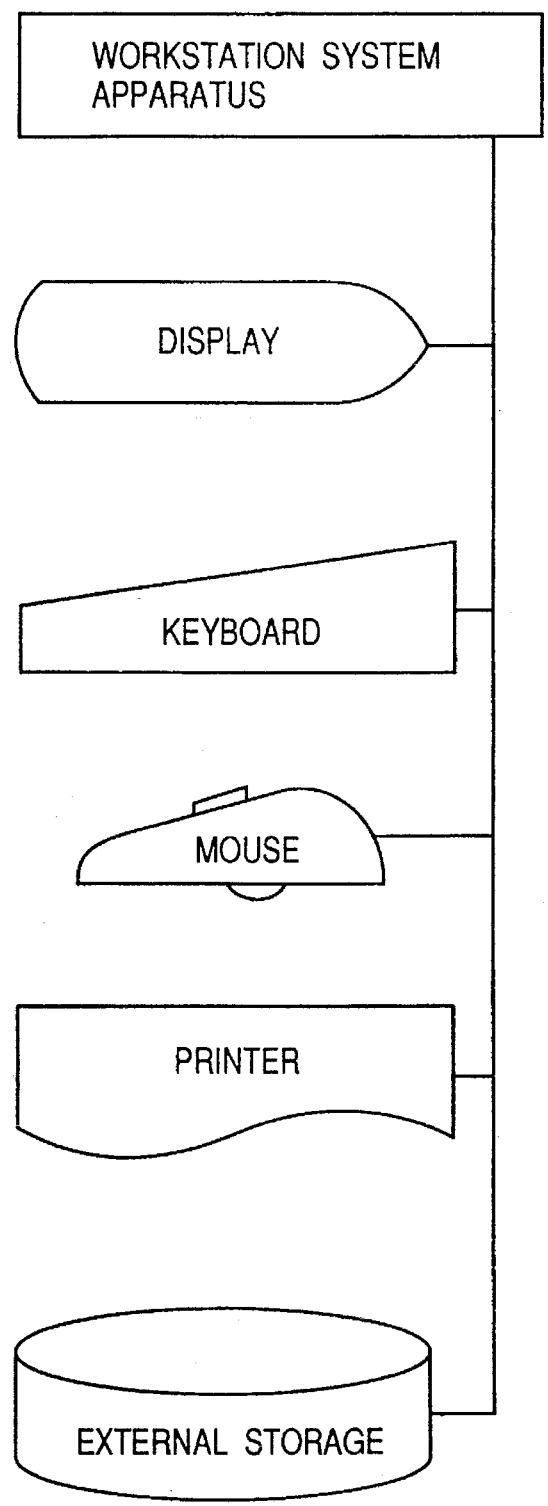
FIG. 62 is a diagram showing the hardware configurations of the design aiding apparatus and the file server of FIG. 61.

FIG. 62 shows an example of the hardware structure to implement the means of FIG. 61. In FIG. 62, reference numerals 9301 to 9306 designate units constituting a design aiding apparatus, namely, a system unit of workstation 9301, a display 9302, a keyboard 9303, a mouse 9304, a printer 9305 to output therefrom a design solution, and a unit 9306 for storing therein a constraint knowledge base. Reference numeral 9311 to 9316 denote units forming a file server, namely, a system unit of workstation 9311, a display 9312, a keyboard 9313, a mouse 9314, a printer 9315, and an external storage 9316 for storing therein the design solution/intermediate design result storage section, the constraint mitigation level storage section, and the design purpose storage section.

Figure 64:
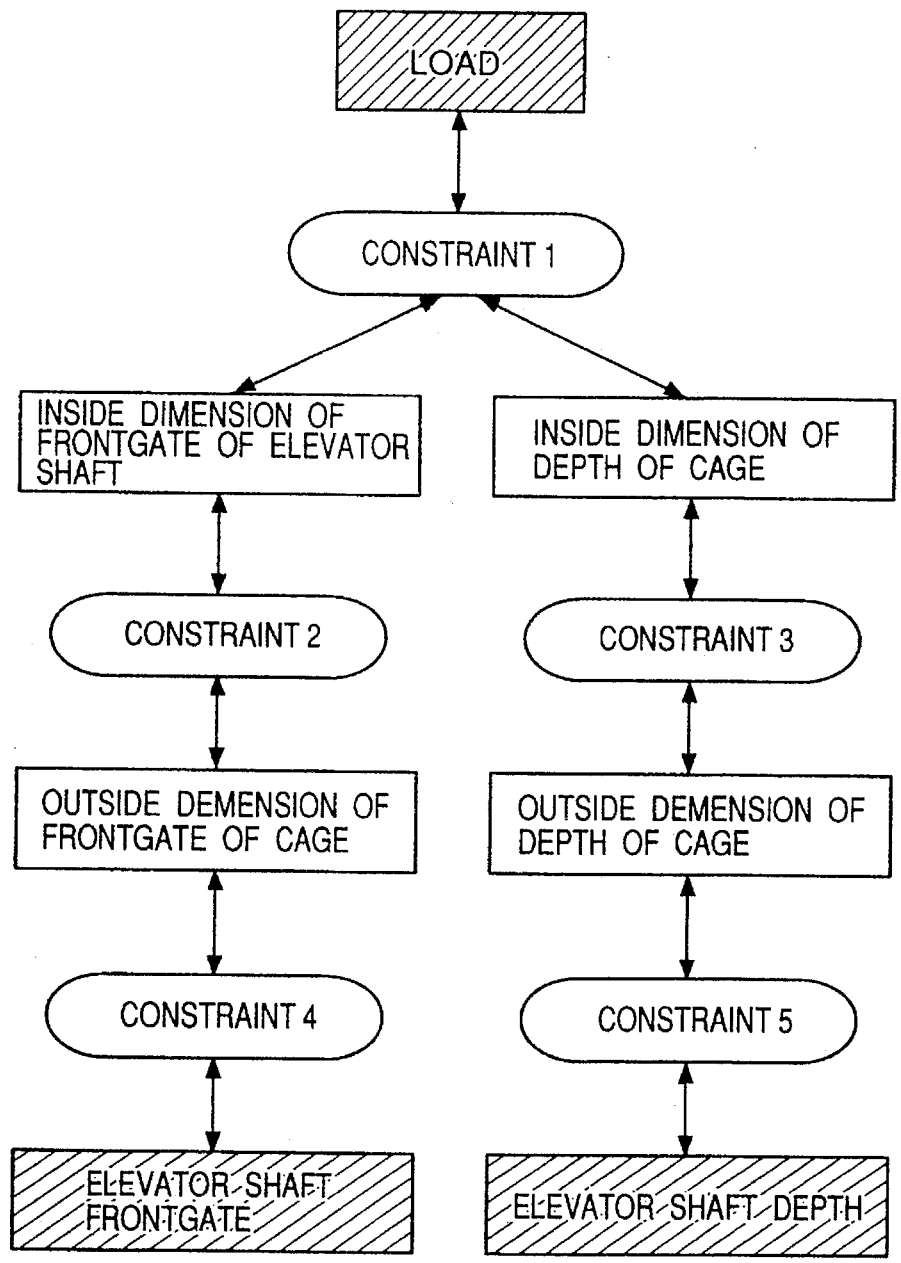
FIG. 64 is a diagram useful to explain constraints between attributes of an elevator.

Next, the operation of the system will be described by reference to an example of an elevator as the object product. An elevator is primarily constituted of a cage to convey persons and goods, a counterweight linked by a rope with the cage to develop a balanced state, and a winch to vertically move the cage and the weight. These elements are arranged in an elevator shaft or a machine room. The configuration of the elevator is determined as follows. Namely, according to the attribute values requested by the client such as "elevator shaft front gate" and "elevator shaft depth" respectively representing frontgate and depth dimensions of the elevator shaft where the elevator is installed in the building and "load" denoting a weight applicable to the cage, there are set, to satisfy the request of the client, attribute values of the respective parts including "inside dimension of frontgate of cage" and "inside dimension of depth of cage" indicating inside dimensions respectively of the frontgate and the depth of the cage and "outside dimension of frontgate of cage" and "outside dimension of depth of cage" designating outside dimensions respectively of the frontgate and the depth of the cage. Constraints are expressed by tables, expressions, inequalities, and the like representing combinations to be satisfied between a plurality of attributes. FIGS. 64 and 65 respectively show an example of relationships between attributes and constraints and the contents of the respective constraints.

Figure 66:
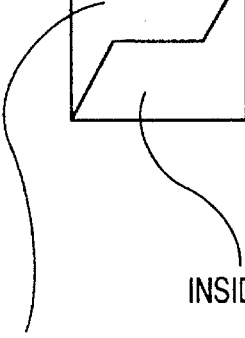
FIG. 66 is a diagram useful to explain the contents of non-standard constraints associated with a constraint 1 of FIG. 65.

For example, a constraint 1 indicates a table of integral combinations each including values of "load", "inside dimension of frontgate of cage", and "inside dimension of depth of cage". Constraints 2 and 3 are to be satisfied by the thickness of side plates of the cage, whereas constraints 4 and 5 are to be satisfied to for the cage and the weight to vertically move without colliding against the elevator shaft. These constraints are handled in a bi-directional fashion such that when one of the attribute values of a constraint is set, the other attribute values thereof are automatically established by the constraint propagation means. For example, when "1050 kg" is set to "load" of the constraint 1, the values of "inside dimension of frontgate of cage" and "inside dimension of depth of cage" are automatically determined as "1900mm" and "1300 mm", respectively. Conversely, when the values of "inside dimension of frontgate of cage" and "inside dimension of depth of cage" are respectively set to "1550 mm" and "1100 mm", the value of "load" is automatically decided as "700kg". Also for the constraints 2 and 3, when "inside dimension of frontgate of cage" and "inside dimension of depth of cage" are determined, the values of "outside dimension of frontgate of cage" and "outside dimension of depth of cage" are automatically calculated and are determined accordingly. Conversely, when "outside dimension of frontgate of cage" and "outside dimension of depth of cage" are decided, the values of "inside dimension of frontgate of cage" and "inside dimension of depth of cage" are automatically calculated and are set accordingly. Moreover, for the constraints 4 and 5, in a case where "outside dimension of frontgate of cage" and "outside dimension of depth of cage" are set and "elevator shaft frontgate" and "elevator shaft depth" are beforehand set, a check is made to confirm whether or not the inequality is satisfied. Furthermore, particularly, as for the constraint 1, when a design solution cannot be obtained according to the combinations of values shown in FIG. 65 representing the standard constraints, the constraints are mitigated to the non-standard constraints as shown in FIG. 66, thereby continuing the design job.

The constraint mitigation level storage section stores a mitigation level for each constraint number as shown in FIG. 67, the level indicated as standard (without constraint mitigation), non-standard (n-level mitigation), and removal (mitigation of all constraints). In addition, the design purpose storage section stores therein, as shown in FIG. 68, reasons of mitigation for mitigated constraints, namely, "insufficient strength", "specification of client", and "special object contour". When the design is finished or is interrupted, information items respectively of the attribute value storage section, the constraint mitigation level storage section, and the design purpose storage section are mutually related to each other via the input/output processing means so as to be stored in the design solution/intermediate design solution storage section, the constraint mitigation level storage section, and the design purpose storage section.

In a case where a design solution or an intermediate result of design is respectively used to modified the design solution or to continue a design job related to the result, data items of the design solution of the intermediate result of design are transferred together with data items representing a constraint mitigated to obtain the design solution or the intermediate result of design, a mitigation level thereof, and a design purpose to mitigate the constraint from the respective design aiding apparatuses via the input/output processing means to the respective design aiding apparatuses. Consequently, the contents of decision and judgement conducted in the preceding design jobs are kept remained so as to modify a design solution or to continue a design job.

Embodiment 9

Figure 69:
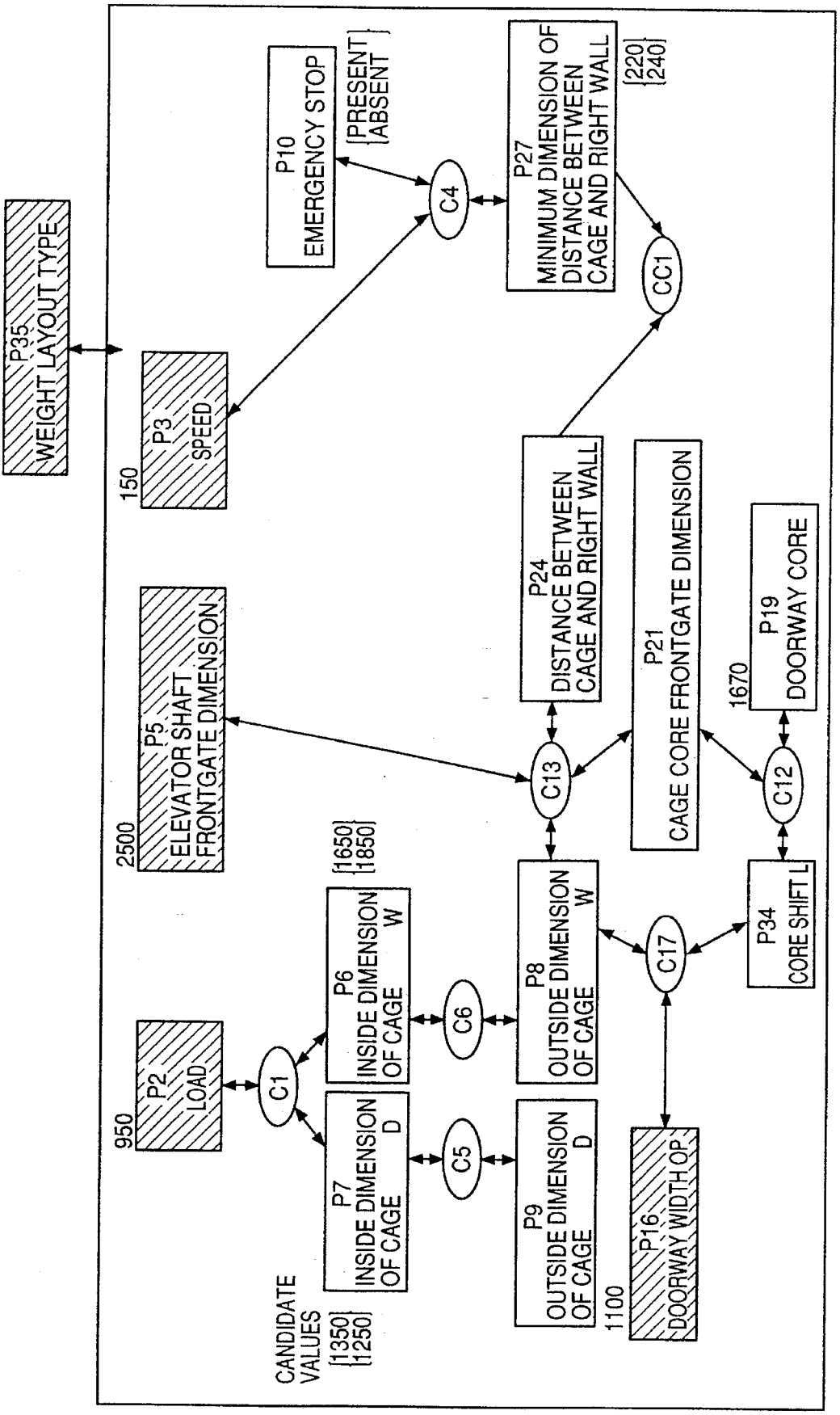
FIG. 69 is a diagram showing an example of candidate values of attributes for candidate solution creation.

Next, referring to FIGS. 69 and 70, description will be given of the ninth embodiment according to the present invention. In the description of the embodiment, the candidate solution generating means 311 outputs, in response to a request, any possible candidates of design solutions. On the constraint network of FIG. 69, when input values "950", "2500", "150", "1100", and "1670" are respectively supplied as "load", "elevator shaft frontgate", "speed", "doorway width", and "doorway core", a constraint C1 is activated according to the constraints of FIG. 7 to generate possible combinations (1650,1350) and (1850,1250) of "inner dimension of cage W" and "inner dimension of cage D". The means 311 continues constraint propagation according to each of these combinations. When a conflict occurs during the propagation, the pertinent combination is discarded. Namely, a combination for which an inference is executed an a design solution is attained without causing any conflict is outputted as a candidate solution as shown in FIG. 70. As a result, from the candidate solutions, the user can select as a design solution a candidate solution which is most similar to a desired solution.

Embodiment 10

Figure 71:
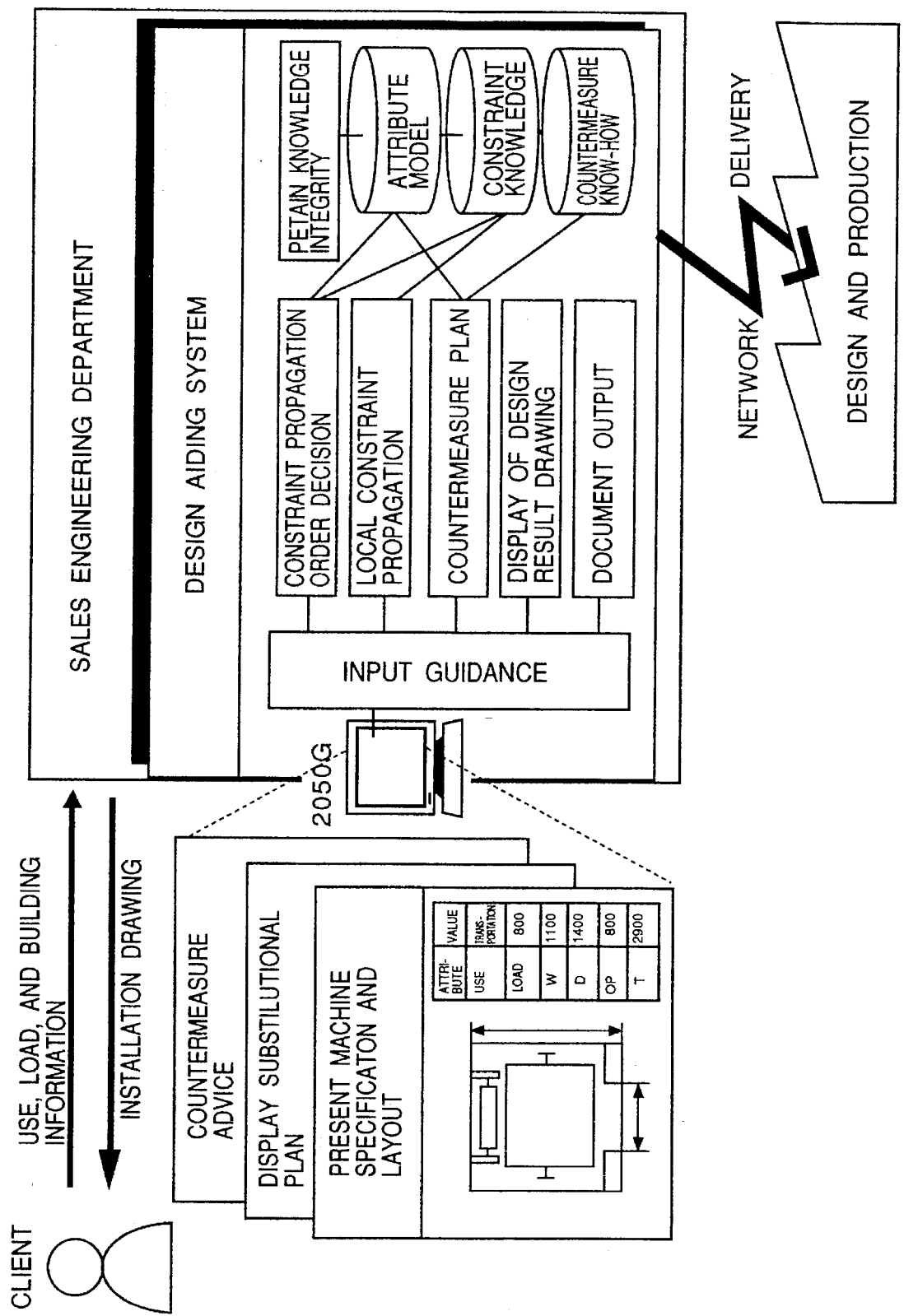
FIG. 71 is a diagram showing the operation mode of the design aiding system.

Referring now to FIG. 71, description will be given of the tenth embodiment according to the present invention.

FIG. 71 is a diagram showing the constitution of a design aiding system implementing a design aiding method in the ninth embodiment according to the present invention. In accordance with the system of FIG. 71, in a case where a design aiding apparatus including the functions of the present invention, when a client issues a request specification to the system, a machine specification and a layout specification of each machine can be interactively checked according to the guidance and know-how advice of design procedures, thereby calculating a design solution at a high speed. The solution is outputted in the form of installation drawings to be presented to the client. After the drawings are approved by the client, the designer sends the drawings via the network to the firm side for fabrication of the related elements.

According to the present invention, for a product having a variety of attributes and values thereof, the design data control section, the design procedure guiding section, and the design operation executing section accomplish cooperative actions to guide the design procedure so as to automatically decide attribute values of the product, thereby efficiently creating a design solution satisfying the client request.

Furthermore, for a product for which the client has a variety of requests and particularly important specification items are varied for each request to resultantly alter a design procedure, it is possible to automatically produce design procedures related to the various request patterns so as to efficiently generate a design solution conforming to the request of the client.

In addition, when attribute values beforehand set are altered, there is accomplished modification propagation to appropriately modify a design plan at a high speed.

Moreover, for a request, possible candidate design plans can be created to notify the user various solutions for design.

Furthermore, when a conflict occur during constraint propagation, a conflict removal is indicated. Alternatively, when the conflict cannot be solved, constraint mitigation is achieved so as to produce a substitutional design plan. Consequently, even if the system cannot cope with the request of the client, the cause, the countermeasure, and the substitutional plan can be easily obtained.

In addition, when constraint propagation is interrupted due to creation of an enquiry, attribute values to be additionally inputted are presented for the user to facilitate continuation of the design job, thereby enabling the design to be achieved at a high speed.

Moreover, during a design work, when attribute values related to a product structure are changed or a conflict occurs between such attribute values, a set of attributes and a set of constraints to be adopted for creation of a design plan are automatically changed to continue the design job.

Furthermore, for a product for which the client has a variety of requests and particularly important specification items are changed for each request to resultantly alter a design procedure, there is displayed a control panel screen in which the user selects a request pattern number so as to automatically produce a design procedure according to the request pattern. This consequently leads to an efficient production of a design solution satisfying the request of the client.

Moreover, when attributes beforehand set are changed on the attribute value input and display screen and then the inference execution command menu is selected, modification propagation is executed to appropriately modify a design plan at a high speed.

In addition, for a request, the system is capable of generating and presenting possible candidate design plans; consequently, the user can obtain various possible solutions and can select a desired candidate.

Furthermore, when a conflict occurs during constraint propagation, there can be displayed a method of changing attributes to solve the conflict. Alternatively, when the conflict cannot be solved, the contents of a constraint to be mitigated can be displayed to create a substitutional design plan. Consequently, even when the system cannot cope with the request of the client, there can be easily attained the cause, the countermeasure, and the substitutional plan.

Moreover, when constraint propagation is interrupted due to creation of an enquiry, attribute values to be additionally inputted are presented for the user to facilitate continuation of the design job so as to enable the design to be achieved at a high speed.

In addition, during a design work, when attribute values related to a product structure are changed or a conflict occurs between such attribute values, a set of attributes and a set of constraints to be adopted for creation of a design plan are automatically changed to retain integrity of the menu on the attribute value input and display screen, thereby continuing the design job.

As above, in response to a request of the client, the sales engineer can present results at a high speed, thereby minimizing the response time for the client.

Moreover, in a constraint propagation method using constraints of which the contents vary during constraint propagation, when a conflict occurs, there can be attained variables causing the conflict; moreover, it is possible to obtain values of the conflict cause variables to solve the conflict.

According to the present invention, thanks to provision of not-scale drawing display means, the user can easily confirm the contents of attributes to be inputted. According to the means, when attribute values related to a basic structure of the contour pattern of the design object model are inputted during a request attribute value input operation, a not-scale drawing is displayed such that when an attribute name field of the attribute value input and display screen is clicked by the user, each attribute of the attribute model is checked to decide correspondence thereof to one of the dimensions of the contour of the design object model so as to display dimension lines with different shapes and colors in the not-scale drawing.

Moreover, there may be disposed not-scale drawing data registration means for registering not-scale drawing data items, correspondences between the drawing data items and attribute names, and retrieval conditions of not-scale drawings so as to facilitate construction of not-scale drawing data.

As described above, the design job can be accomplished at a high speed. For a request of the client, the sales engineer can present results at a high speed, thereby improving characteristic of response time for the client.

According to the present invention, in a case where a design solution or an intermediate result of design is employed to modify a design solution or to continue a design work, the contents of decision and judgement conducted in the previous design job are kept retained so as to modify the design solution or to continue the design work according to constraints mitigated to obtain the design solution or the intermediate result of design, mitigation levels, and design purposes for the constraint mitigation, thereby achieving an efficient design work.

While particular embodiments of the invention have been shown and described, it will be obvious to those skilled in the art that various changes and modifications may be made without departing from the present invention in its broader aspects.

We claim:

1. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
(a) design object model storage means for storing therein an attribute model in which a design specification of a product is represented in the form of a set of attributes and values thereof and constraints representing relational rules between respective attributes,
(b) input guide means for guiding an input of attribute values when the user inputs a request specification and setting the input values to the attribute model, and
(c) design plan display means for displaying a design plan according to attribute values set to the attribute model as a result of an input operation, an inference operation or a computation;

wherein said means for obtaining a design solution includes:
(a) constraint propagation executing order decision means for detecting, based on attributes for which values are already set in said attribute model and said constraints, executable constraints according to values set to said attribute values, and
b) local constraint propagation means for accessing said design object model storage means to obtain therefrom constraints determined for execution by said design procedure guiding section, for executing the obtained constraints, and for setting calculated attribute values to the attribute model;

wherein said means for repeatedly starting includes:
(a) input guide means, operative when a conflict occurs between attributes during designing of a method of changing attribute values or mitigating constraints according to a setting state of attribute values in said attribute model, thereby creating a substitutional design plan, and
(b) conflict detecting means for detecting a conflict between the attribute values according to the constraints;

said apparatus further comprising:
control panel display means for displaying, for the user to select an inference execution processing pattern, an inference mode selection menu capable of selecting a first inference mode for sequential selection or a second inference mode for candidate retaining, wherein:
the first mode is operative, when a plurality of combinations of attributes which can be selected appear during the inference, for sequentially displaying attribute value selecting combinations, thereby requesting the user to select a desired one of the combinations, and
the second mode is operative, when the inference is continued while the combinations are retained as candidate values in values ranges of the respective attribute values of the attribute model, for displaying after the inference is finished the candidate values in difference colors in the attribute value menu of the attribute value input and display screen.

2. An apparatus according to claim 1, further including:
design strategy control means; and
menu display means disposed in the control panel display means for displaying a request pattern number selection menu capable of selecting a variety of design requests from the user, wherein
the design strategy control means includes means for accessing data of importance for each of the attributes and each of the constraints registered for each request pattern to obtain an importance of each of the attributes and each of the constraints associated with a request pattern number, for setting the importance to the attributes and the constraints, and for determining an execution sequence of constraint propagation according to the set importance, thereby creating appropriate design procedures conforming to a variety of requests from the user.

3. A design aiding apparatus according to claim 1, wherein the control panel means includes a menu for selection of storage/non-storage of design history information and display/non-display of an inference execution trace, thereby enabling the user to select a case where the state of inference execution is desired to be confirmed or a case where the state is not desired to be confirmed.

4. A design aiding apparatus according to claim 1, wherein the control panel means includes a menu for selection of display/non-display of a graphic menu to guide an input of attribute values, thereby enabling the user to select a case where the user is a beginner and necessitates guidance of the input of attribute values or a case where the user is an expert and the guidance is unnecessitated.

5. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
(a) design object model storage means for storing therein an attribute model in which a design specification of a product is represented in the form of a set of attributes and values thereof and constraints representing relational rules between respective attributes,
(b) input guide means for guiding an input of attribute values when the user inputs a request specification and setting the input values to the attribute model, and
(c) design plan display means for displaying a design plan according to attribute values set to the attribute model as a result of an input operation, an inference operation or a computation;

wherein said means for obtaining a design solution includes:
(a) constraint propagation executing order decision means for detecting, based on attributes for which values are already set in said attribute model and said constraints, executable constraints according to values set to said attribute values, and
(b) local constraint propagation means for accessing said design object model storage means to obtain therefrom constraints determined for execution by said design procedure guiding section, executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

confirmation means for the input of a request specification by the user and the confirmation of a design specification of a product determined by an inference, including:

attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation, wherein the attribute value input and display screen includes means, for the user to confirm reasons for decision of attribute values, for judging to determine whether the value set to each of the attribute values of the attribute model is a value input by the user, a default value, or a value set through an inference and for displaying the respective values in different colors, execution command menu display means for displaying a command menu to initiate execution of an inference, and design plan display means for generating contour data of a design object model according to attribute values resultant from the execution of the inference and displaying a design plan.

6. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

confirmation means for the input of a request specification by the user and the confirmation of a design specification of a product determined by an inference, including:

attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation, wherein the attribute value input and display means includes:

means for classifying the attributes for each of the constituent elements of the design object model and for displaying results of classification as header items in a list, and means, operative when the user selects one of the header items, for displaying attribute name fields and attribute value fields only in a range of the selected header item in a list on the attribute value input and display screen, thereby helping the user to detect attributes to be input even when the number of attributes is increased, execution command menu display means for displaying a command menu to initiate execution of an inference, and design plan display means for generating contour data of a design object model according to attribute values resultant from the execution of the inference and displaying a design plan.

7. A design aiding apparatus according to claim 6, wherein the header item list menu includes means for displaying header items in different colors discriminatingly between a case where the attribute values are completely decided in the range of each of the header items and a case where at least one of the attribute values are not decided, thereby helping the user easily judge whether the design is being executed or the attribute values are completely decided.

8. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
(a) design object model storage means for storing therein an attribute model in which a design specification of a product is represented in the form of a set of attributes and values thereof and constraints representing relational rules between respective attributes,
(b) input guide means for guiding an input of attribute values when the user inputs a request specification and setting the input values to the attribute model, and
(c) design plan display means for displaying a design plan according to attribute values set to the attribute model as a result of an input operation, an inference operation or a computation;

wherein said means for obtaining a design solution includes:
(a) constraint propagation executing order decision means for detecting, based on attributes for which values are already set in said attribute model and said constraints, executable constraints according to values set to said attribute values, and
(b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:
(a) input guide means, operative when a conflict occurs between attributes during designing of a method of changing attribute values or mitigating constraints according to a setting state of attribute values in said attribute model, thereby creating a substitutional design plan, and
(b) conflict detecting means for detecting a conflict between the attribute values according to the constraints;

said apparatus further comprising:
confirmation means for the input of a request specification by the user and the confirmation of a design specification of a product determined by an inference, including:
attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation,
wherein the attribute value input and display means includes means for displaying a range of values in an inequality in the form of a menu when the attribute value is indicated to have an attribute of numeric value,
execution command menu display means for displaying a command menu to initiate execution of an inference, and
design plan display means for generating contour data of a design object model according to attribute values resultant from the execution of the inference and displaying a design plan.

9. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting included:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

confirmation means for the input of a request specification by the user and the confirmation of a design specification of a product determined by an inference, including:

attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation, wherein the attribute value input and display means includes:

means for displaying an attribute value lock/unlock setting field for locking or unlocking the attribute value for each of the attributes of the attribute model, and means responsive to the user clicking on the lock/unlock field of an attribute related to an attribute value for which the user requests, in the request specification, rejection of a change of the value during an inference, for setting the attribute value to a locked state, thereby changing attribute values other than those locked in an execution of a design operation, while keeping the locked values unchanged, execution command menu display means for displaying a command menu to initiate execution of an inference, and design plan display means for generating contour data of a design object model according to attribute values resultant from the execution of the inference and displaying a design plan.

10. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to-the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

confirmation means for the input of a request specification by the user and the confirmation of a design specification of a product determined by an inference, including:

attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation, wherein the attribute value input and display means includes means in an attribute lock/unlock setting field, operative when the attribute lock/unlock setting field of the locked attribute value is clicked again, for restoring the locked state thereof to an unlocked state, thereby facilitating cancellation of the lock request, execution command menu display means for displaying a command menu to initiate execution of an inference, and design plan display means for generating contour data of a design object model according to attribute values resultant from the execution of the inference and displaying a design plan.

11. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

confirmation means for the input of a request specification by the user and the confirmation of a design specification of a product determined by an inference, said confirmation means includes:

attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation, design plan display means for generating contour data of a design object model according to attribute values resultant from the execution of the inference and displaying a design plan execution command menu display means for displaying a command menu to initiate execution of an inference, wherein the execution command menu display screen for displaying therein a command menu to initiate execution of an inference includes:

means for displaying a procedure guide command menu, operative at an occurrence of a conflict during a design, for indicating a method of changing attribute values or mitigating constraints, thereby executing a function to guide a procedure of generating a substitutional design plan, means for displaying a check diagram display command menu to display a design plan according to attribute values determined after the execution of the inference, means for displaying a control panel command menu to call and to represent a control panel screen in which an inference mode is set, and means for displaying a system end command menu.

12. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain a selection of one of the attribute values by the user for displaying values which can be selected for the attribute value in a menu with characters or graphic images, thereby guiding the input of attribute values, and displaying attribute values set to the attribute model as a result of an inference operation or computation, wherein the attribute value input and display means includes, to facilitate the user to confirm the contents of attributes to be input, contour data retrieval and display means and dimension line display means, the contour data retrieval and display means being responsive to an input of an attribute value related to a basic structure representing a contour pattern of the design object model for retrieving, with the input attribute value set as a retrieval key, not-scale contour data beforehand registered for each contour pattern, thereby displaying the contour data, the dimension line display means being responsive to a click of an attribute name field in the attribute value input and display screen for judging whether correspondence exists between the respective attributes of the attribute model and dimensions of the contour of the design object model and for displaying the dimension lines discriminatingly in different shapes and colors in a not-scale drawing, execution command menu display means for displaying a command menu to initiate execution of an inference, and design plan display means for generating contour data of a design object model according to attribute values resultant from the execution of the inference and displaying a design plan.

13. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:
(a) input guide means, operative when a conflict occurs between attributes during designing of a method of changing attribute values or mitigating constraints according to a setting state of attribute values in said attribute model, thereby creating a substitutional design plan, and
(b) conflict detecting means for detecting a conflict between the attribute values according to constraints;

said apparatus further comprising:
confirmation means for the input of a request specification by the user and the confirmation of a design specification of a product determined by an inference, including:
attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation,
execution command menu display means for displaying a command menu to initiate execution of an inference, and
design plan display means for generating contour data of a design object model according to attribute values resultant from the execution of the inference and displaying a design plan; and
means for simultaneously displaying one of an attribute value input and display screen, an-attribute value input not-scale drawing screen and a design plan display screen, with an inference execution and procedure guide command menu, wherein:
the contents of attribute values input by the user can be compared with a design plan generated according to the input attribute values to help the user evaluate the design plan, and
a procedure guidance selection menu can be immediately selected, in a case where a problem is present, to achieve an operation of countermeasure.

14. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:
means for changing over between a group of a plurality of attributes and constraints necessary for an inference in accordance with a change of structure of a product;
means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
(a) design object model storage means for storing therein an attribute model in which a design specification of a product is represented in the form of a set of attributes and values thereof and constraints representing relational rules between respective attributes,
(b) input guide means for guiding an input of attribute values when the user inputs a request specification and setting the input values to the attribute model, and
(c) design plan display means for displaying a design plan according to attribute values set to the attribute model as a result of an input operation, an inference operation or a computation;

wherein said means for obtaining a design solution includes:
(a) constraint propagation executing order decision means for detecting, based on attributes for which values are already set in said attribute model and said constraints, executable constraints according to values set to said attribute values, and
(b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:
(a) input guide means, operative when a conflict occurs between attributes during designing of a method of changing attribute values or mitigating constraints according to a setting state of attribute values in said attribute model, thereby creating a substitutional design plan; and
(b) conflict detecting means for detecting a conflict between the attribute values according to the constraints;

said apparatus further comprising:
confirmation means for the input of a request specification by the user and the confirmation of a design specification of a product determined by an inference, including:
attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation,
execution command menu display means for displaying a command menu to initiate execution of an inference, and
design plan display means for generating contour data of a design object model according to attribute values resultant from the execution of the inference and displaying a design plan;

means, operative after the design object model change function automatically changes, at an occurrence of a change or a conflict of attributes in a creation of a design plan according to the input attribute values or at an intermediate point of design, the attributes of a design object model and constraint knowledge to be used for creation of a design plan to prepare a set of attributes and a set of constraints necessary for a structure of product, for displaying a list of attribute name fields and attribute value fields which have undergone change; and means responsive to a selection of one of the attribute value fields by the user for displaying in a character or graphic menu values which can be selected for the attribute value after the change.

15. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
  (a) design object model storage means for storing therein an attribute model in which a design specification of a product is represented in the form of a set of attributes and values thereof and constraints representing relational rules between respective attributes,
  (b) input guide means for guiding an input of attribute values when the user inputs a request specification and setting the input values to the attribute model,
  (c) design plan display means for displaying a design plan according to attribute values set to the attribute model as a result of an input operation, an inference operation or a computation, and
  (d) means for displaying a new/registered item data selection screen capable of selecting a system operation for a case in which a user desires to create a design plan for a new item and a case in which a user desires to modify a design plan of an existing item;

wherein said means for obtaining a design solution includes:
  (a) constraint propagation executing order decision means for detecting, based on attributes for which values are already set in said attribute model and said constraints, executable constraints according to values set to said attribute values, and
  (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:
  (a) input guide means, operative when a conflict occurs between attributes during designing of a method of changing attribute values or mitigating constraints according to a setting state of attribute values in said attribute model, thereby creating a substitutional design plan; and
  (b) conflict detecting means for detecting a conflict between the attribute values according to the constraints; and said apparatus further comprising:
  confirmation means for the input of a request specification by the user and the confirmation of a design specification of a product determined by an inference, said confirmation means includes:
    attribute value input and display means for displaying, when a user inputs a request specification, a list of attribute name fields and attribute value fields, and being responsive to a selection of one of the attribute values by the user for displaying values which can be selected for the attribute value in a menu with characters or graphic images, thereby guiding the input of attribute values, and displaying attribute values set to the attribute model as a result of an inference operation or computation,
    execution command menu display means for displaying a command menu to initiate execution of an inference, and
    design plan display means for generating contour data of a design object model according to attribute values resultant from the execution of the inference and displaying a design plan.

16. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan; and (b) conflict detecting means for detecting a conflict between the attribute values according to the constraints;

said apparatus further comprising:

design object model storage means for storing therein an attribute model representing design specification items of a product, constraints representing relational rules between attributes, and knowledge data of product structure defining a set of attributes and a set of constraints which are required according to the product structure;

design strategy knowledge storage means in which a plurality of weight data items are registered to each of the attributes and each of the constraints for each request pattern of the client;

means for providing countermeasure know-how for use in a case in which a conflict occurs between attributes during a design;

model change means, operative when the user inputs an attribute value for a product structure in the input request specification, for changing an active state of each of the attribute set and the constraint set to be used for creation of a design plan in the attributes and the constraints of the design object model storage means according to the product structure, thereby coping with a change of the structure;

design strategy control means for reading, according to a request pattern number of client input by the user, weight data from the design strategy knowledge and assigning the weight data to the respective attributes and constraints;

activation possible constraint extracting means for extracting, according to attributes for which values are already set in the attribute model and the constraint knowledge, constraints which can be activated;

activation constraint judge means for judging to determine, according to the weight data assigned to the respective constraints and attributes, a constraint which has a higher importance among plural executable constraints thus extracted and which is to be preferentially executed, thereby generating design procedures conforming to a variety of request of a client; and procedure guide means, operative when a conflict occurs between attributes during a design, for giving advice for creation of a substitutional design plan to solve the conflict according to the countermeasure associated with a method of changing attribute values of the product structure, a method of changing request input attribute values, or a method of mitigating constraints, thereby presenting appropriate know-how advice according to the state of design and computing a design solution at a high speed.

17. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model; and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

means responsive to an input of an attribute value related to a basic structure representing a contour pattern of the design object model for retrieving, for the user to confirm the contents of attributes to be input, contour data of a not-scale drawing registered for each contour pattern with the input attribute value set as a retrieval key;

means for displaying the retrieved not-scale drawing; and attribute value input not-scale drawing display means responsive to a click of an attribute name field of the attribute value input means by the user for judging to determine correspondences between the respective attribute values of the design object model and dimensions of the contour of the design object model and displaying dimension lines with different shapes and in different colors.

18. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:

(a) design object model storage means for storing therein an attribute model in which a design specification of a product is represented in the form of a set of attributes and values thereof and constraints representing relational rules between respective attributes, (b) input guide means for guiding an input of attribute values when the user inputs a request specification and setting the input values to the attribute model, and (c) design plan display means for displaying a design plan according to attribute values set to the attribute model as a result of an input operation, an inference operation or a computation;

wherein said means for obtaining a design solution includes:

(a) constraint propagation executing order decision means for detecting, based on attributes for which values are already set in said attribute model and said constraints, executable constraints according to values set to said attribute values, and (b) local constraint propagation means for accessing said design object model storage means to obtain therefrom constraints determined for execution by said design procedure guiding section, for executing the obtained constraints, and for setting calculated attribute values to the attribute model, and wherein said means for repeatedly starting includes:

(a) input guide means, operative when a conflict occurs between attributes during designing of a method of changing attribute values or mitigating constraints according to a setting state of attribute values in said attribute model, thereby creating a substitutional design plan, and (b) conflict detecting means for detecting a conflict between the attribute values according to the constraints;

said apparatus further comprising:

not-scale drawing data registration means in which, to facilitate construction of not-scale drawing data, there are registered not-scale drawing data, correspondences between the not-scale drawing data and attribute names, and retrieval conditions of not scale drawings.

19. An apparatus for aiding a process for producing a design solution, wherein, on the basis of design knowledge including an attribute model representing a design specification of a product expressed by a group of a plurality of attributes and values of said attributes and constraints declaratively expressing relational rules among said attributes, attribute value is inferred from an input of a required specification from a user to satisfy the constraint, said apparatus comprising:

means for changing over between a group of a plurality of attributes and constraints necessary for an inference in accordance with a change of structure of a product;

means for obtaining a design solution by tracing a constraint network defined by said group of attributes and constraints, for producing a process for determining unknown attribute values in response to various requests from a customer, and for inferring attribute values successively in accordance with said process; and means for repeatedly starting said changing-over means in accordance with a selection by the user, such that, when a conflict arises in said inferring of attribute values, an advice about a change of the indicated product structure, an input attribute value and a relieving of the constraints is provided as a countermeasure for resolving the conflict;

wherein said means for changing over includes:
  (a) design object model storage means for storing therein an attribute model in which a design specification of a product is represented in the form of a set of attributes and values thereof and constraints representing relational rules between respective attributes,
  (b) input guide means for guiding an input of attribute values when the user inputs a request specification and setting the input values to the attribute model, and
  (c) design plan display means for displaying a design plan according to attribute values set to the attribute model as a result of an input operation, an inference operation or a computation;

wherein said means for obtaining a design solution includes:
  (a) constraint propagation executing order decision means for detecting, based on attributes for which values are already set in said attribute model and said constraints, executable constraints according to values set to said attribute values, and
  (b) local constraint propagation means for accessing said design object model storage means to obtain therefrom constraints determined for execution by said design procedure guiding section, for executing the obtained constraints, and for setting calculated attribute values to the attribute model, and wherein said means for repeatedly starting includes:
  (a) input guide means, operative when a conflict occurs between attributes during designing of a method of changing attribute values or mitigating constraints according to a setting state of attribute values in said attribute model, thereby creating a substitutional design plan, and
  (b) conflict detecting means for detecting a conflict between the attribute values according to the constraints; and said apparatus further comprising constraint control, including:
  constraint condition mitigating means, operative when the values already determined for attributes including input values do not satisfy constraint conditions, for enabling the designer to specify mitigation of the constraint conditions, and
  a constraint mitigation level storage section for storing, when storing a design solution or an intermediate result of design, a mitigation level of each of the constraint conditions used to attain the design plan or the intermediate result of design.

20. An apparatus according to claim 19, wherein there is provided means, operating in place of the operation of an designer to input attribute values, for automatically setting attribute values in accordance with another design system.

21. An apparatus according to claim 19, wherein there is provided means, operating in place of operation of a designer to specify a constraint and a mitigation level for mitigation, for automatically determining the constraint and the mitigation level.

22. An apparatus according to claim 19, further including a design purpose storage section for storing therein, together with the mitigation level of each of the constraints, a design purpose for the mitigation of the constraint.

* * * * *